United States Patent [19]

Putnam et al.

[11] Patent Number: 5,262,965
[45] Date of Patent: Nov. 16, 1993

[54] SYSTEM AND METHOD FOR HIGH SPEED COMPUTER GRAPHICS IMAGE COMPUTATION USING A PARALLEL CONNECTED, ASYNCHRONOUS MULTIPROCESSOR RING COUPLED TO A SYNCHRONOUS SPECIAL PURPOSE VIDEO PROCESSING RING

[75] Inventors: Leland K. Putnam; Phillip H. Lucht; David K. Blair, all of Salt Lake City; Scott K. Pritchett, Sandy, all of Utah

[73] Assignee: BTS-Broadcast Television Systems, Inc., Salt Lake City, Utah

[21] Appl. No.: 265,422

[22] Filed: Oct. 31, 1988

[51] Int. Cl.⁵ .............................. G06F 3/00
[52] U.S. Cl. ..................... 395/101; 358/903; 364/940.5; 364/927; 364/DIG. 2; 395/200
[58] Field of Search ... 364/518, 521, 522, 200 MS File, 364/900 MS File; 340/723, 747, 739, 750, 798-800; 358/903

[56] References Cited

U.S. PATENT DOCUMENTS

| | | | |
|---|---|---|---|
| 4,354,226 | 10/1982 | Flickinger et al. | 364/900 |
| 4,374,428 | 2/1983 | Barnes | 364/900 |
| 4,424,572 | 1/1984 | Lorig et al. | 364/900 |
| 4,456,956 | 6/1984 | El-Gohary et al. | 364/200 |
| 4,513,370 | 4/1985 | Ziv et al. | 364/200 |
| 4,602,365 | 7/1986 | White et al. | 370/89 |
| 4,631,666 | 12/1986 | Harris et al. | 364/200 |
| 4,646,075 | 2/1987 | Andrews et al. | 340/747 |
| 4,688,106 | 8/1987 | Keller et al. | 358/342 |
| 4,689,683 | 8/1987 | Efron | 358/903 X |

FOREIGN PATENT DOCUMENTS

| | | |
|---|---|---|
| 0202014 | 11/1986 | European Pat. Off. |
| 0203728 | 12/1986 | European Pat. Off. |
| 0215664 | 3/1987 | European Pat. Off. |
| 0242106 | 10/1987 | European Pat. Off. |
| 59-172064 | 3/1984 | Japan . |
| WO86/07646 | 12/1986 | PCT Int'l Appl. |
| WO87/00318 | 1/1987 | PCT Int'l Appl. |
| 2179819 | 3/1987 | United Kingdom . |
| 2188519 | 9/1987 | United Kingdom . |

OTHER PUBLICATIONS

Stallings, Williams. Local Networks, pp. 348-353 (1984).

Primary Examiner—Gary V. Harkcom
Assistant Examiner—H. R. Herndon
Attorney, Agent, or Firm—Workman Nydegger Jensen

[57] ABSTRACT

A high performance computer graphics image computation system architecture is disclosed. The system architecture includes a computational processor ring which includes a plurality of closely coupled computational subsystems. The computational subsystems operate asynchronously and each is interconnected with two adjacent computational subsystems. The architecture of the processor ring allows rapid communication between the computational subsystems while avoiding a deadlock condition. The system architecture also includes a video processor ring wherein a plurality of video processors are synchronously linked together. A plurality of local communication paths couple the computational subsystems to the video processors. The video processor ring is able to move massive amounts of data, in the form of digital video signals, from various points within the system. The computational processor ring is able to rapidly carry out graphic image computation tasks and graphic image data is moved around in the system by way of the video processor ring.

72 Claims, 33 Drawing Sheets

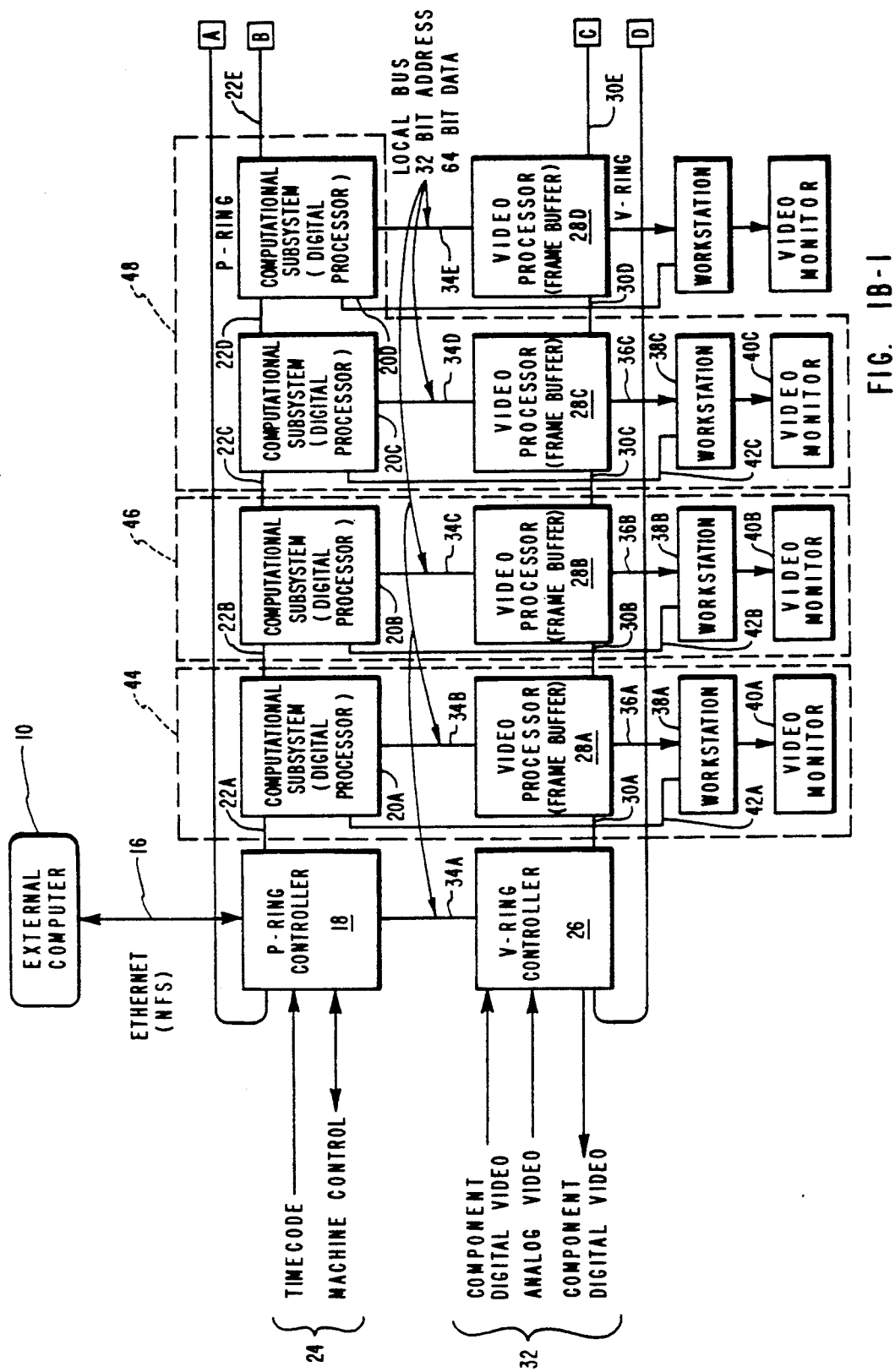

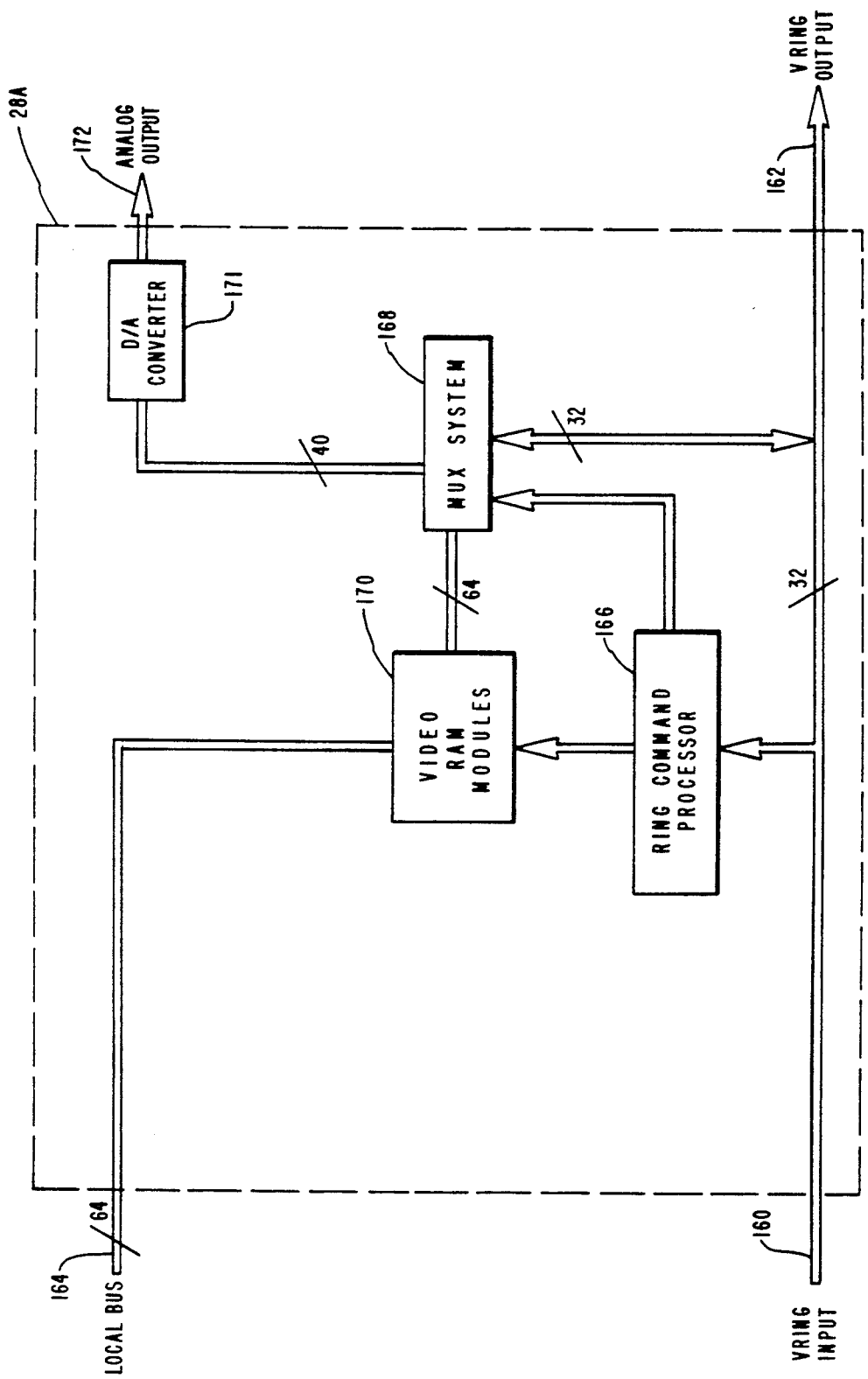

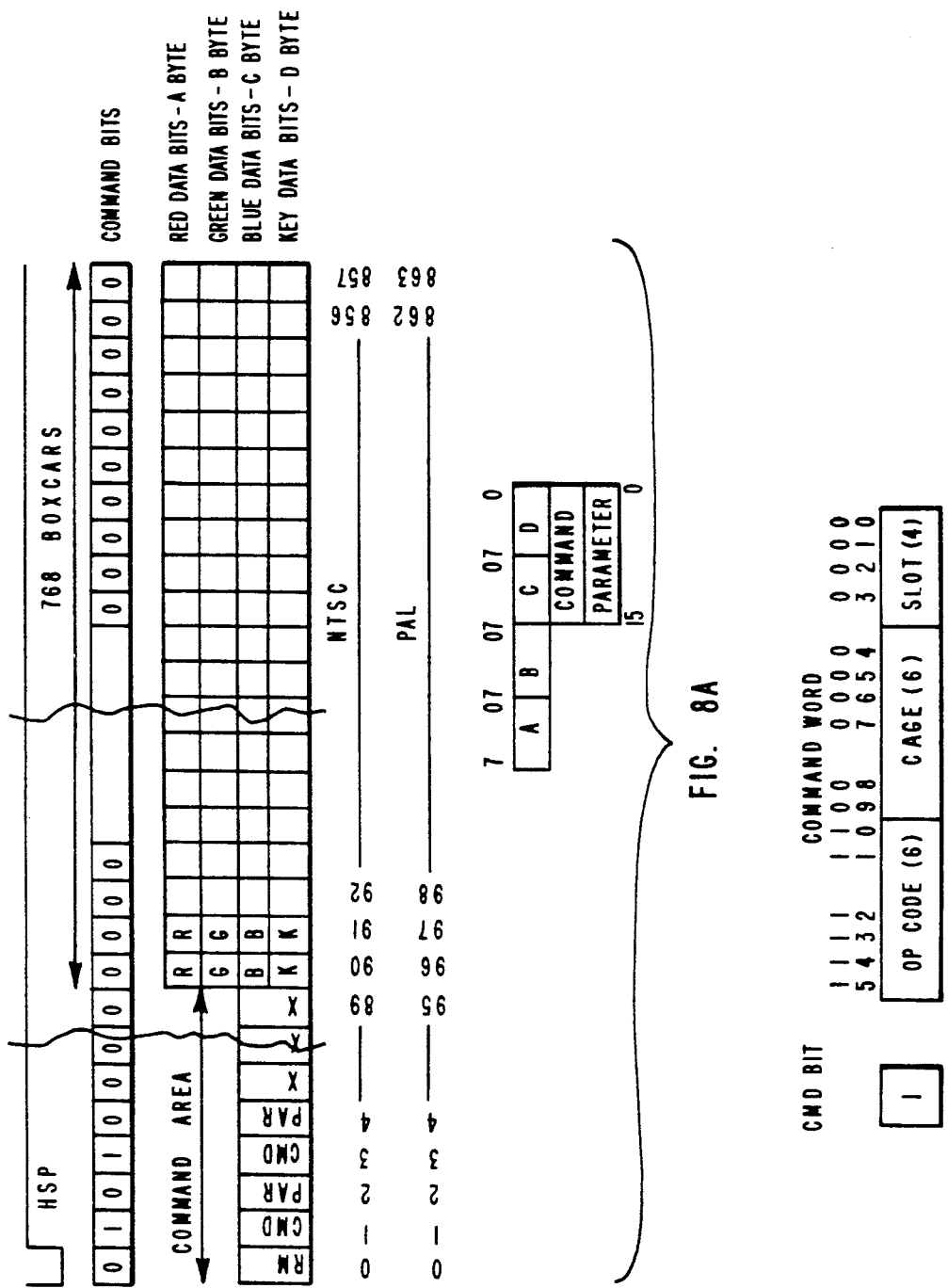

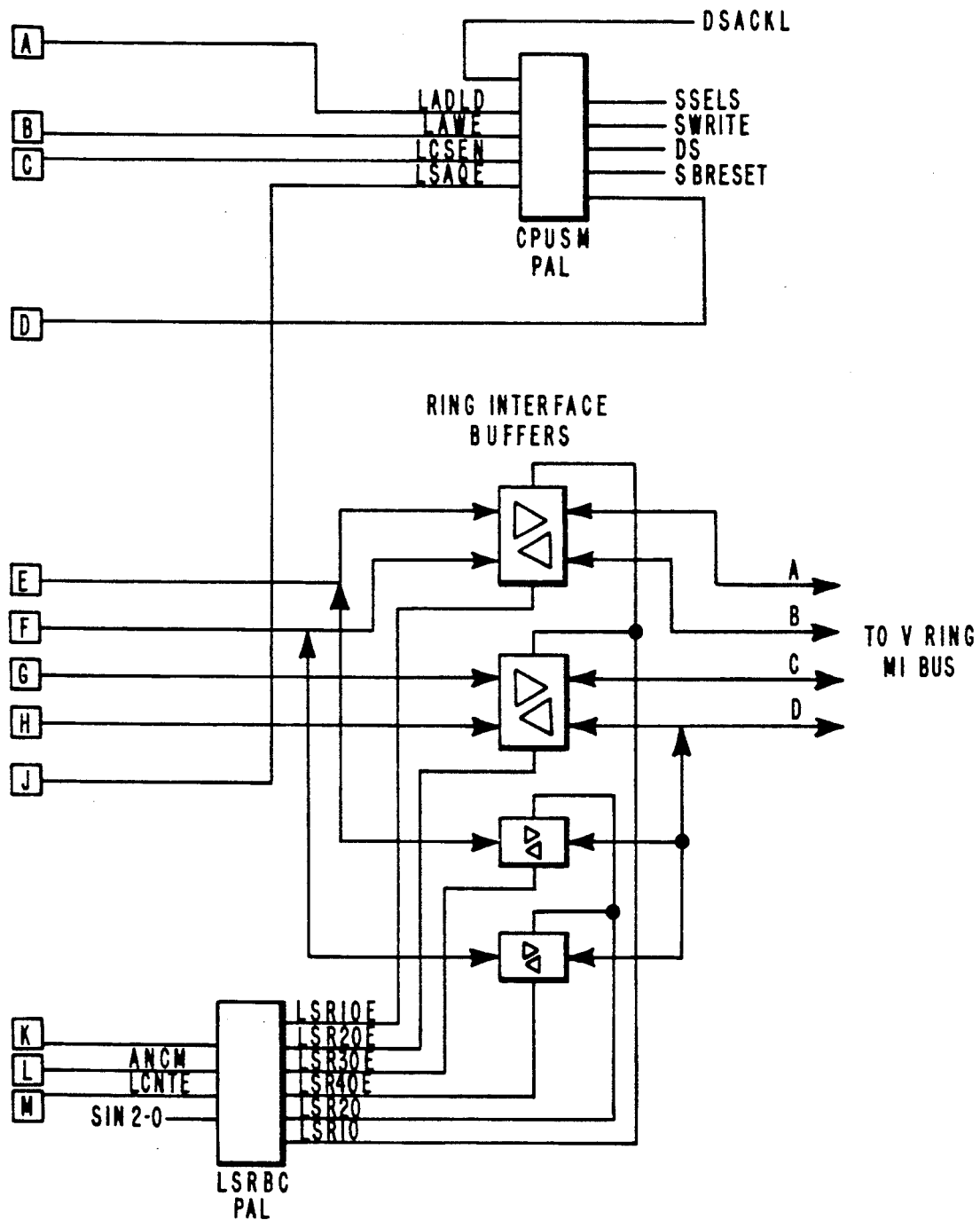
FIG. IIA-2

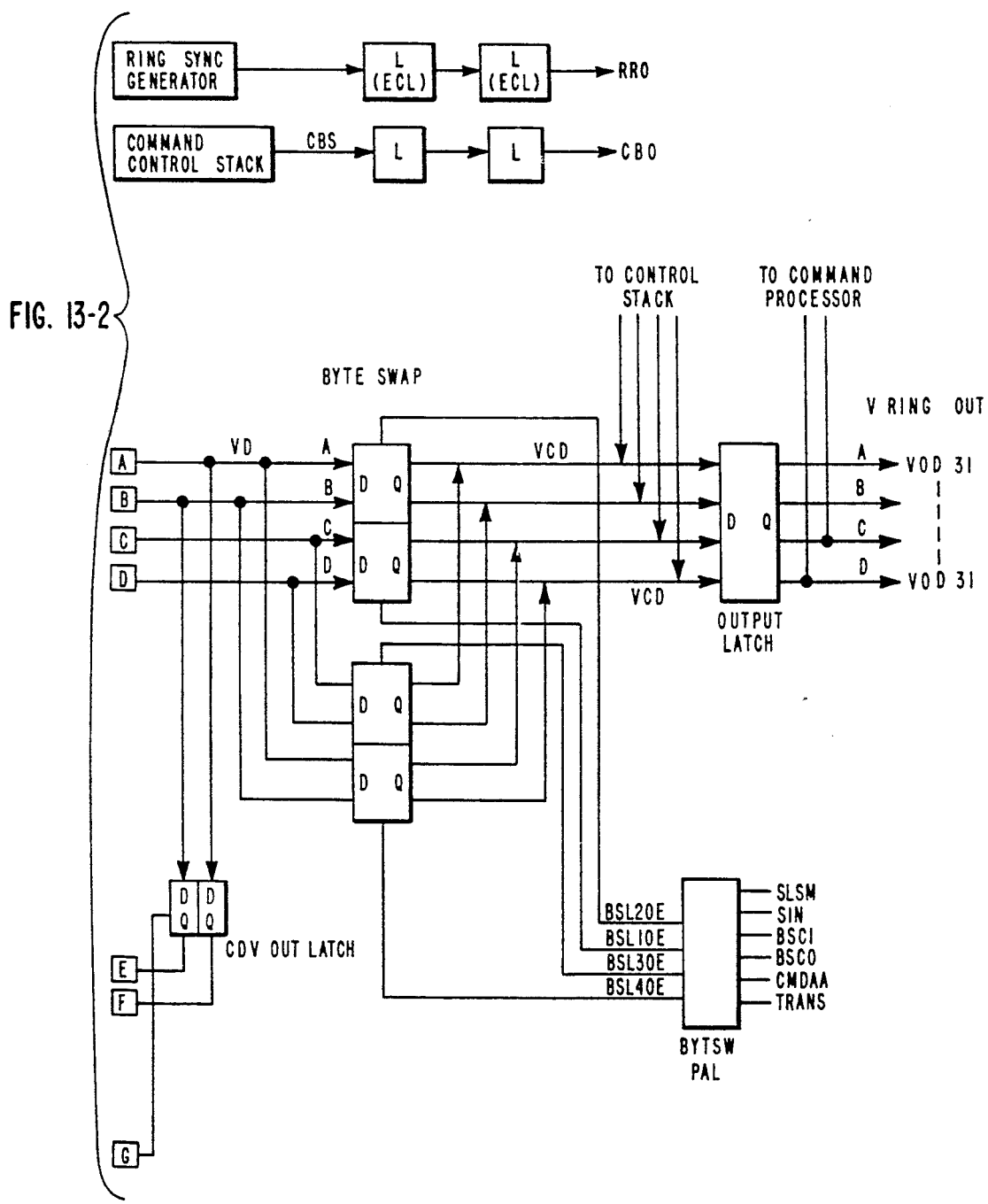

SYSTEM AND METHOD FOR HIGH SPEED COMPUTER GRAPHICS IMAGE COMPUTATION USING A PARALLEL CONNECTED, ASYNCHRONOUS MULTIPROCESSOR RING COUPLED TO A SYNCHRONOUS SPECIAL PURPOSE VIDEO PROCESSING RING

BACKGROUND

A. The Field of the Invention

The present invention relates to high performance computer graphics image computation system architectures and methods of efficiently carrying out computer graphics image computation tasks. More particularly, the present invention is directed to a system and method for computer graphics image computation which utilizes a novel system architecture comprised of a computational processor ring which includes a plurality of closely coupled, parallel connected, asynchronously operated processors having a plurality of interconnecting data paths to a special purpose video processor ring which includes a plurality of synchronously operating video processors which cooperate to rapidly move large amounts of image data from location to location in the computer graphics image computation system.

B. The Background Art

The field of computer graphics is growing rapidly in all segments of modern society, including entertainment, science, industry, and military applications. As the power and availability of digital computing devices increases, the variety of specific applications using computer graphics also increases. The phrase "computer graphics," in sense as used herein, should be understood to include any application in which digital data is generated or manipulated to create a visually perceptible image. For example, computer graphics may involve digitizing an original real image and altering or manipulating the resulting digital data to produce a generated image different in some way from the original real image. In contrast, it may be that the image which is generated and presented to a user never existed previously except as a computer model consisting of data which was modeled, animated, and rendered to produce the final generated images.

In general, and particularly in the case of computer modeled, animated, and rendered images, the number of calculations which must be performed to create even one frame of a high resolution animated sequence far exceeds the capacity of most general purpose computers used, for example, in a business setting. Moreover, in the commercial applications of computer graphics, particularly in the entertainment and mass media industry, the meeting of very tight schedules and close deadlines requires that complex computer graphics sequences be completed very quickly. Meeting such tight schedules and close deadlines is crucial to the success of a commercial endeavor.

In order to produce computer systems capable of producing graphic images within reasonable time periods, suppliers of such systems have manufactured highly specialized hardware just for the purpose of generating computer graphics. Disadvantageously, such specialized hardware is incompatible with other manufacturers' hardware or is unable to emulate other manufacturers' systems or resulting images.

Moreover, the previously available computer systems which were dedicated to performing computer graphics were inflexible and could not be adapted to the particular needs of the user or the task at hand. For example, such dedicated computer graphics hardware may unalterably allocate one quarter of its resources to performing modeling tasks, one half of its resources to animation tasks, and the remaining resources to rendering tasks. Significantly, the needs of the user often do not match such an allocation of system resources. Furthermore, the dedicated hardware used in previously available systems often becomes obsolete soon after its release due to advances in the art.

In view of the drawbacks and disadvantages found in the prior state of the art, it would be an advance in the art to provide a computer system adapted for producing graphic images which is configurable so as to allow the hardware resources to be allocated to different tasks as the need arises. It would be yet another advance in the art to provide a computer graphics image computation system which may be adapted to input and output video information from several different peripheral devices and which can efficiently carry out the tasks of modeling, animating, and rendering of computer graphic images.

It would be a further advance in the art to provide a computer graphics image computation system which allows the images which have been stored or computed to be rapidly distributed to locations within the system or transferred to external video devices. It would also be an advance in the art to provide a computer graphics image computation system which utilizes a standard digital video signal to move image data within the system such as can be readily used by external video devices. It would also be an advance in the art to provide a computer graphics image computation system in which the number of components which can be incorporated therein may be expanded to accommodate the changing needs of the user.

OBJECTS AND BRIEF SUMMARY OF THE INVENTION

In view of the foregoing, it is a primary object of the present invention to provide a system and method for high speed computer graphics image computation.

Another object of the present invention is to provide a system and method for computer graphics image computation which can efficiently carry out modeling, rendering, and animating tasks and allows its hardware resources to be variably allocated among different tasks.

A further object of the present invention is to provide a system and method for computer graphics image computation which incorporates a pathway for transferring digitally encoded video images at high speed.

Still another object of the present invention is to provide a system and method for computer graphics image computation which allows a plurality of video processors to be synchronously linked together.

Yet another object of the present invention is to provide a system and method for computer graphics image computation which produces images that emulate the images generated by other computer graphic systems.

These and other objects of the present invention may be learned by examining the following disclosure and by practicing the invention as taught herein.

The present invention utilizes both a novel system architecture and arrangement of software to achieve the above-stated objects as will be briefly summarized below.

The computer graphics image computation system of the present invention utilizes hardware structures which are referred to herein as a processor ring (hereinafter P-ring), a video ring (hereinafter V-ring), and a plurality of local buses which directly interconnect at least one of the computational processors or computational subsystems, which make up the processor ring to at least one of the video processors which make up the video ring. Using this architecture, data can rapidly travel on the P-ring, the V-ring, and between the V-ring and the P-ring.

Importantly, the architecture of the processor ring closely couples a plurality of powerful computational subsystems. The P-ring when coupled with the V-ring provides a novel, flexible, and powerful computer graphics image computation system.

The novel architecture of the video ring includes a plurality of video processors which synchronously operate in real time to rapidly move digital video image data around the V-ring. The architecture of the V-ring and its accompanying method, enhances the graphic image computational power of the computational subsystems on the P-ring by providing a structure specifically adapted to move large amounts of data in the form of video images from one location in the system to another. The present invention's combination of digital computing, carried out on the P-ring, with digital video processing, carried out on the V-ring, results in a system better able to carry out computer graphics tasks than any previously available system.

The high performance of the P-ring makes it particularly suitable for carrying out computer graphics image computation tasks. The architecture and software systems of the P-ring allow the computational subsystems of the P-ring to be grouped as one or more logical machines devoted to a particular graphics computation task. For example, all of the computational subsystems, may be devoted to a single task; e g., modeling, animating, or rendering. Alternatively, the computational subsystems on the P-ring may be divided into a plurality of logical machines, one computer graphics image computation task being assigned to each such logical machine. The ring architecture of the P-ring allows digital information to be distributed among the processors very quickly.

Each of the processors, or computational subsystems, on the P-ring operates asynchronously from the other processors on the ring. Thus, when one processor is finished with a task, it can dispatch the results of its work over the P-ring and may receive further instructions and data without waiting for any other processor to complete its immediate task.

Complete information concerning the P-ring can be found in the U.S. patent entitled "System and Method for High Speed Digital Computing Using an Asynchronous Multiprocessor Ring Having Parallel Data Transfer Connections," filed concurrently herewith as U.S. patent application Ser. No. 265,425, which is hereby incorporated herein by reference.

In contrast to the P-ring, the V-ring is intended to synchronously move lines and frames of digital video signals among video processors at video rates and in a digital video format. As noted, digital video signals require that massive amounts of data be processed, particularly when multiple frames are being processed to form an animated sequence.

In order to handle such large amounts of data, digital video signals are passed from the first video processor in the V-ring to the last video processor synchronously and in real time which allows digital video images from an external source, such as a video tape recorder or a disk drive, to be distributed downstream to one or more video processors on the V-ring. Since data may only travel in one direction on the V-ring, i.e., "downstream," "upstream" travel of data is accomplished by passing the data through the last downstream processor and storing the data line-by-line in a line store and then reinserting the stored data into the digital video signal train at the first video processor. A ring is thus formed whereon digital video signals may be moved in real time.

When moving data downstream, a digital video signal representing an entire frame is moved through the V-ring in the time required to complete one video frame. When moving data upstream, a digital video signal representing an entire frame is moved through the V-ring in the time required to complete two video frames or two "frame times". Frame time, as used herein, means that if the output of a video processor were monitored it would appear as a normal video image to a viewer, whether the video standard being used is NTSC, PAL, or some other standard.

The additional frame time is required because each line of a video signal is moved into the line store in one "line time" and then the contents of the line store is moved to the next video processor in another line time. Thus, a total of two line time periods and a total of two frame time periods is required to move a line and a frame, respectively, upstream on the video ring.

The video processors may be digital frame buffers which are used to merely store a digital video frame. Alternatively, the video processor may be active processing devices such as devices used for digital filtering, digital video effects, raster manipulations, as well as other "real time" digital video devices. Digital video signals are sent downstream on the V-ring in "digital video signal trains" which include both a command portion and a pixel data portion containing the data for a video image.

A V-ring controller is part of the V-ring and functions as a means for inserting and removing video images on the V-ring. The V-ring controller also functions as a means for generating commands which are sent on the V-ring to the video processors. Both the V-ring controller and the video processors receive commands directly from a computational subsystem on the P-ring by way of its respective local bus.

By combining the P-ring and the V-ring into a computer graphics image computation system, with a plurality of local communication paths between the P-ring and the V-ring, the computational processors and the video processors are allowed to exchange data rapidly and reliably. As stated previously, by providing for rapid exchange of information, the full power of parallel processing architecture of the P-ring can be realized. Furthermore, the described architecture is configurable meaning that the hardware may be assigned any one of several graphic image computation tasks by providing the proper programming.

During operation, a user at one of possibly many work stations directs the operation of the embodiment of the present invention. For example, a user may retrieve models of objects from mass storage and the tasks of altering, animating, and rendering the model may be distributed among the computational subsystems on the P-ring. Since each of the video processors on the V-ring is connected via its local bus to a computational subsystem, any combination of computational subsystems and video processors may be used as a modeling workstation, rendering workstation, or for any other task.

In such an arrangement, one or more computational subsystems may perform the computation intensive tasks with the user monitoring the results by way of the video output of the video processor. In this way, the components on the V-ring function to interface the high speed digital computing components of the P-ring with the video image processing components of the V-ring. The V-ring moves the video images which are created or manipulated under the direction of the user to points within the system or to an external video device such as a video tape recorder. The embodiments of the invention are not tied to a specific algorithm and thus can emulate the graphic images produced by other hardware or software schemes. Furthermore, the embodiments of the invention may be easily interfaced with other systems (both digital computing and video) and may be quickly adapted to changes in software and hardware.

BRIEF DESCRIPTION OF THE DRAWINGS

In the description which follows, and in the accompanying drawings, many of the figures have been divided into two parts in order to increase their clarity. Where a figure has been divided into two parts, the designation "-N" has been added as a suffix to the figure number where "N" is the part into which the figure has been divided. For example, in the high level block diagram provided in FIG. 1C, the figure has been divided into two parts designated as "FIG. 1C-1" and "FIG. 1C-2." In the case of figures which have been divided into two parts, the complete figure may be reassembled by placing the first part in the left position and the second part in the right position. Also, the boxed letter designations indicate interconnections between the different parts of the same figure.

Also, in the description which follows, including the glossaries, tables, and drawings, the symbols "!" or "*" associated with the mnemonic name of a signal all indicate the "NOT" condition of the signal.

Figure 1A:
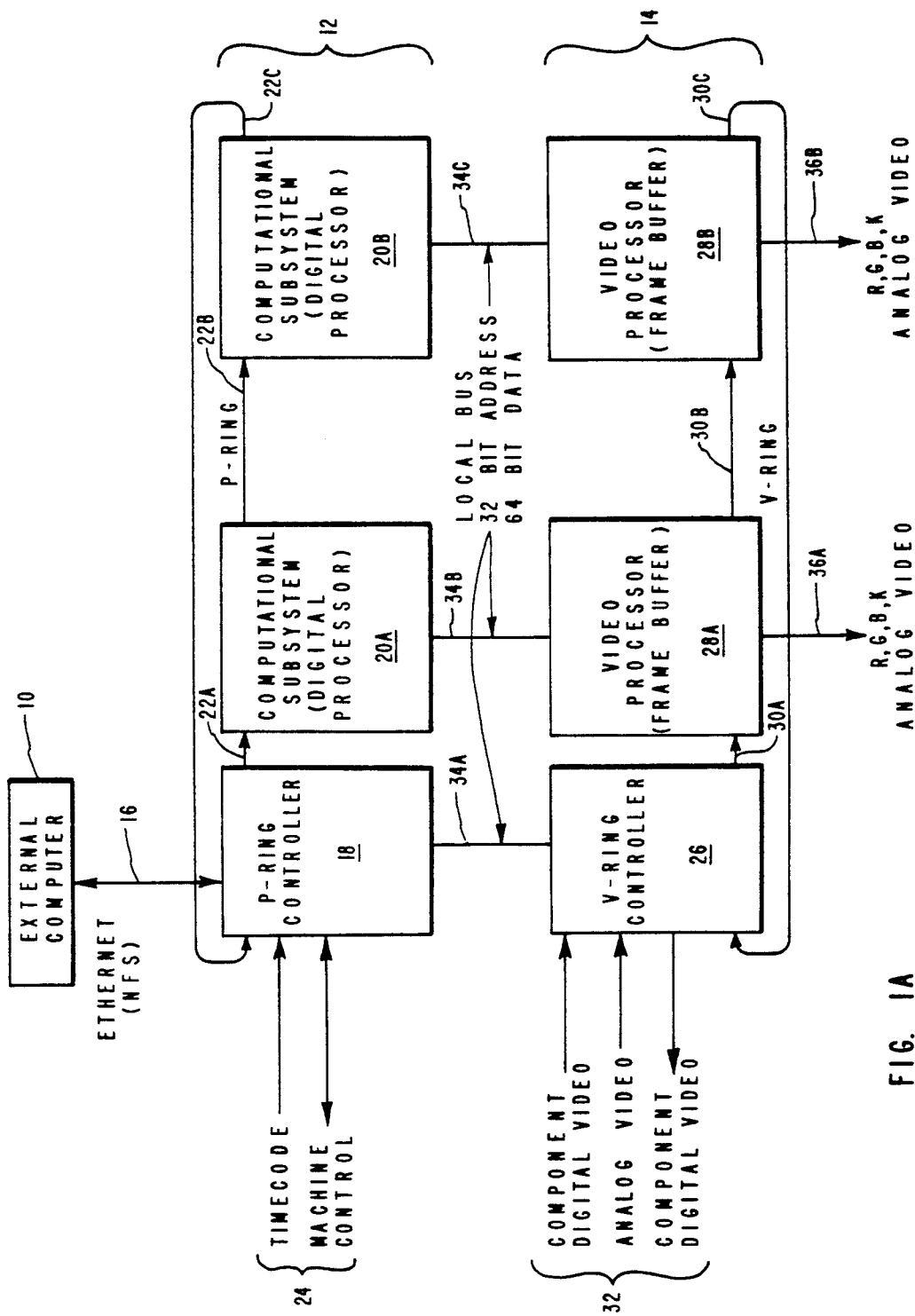

In order to more fully understand the manner in which the above-recited advantages and objects of the invention are obtained, a more particular description of the invention will be rendered by reference to specific embodiments thereof which are illustrated in the appended drawings. Understanding that these drawings do not depict all possible embodiments of the invention and are therefor not to be considered limiting of its scope, the presently preferred embodiments and the presently understood best mode of the invention will be described with additional detail through use of the accompanying drawings, in which:

FIG. 1A provides a high level block diagram representing the general architecture of the presently preferred embodiments of the present invention.

Figures 1, 1B, 2:
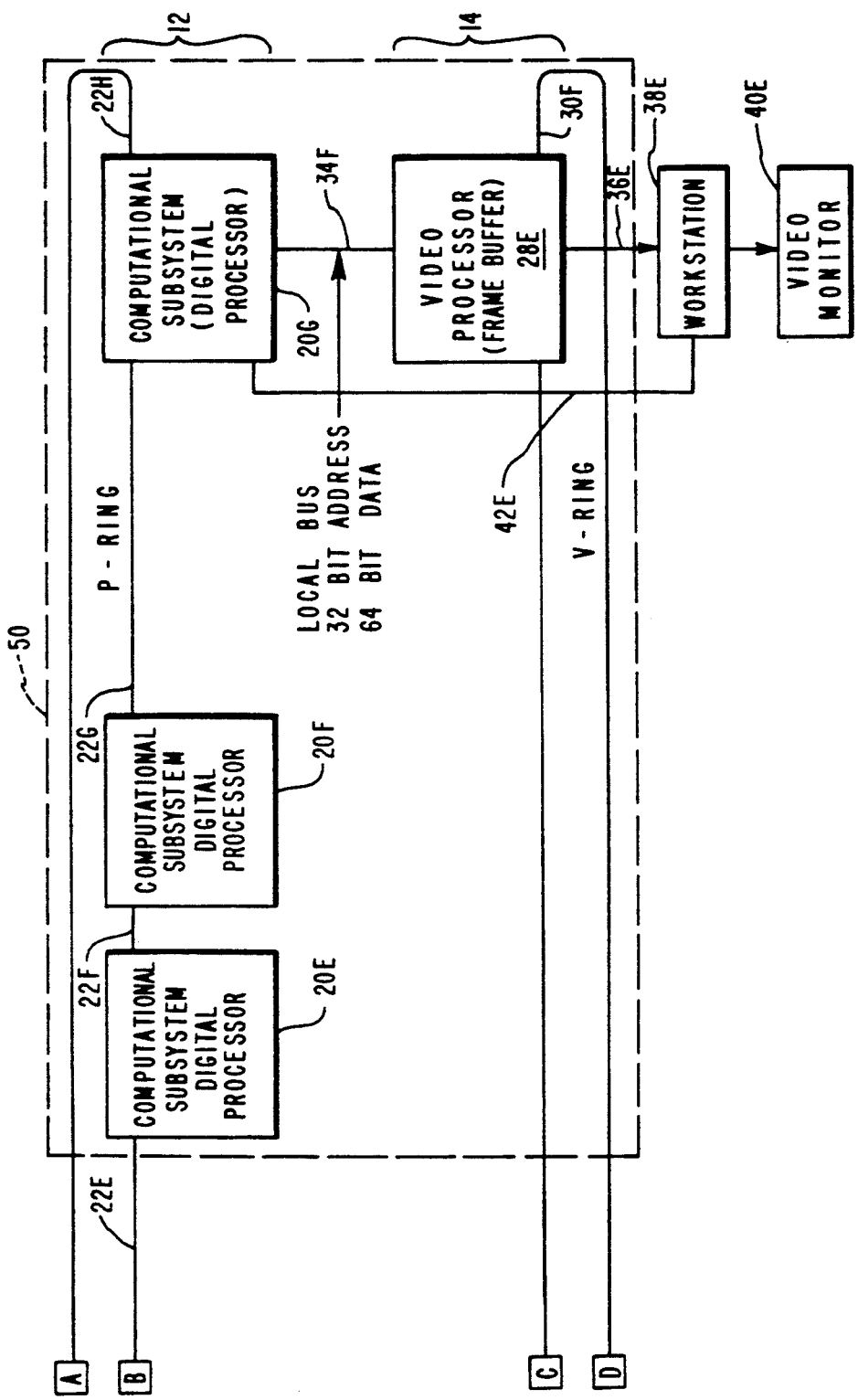

FIGS. 1B-1 and 1B-2 provide a high level block diagram representing embodiment of the present invention having the architecture illustrated in FIG. 1A and configured to carry out particular computer graphics image computation tasks.

Figures 1, 1C:
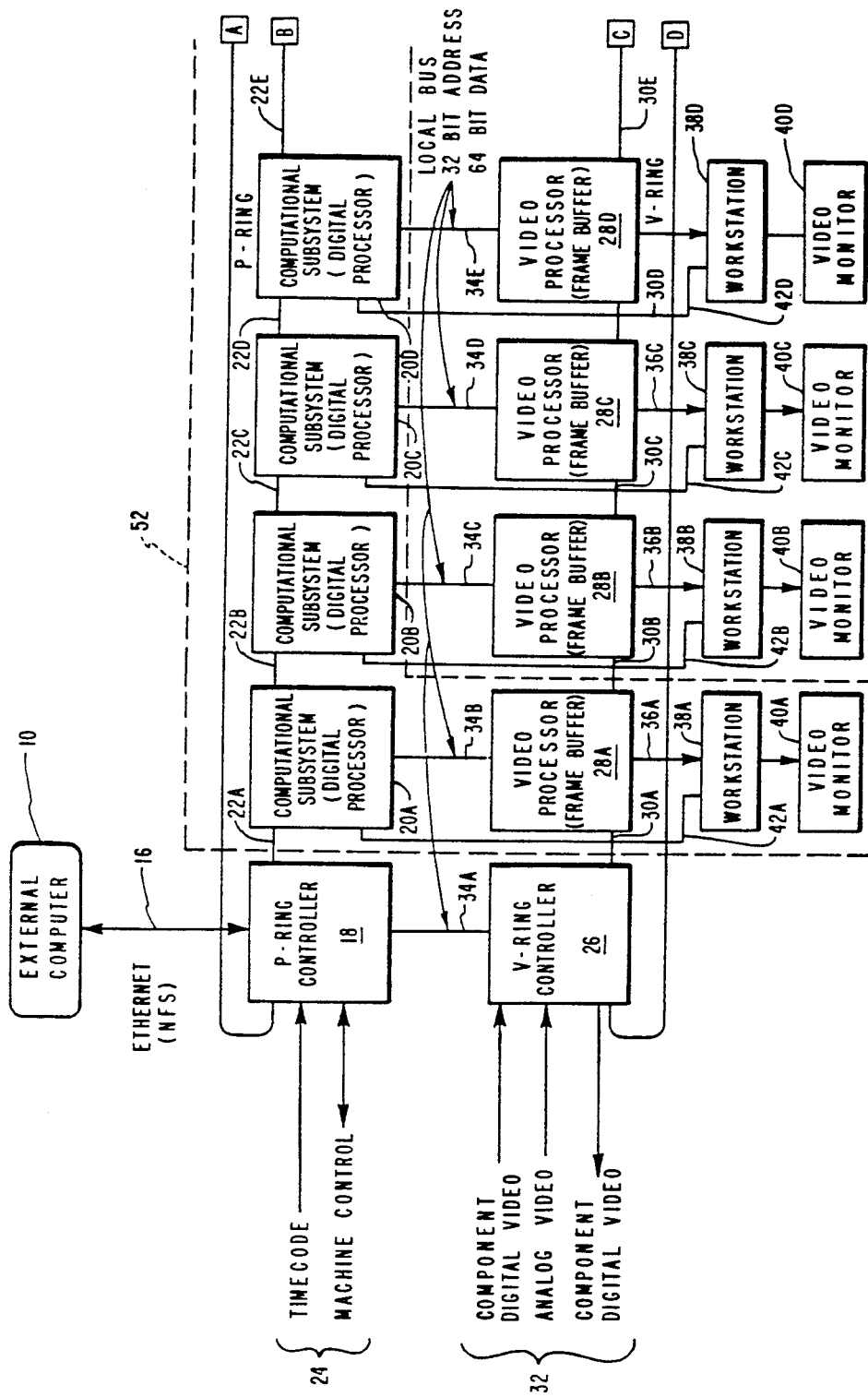
Figures 1, 1C, 2:
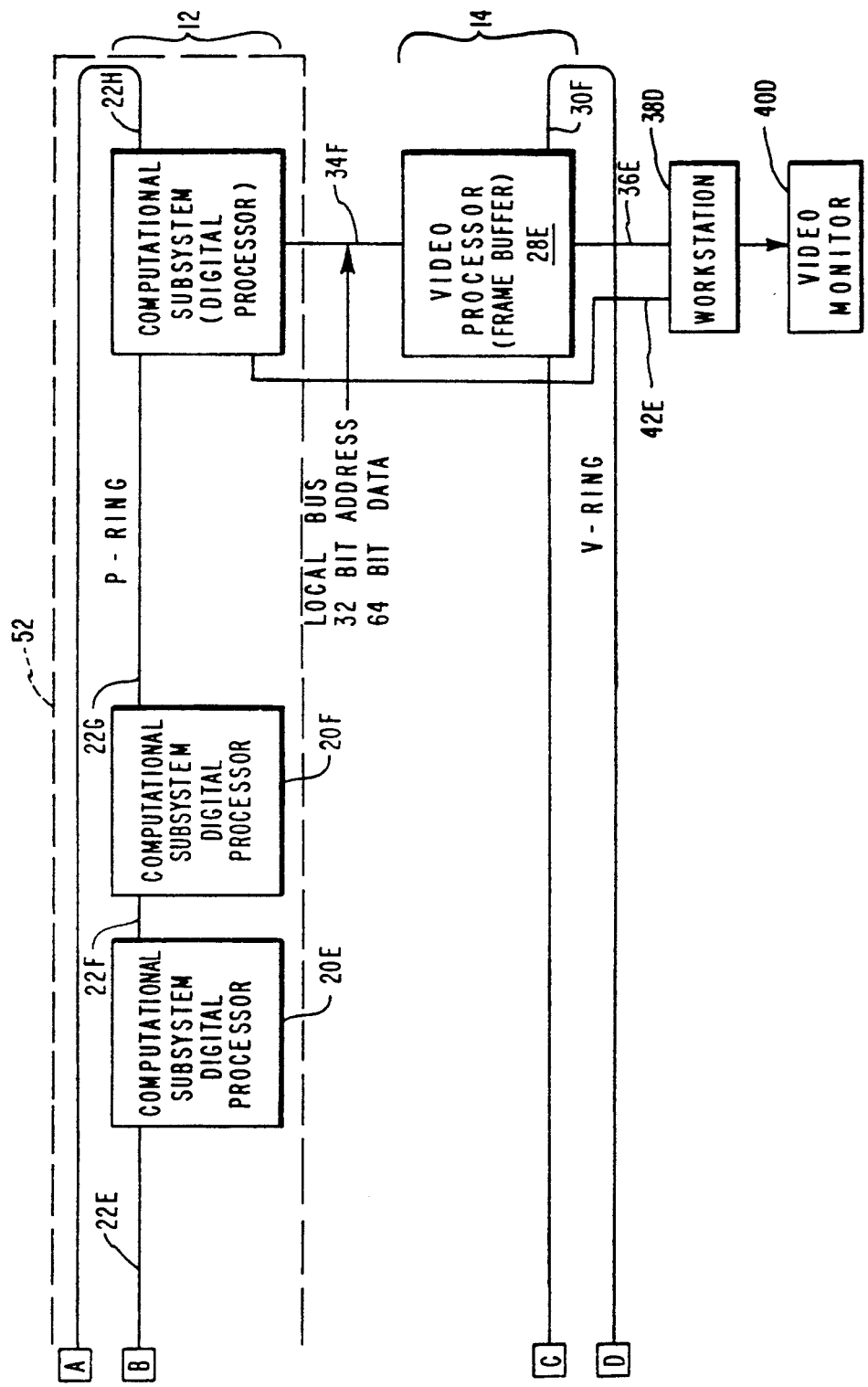

FIGS. 1C-1 and 1C-2 provide a high level block diagram representing the embodiment illustrated in FIG. 1B but having a different configuration which is adapted to carry out other computer graphics image computation tasks.

Figure 2A:
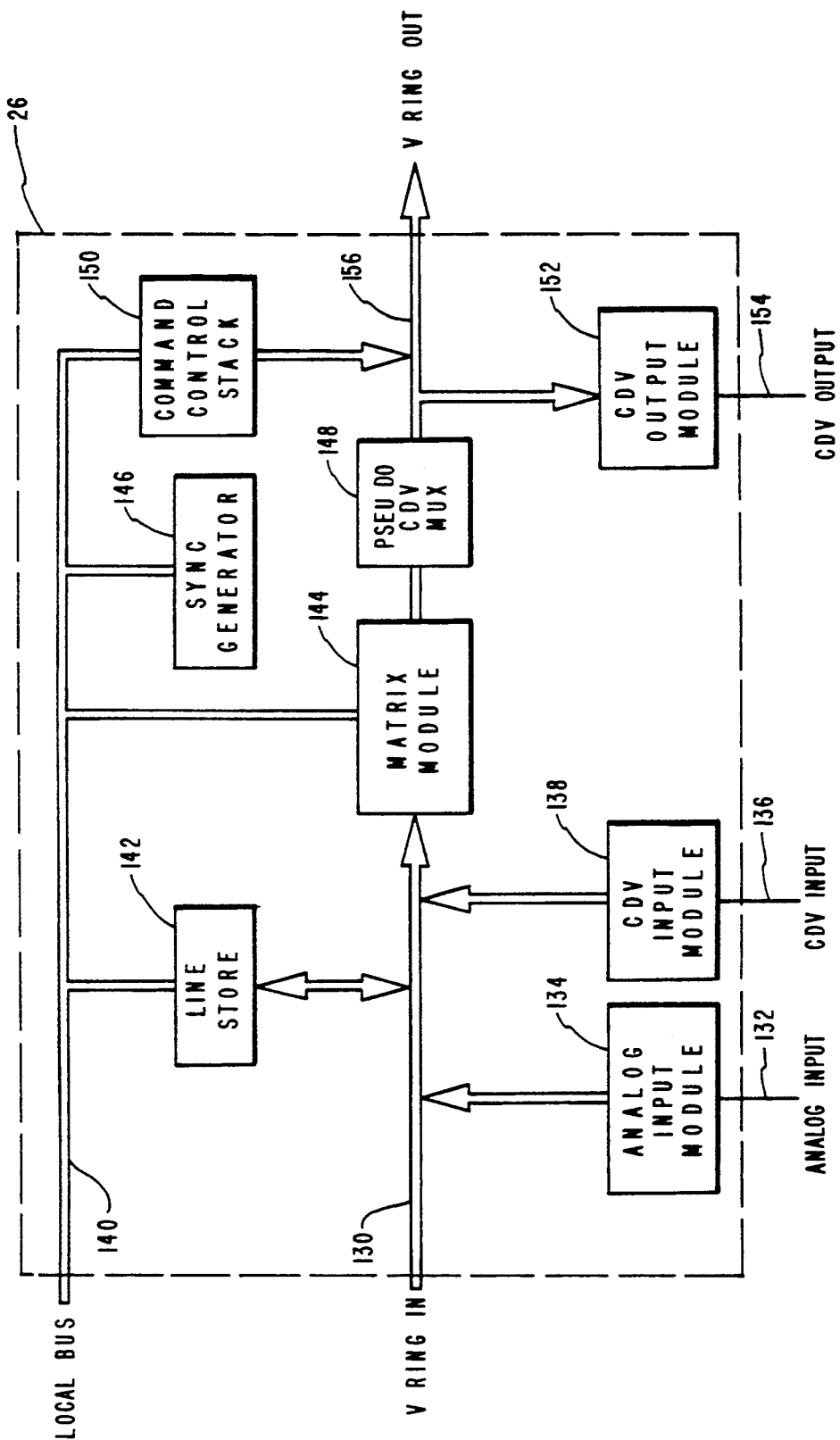

FIG. 2A provides a high level block diagram representing the principal functional structures of the V-ring controller represented in FIG. 1A.

FIG. 2B provides a high level block diagram representing the principal functional structures of the video processors (frame buffers) represented in FIG. 1A.

Figures 1, 3:
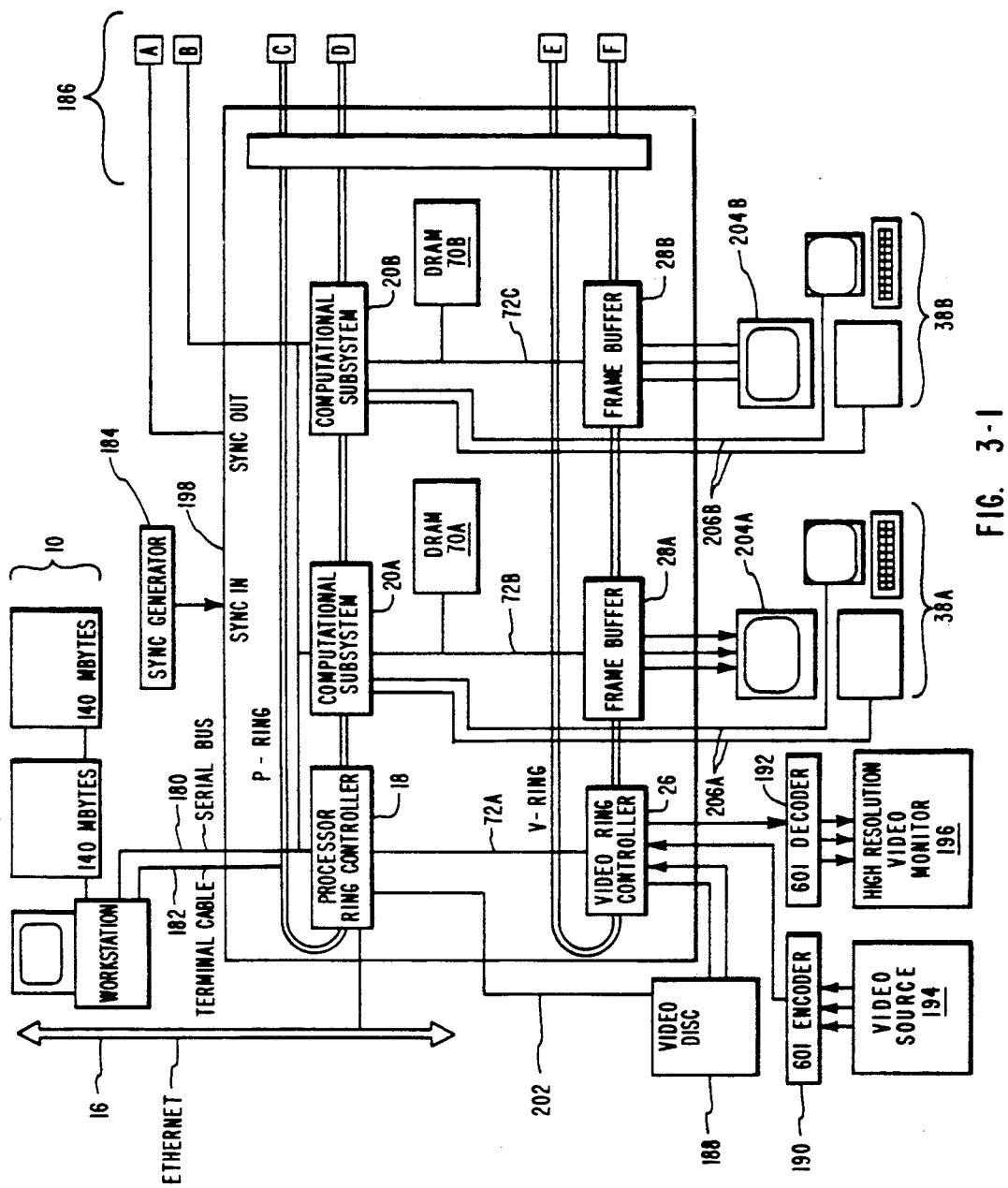
Figures 2, 3:
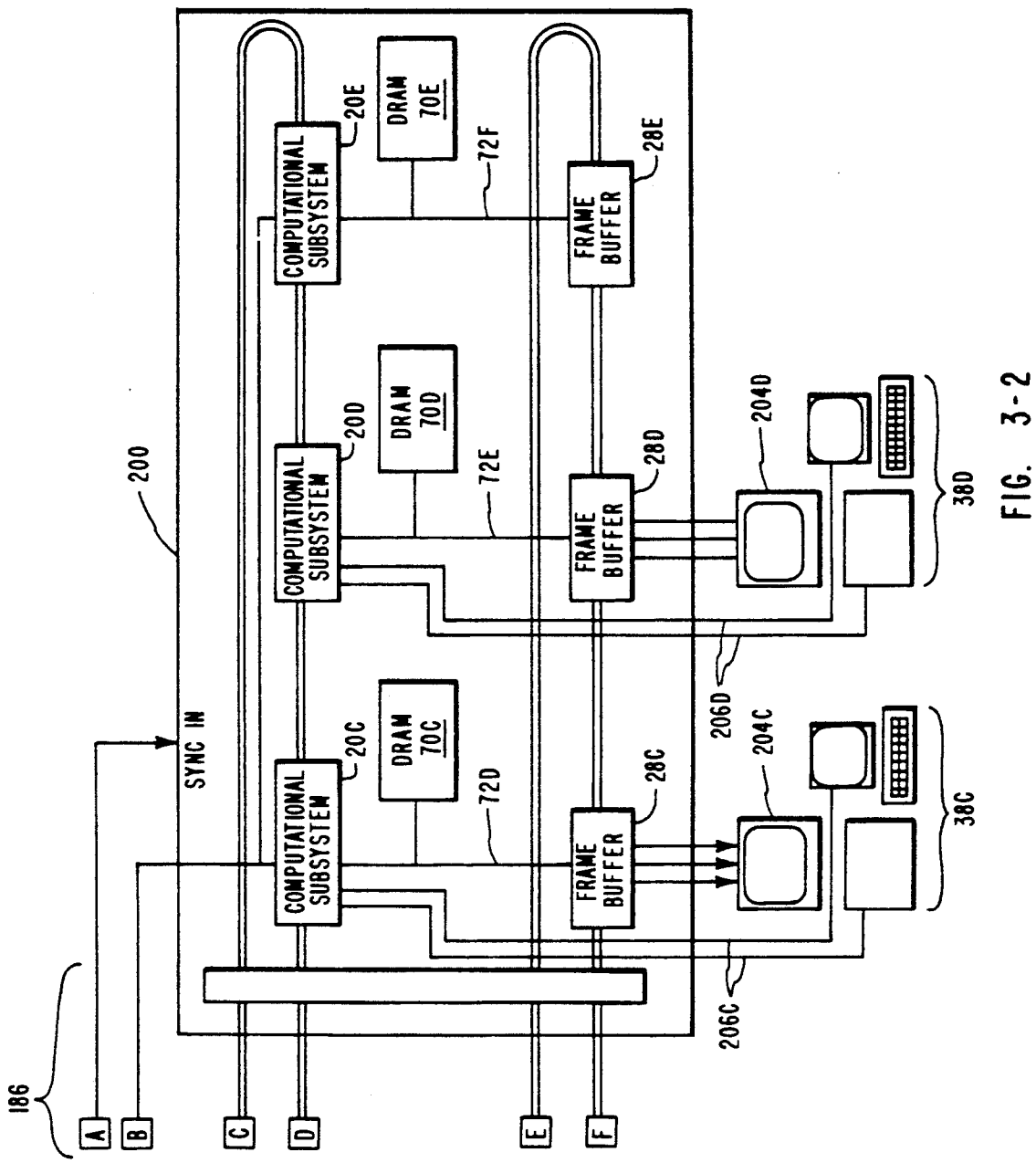

FIGS. 3-1 and 3-2 provide a high level block diagram representing a computer graphics image computation system including representative peripheral devices.

Figure 4:
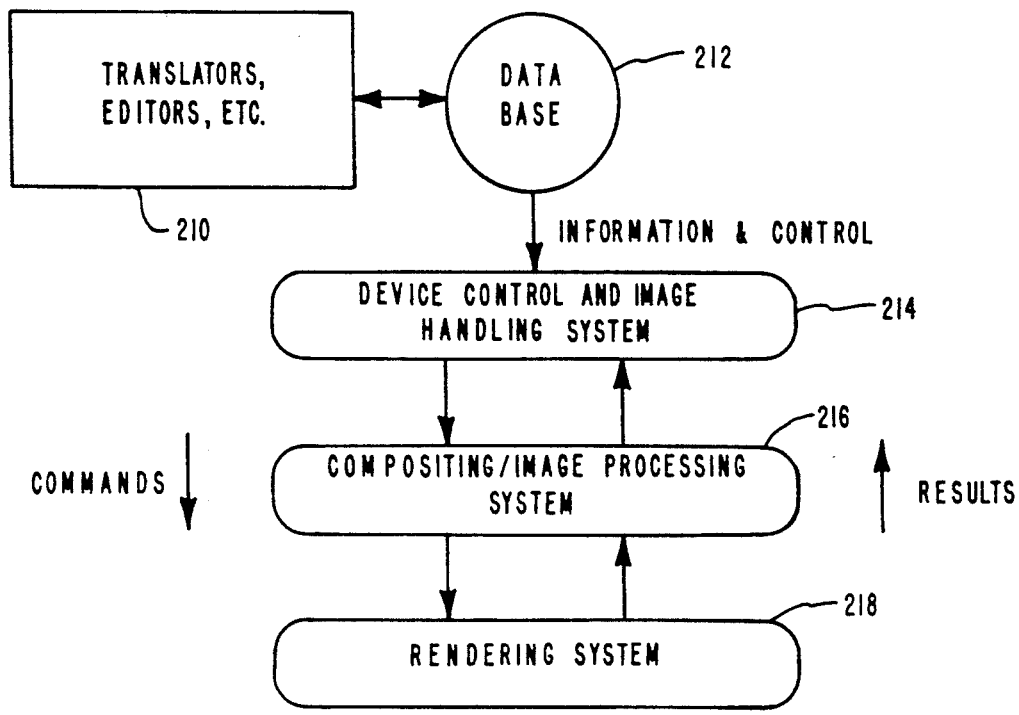

FIG. 4 provides a diagram representing the organization of a software application system for use in the presently preferred embodiments.

Figure 5:
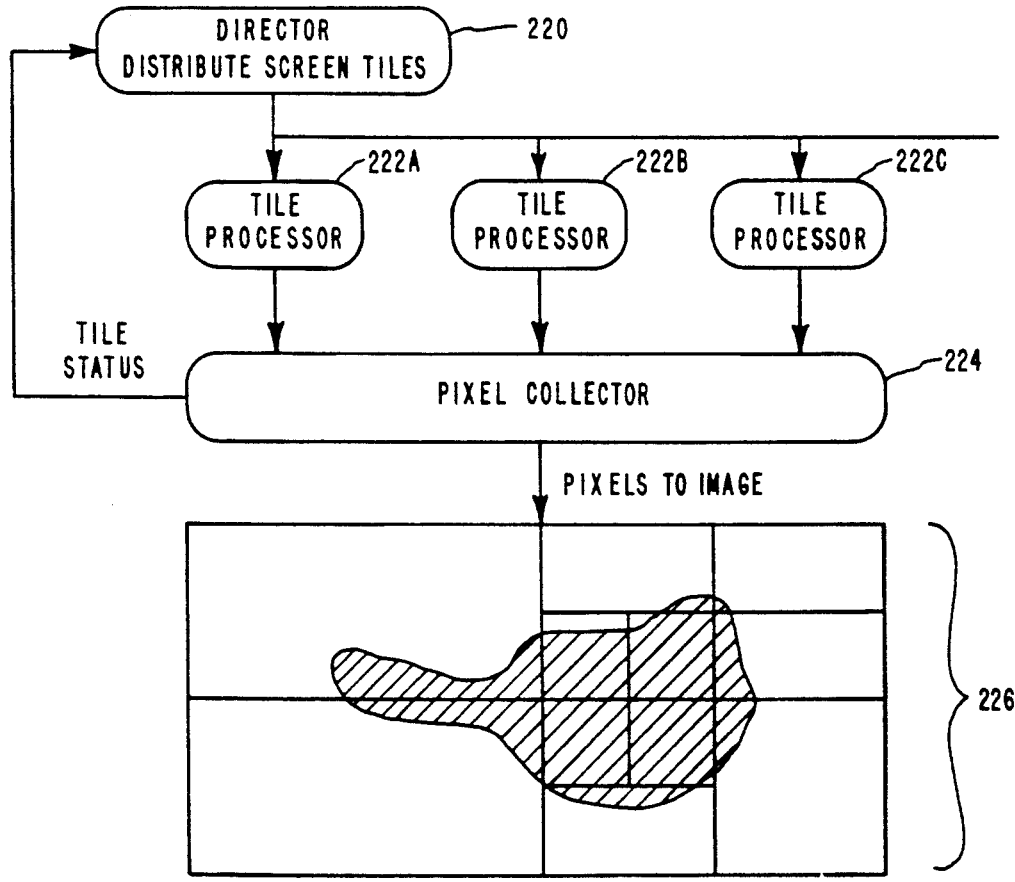

FIG. 5 provides a diagram representing the organization of an application software system suitable for rendering of computer images in the presently preferred embodiments.

Figure 6:
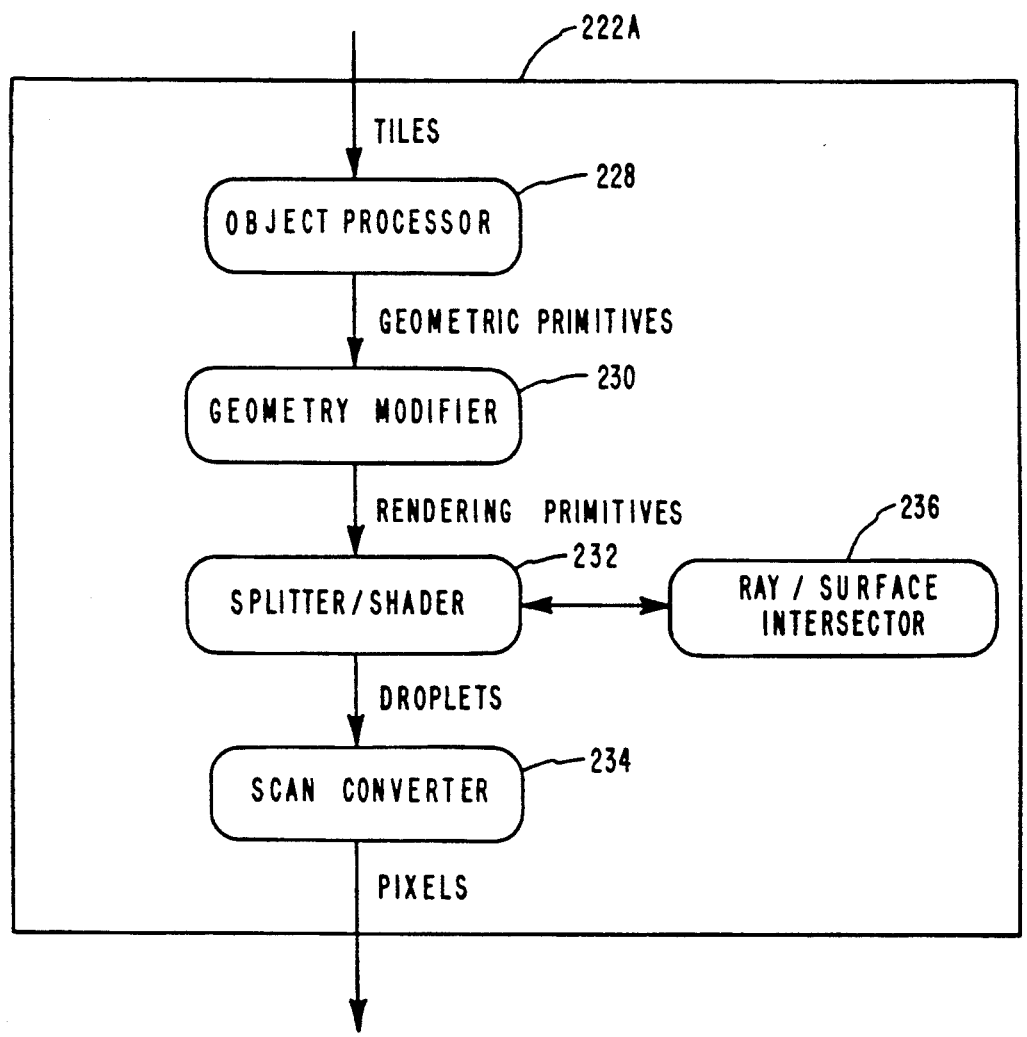

FIG. 6 provides a block diagram representing the tile processor blocks illustrated in FIG. 5.

Figures 1, 7:
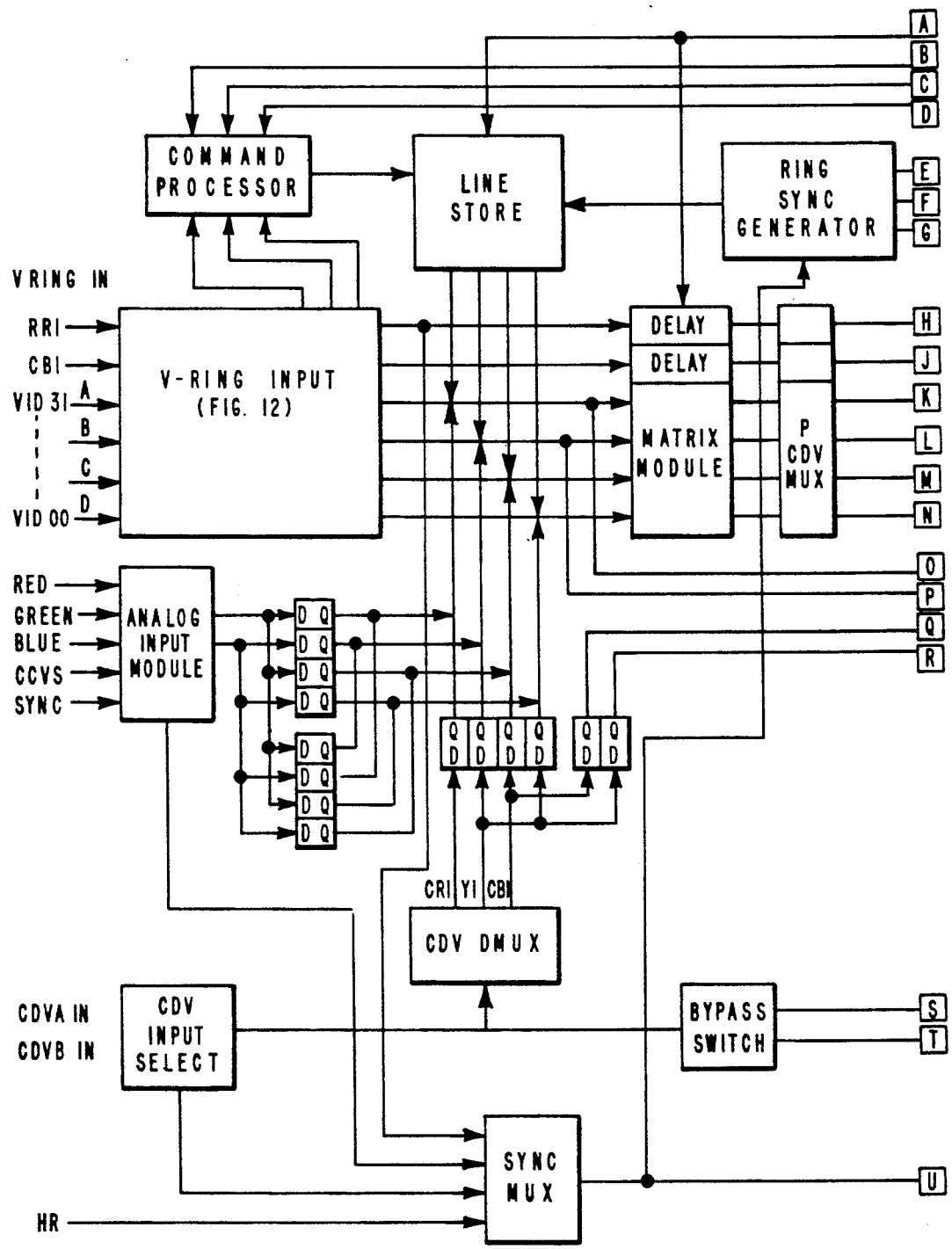
Figures 2, 7:
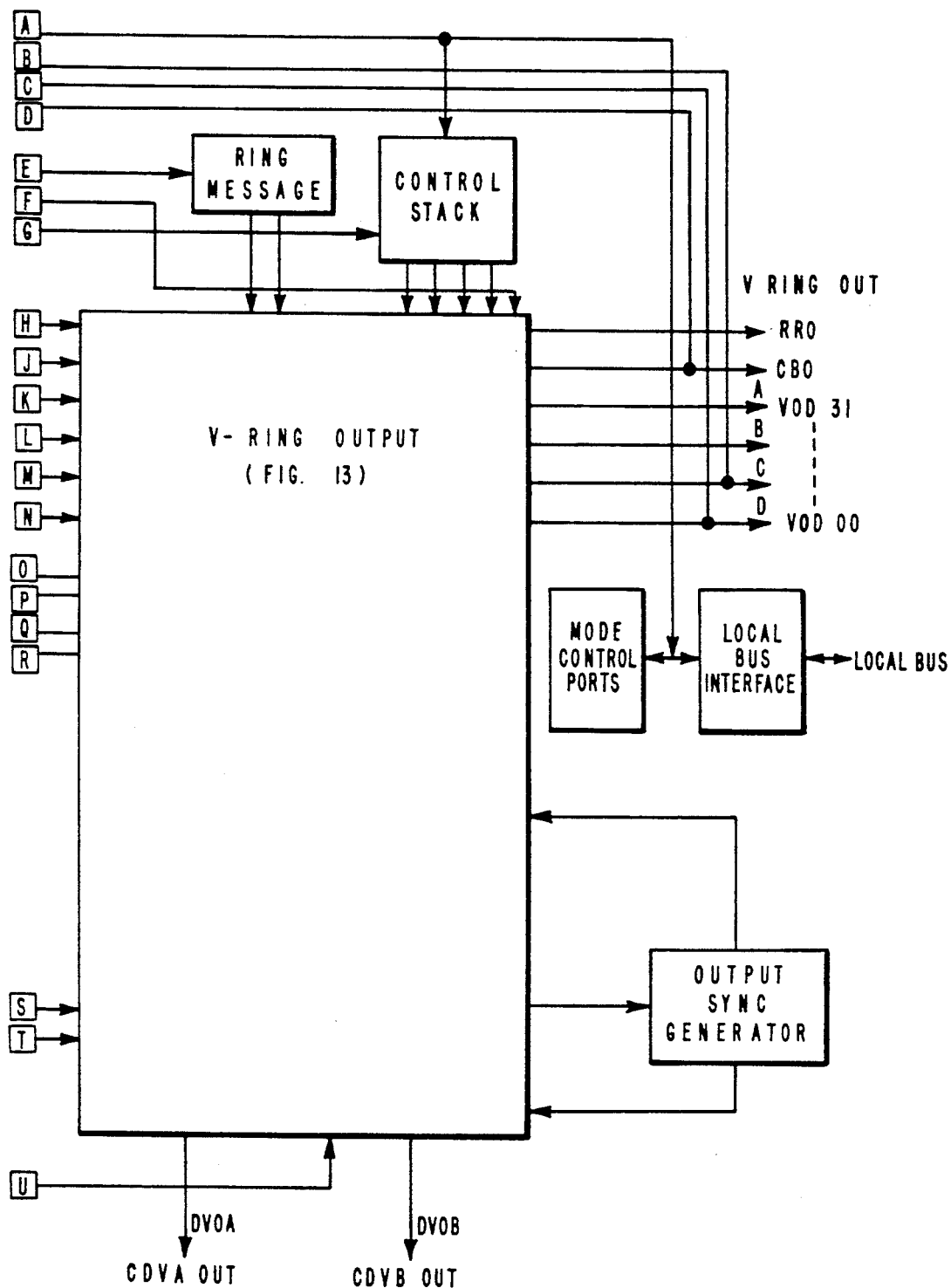

FIGS. 7-1 and 7-2 provide a block diagram of a representative embodiment of the V-ring controller illustrated in FIG. 2A.

FIGS. 8A-8I provide a representation of the organization of the video signals and commands present on the presently preferred embodiment of the video ring.

FIGS. 9A-9D provide high level block diagrams illustrating the paths taken by video signals through the structures of the V-ring controller represented in FIG. 7.

Figures 1, 10A:
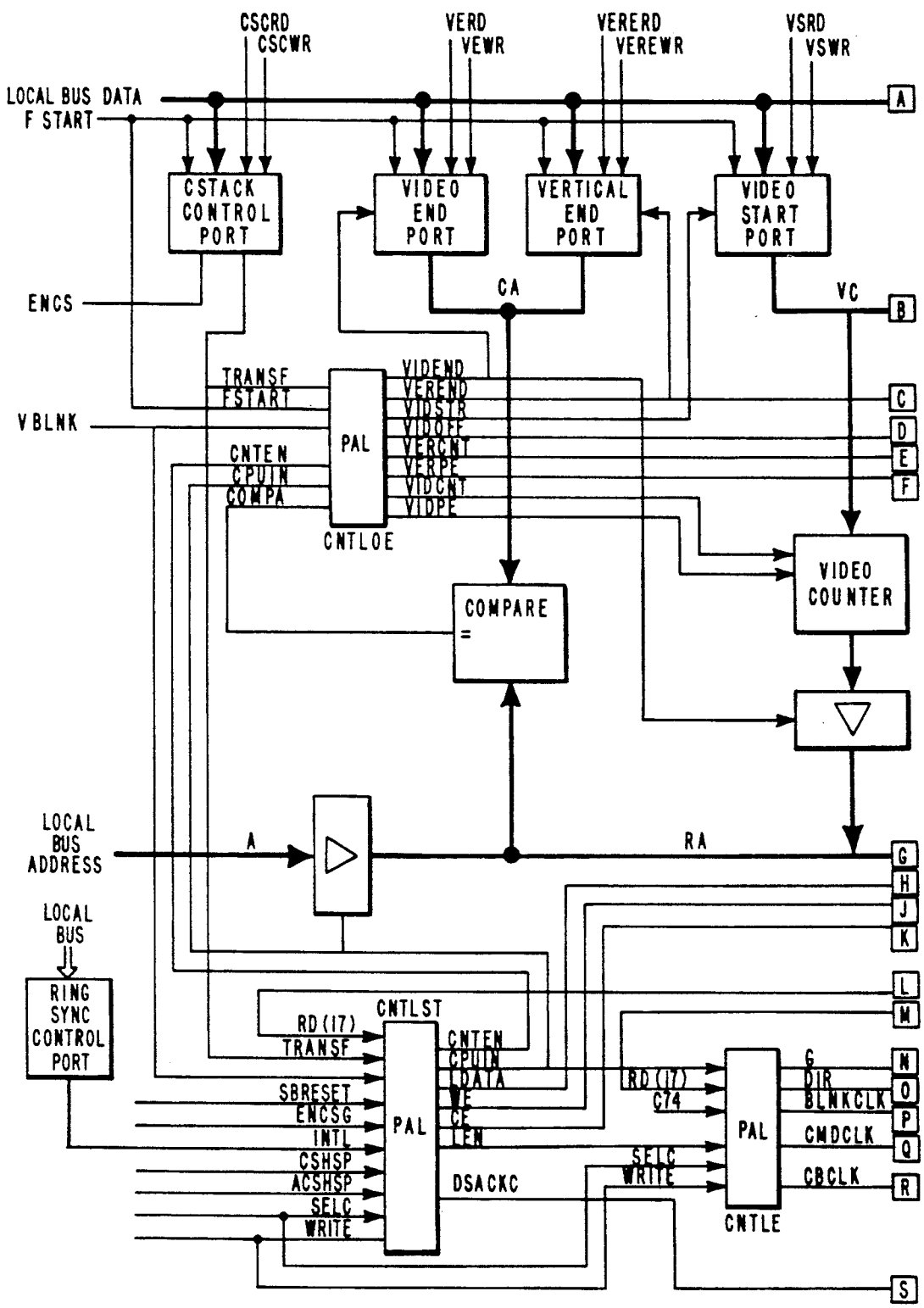
Figures 2, 10A:
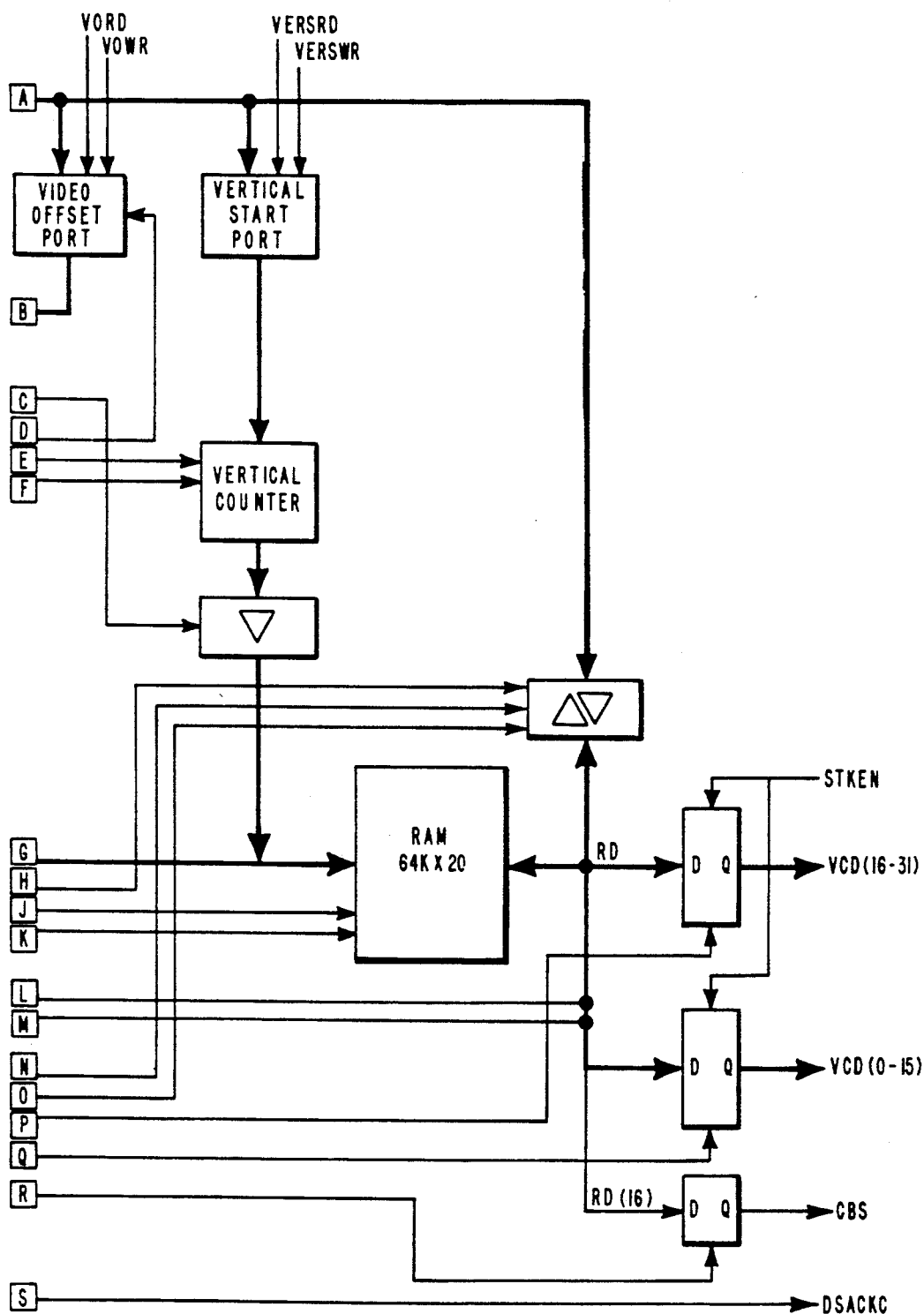

FIGS. 10A-1 and 10A-2 provide a block diagram illustrating the structure of the command control stack of the V-ring controller represented in FIG. 7.

Figure 10B:
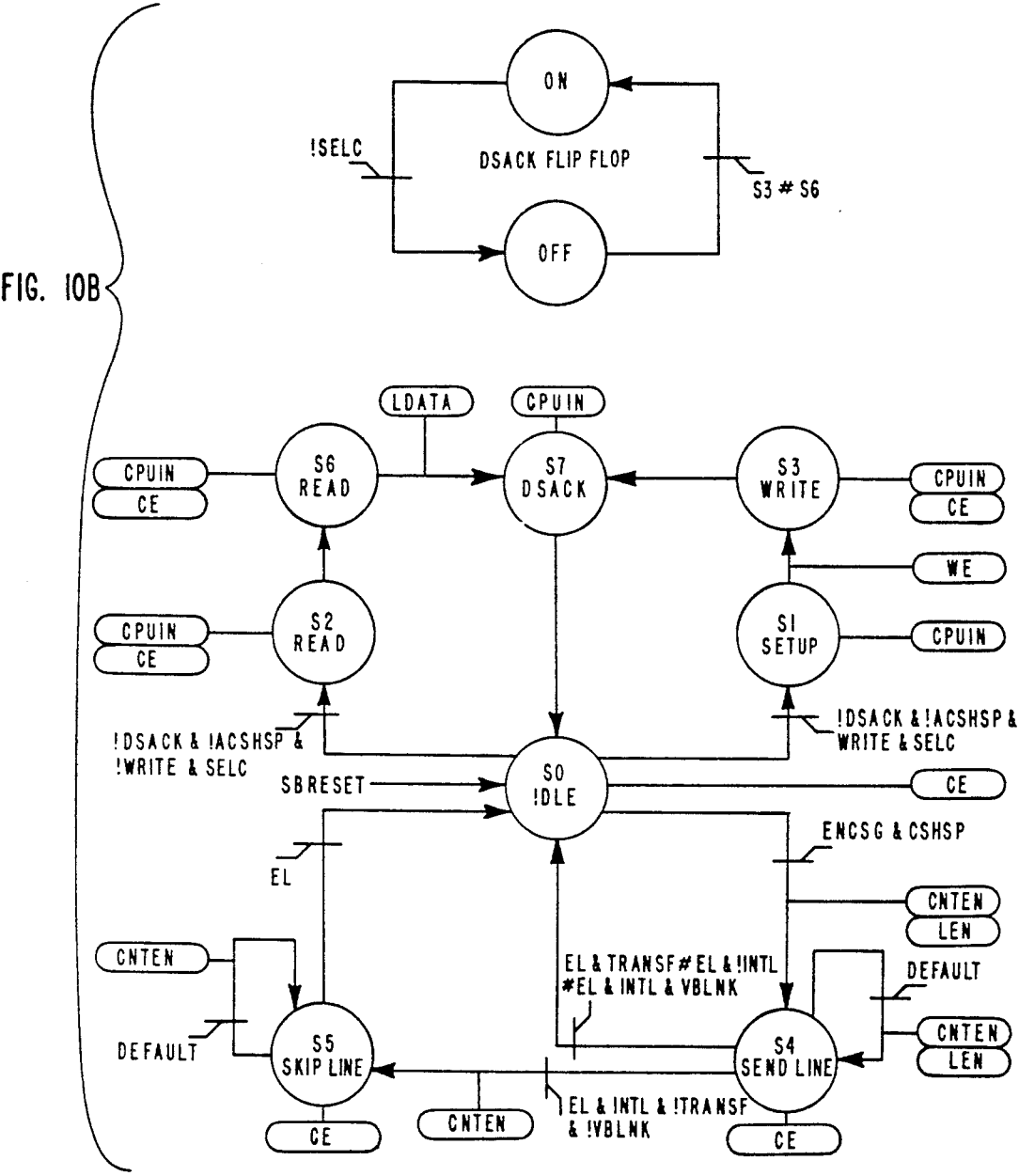

FIG. 10B provides a state diagram for the command control stack state machine represented in FIG. 10A.

Figures 1, 11A:
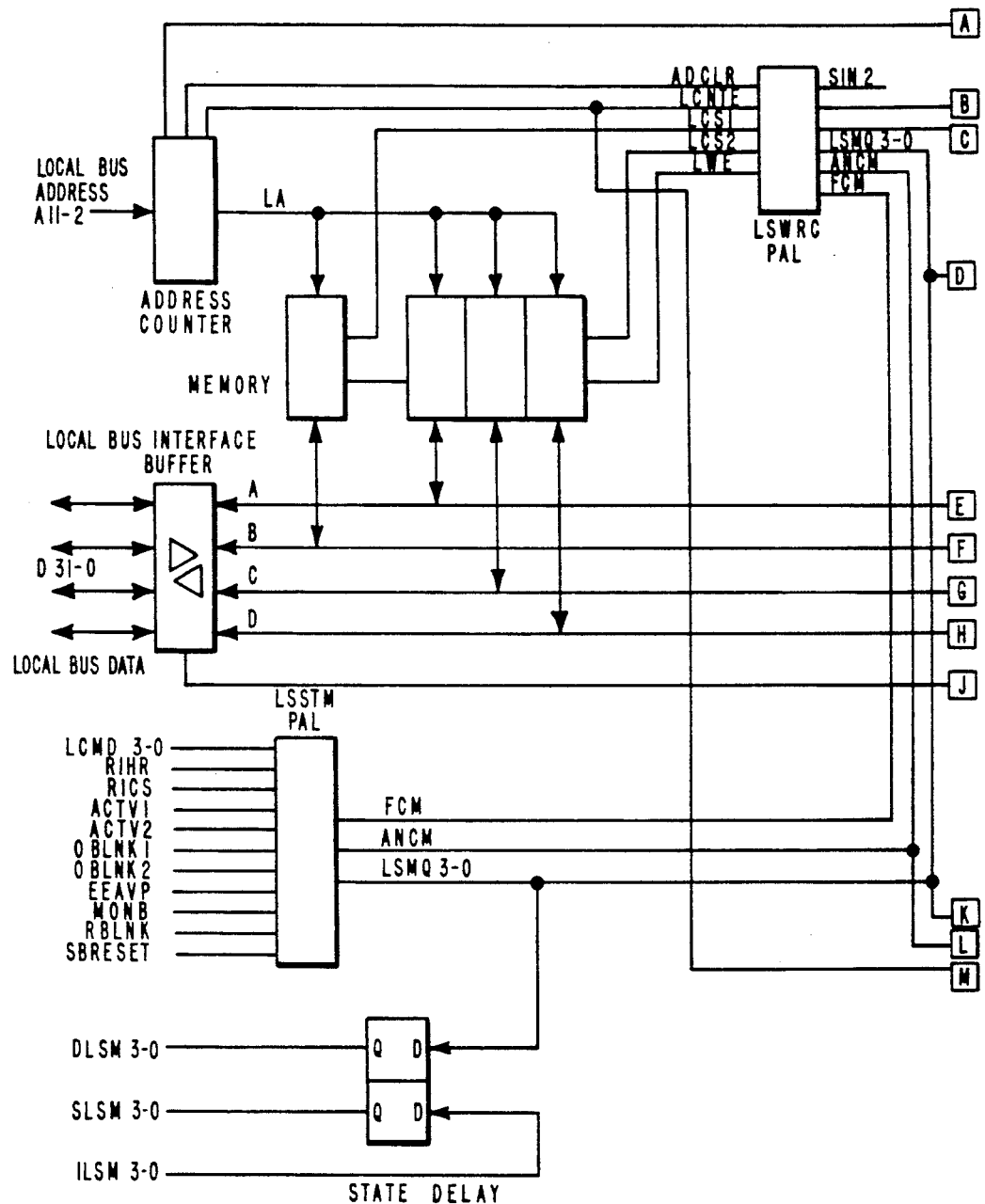

FIGS. 11A-1 and 11A-2 provide a block diagram illustrating the structure of the line store block represented in FIG. 7.

Figure 11B:
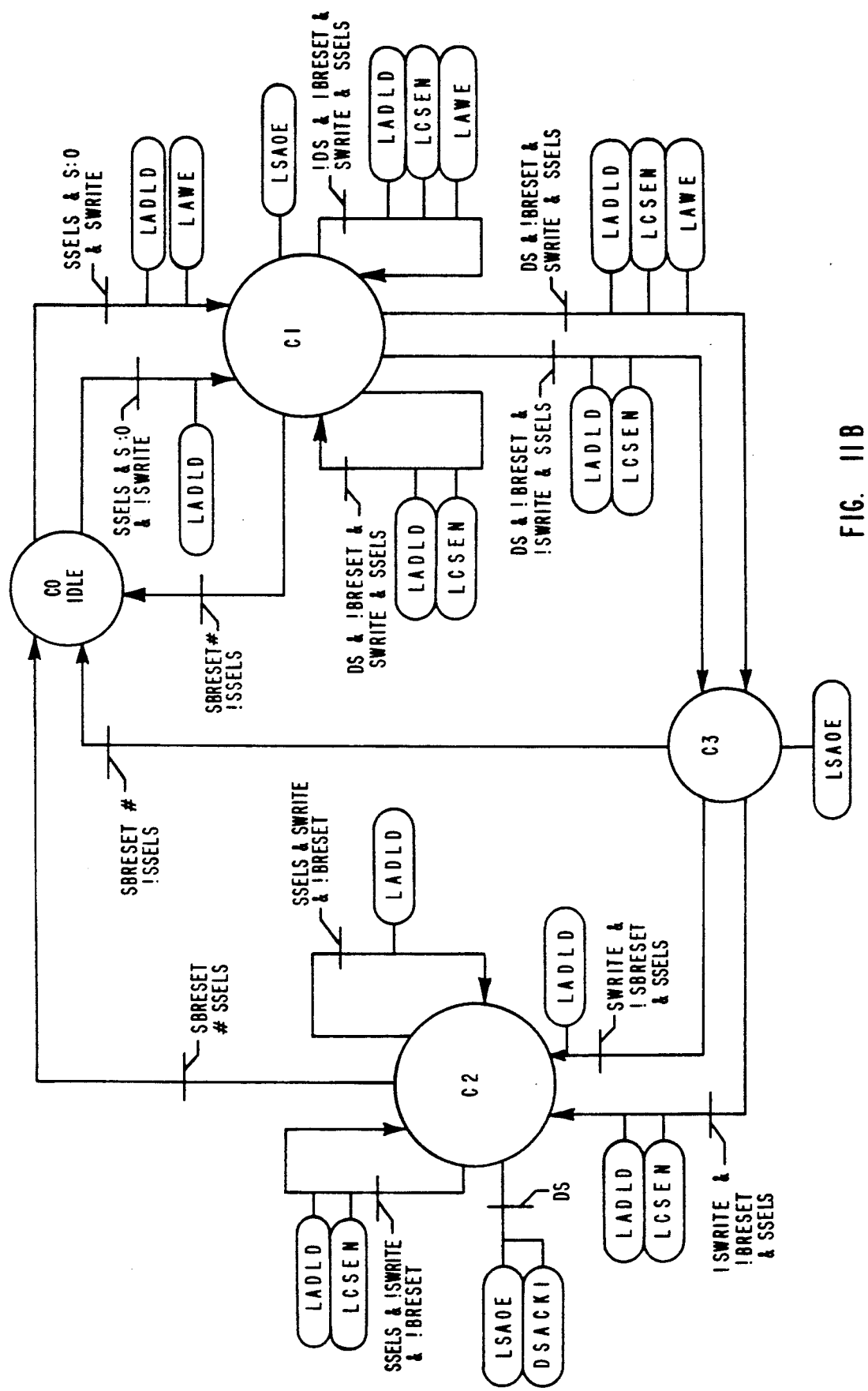
Figure 11C:
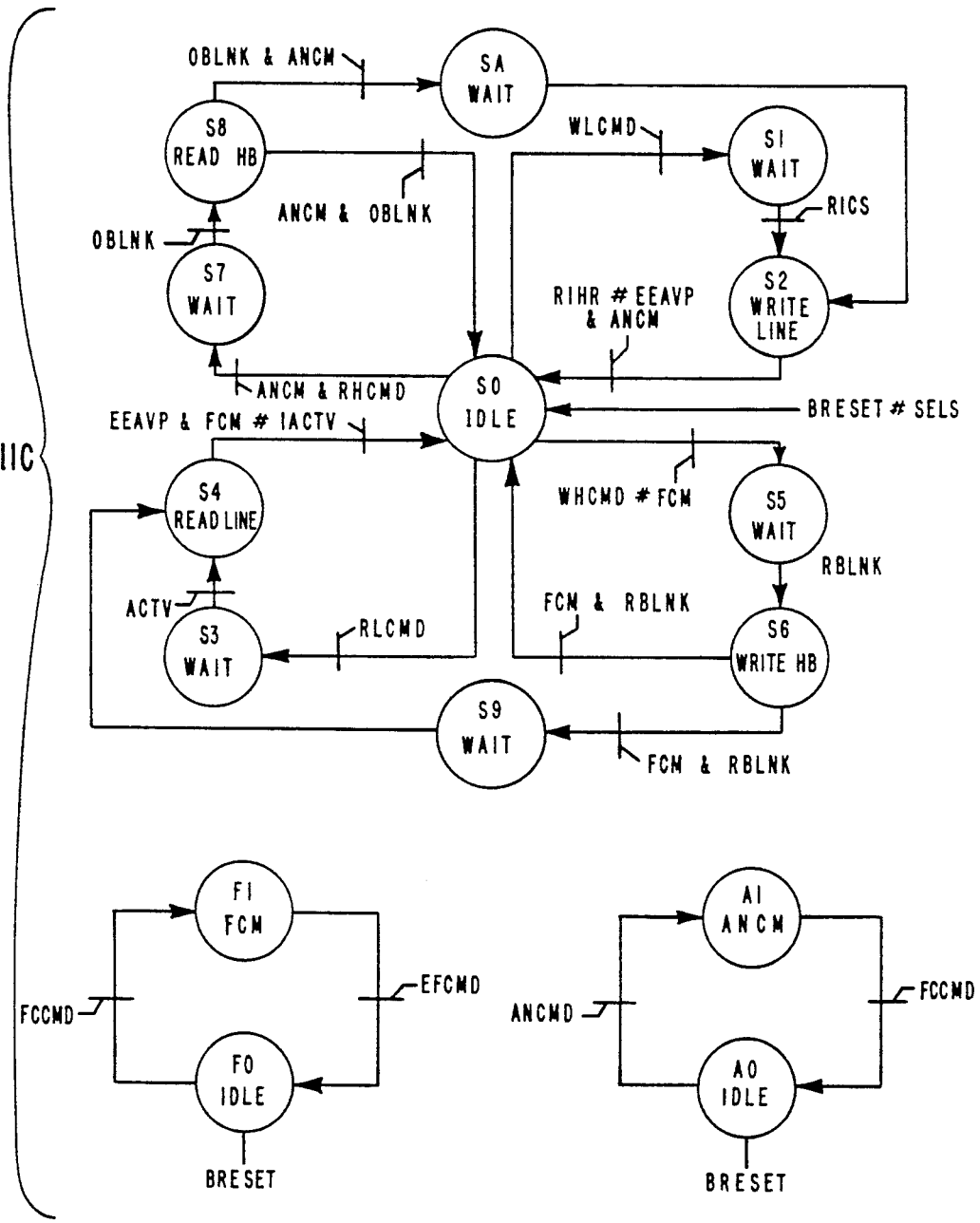

FIG. 11B-11C provides a state diagram for the CPU state machine and the line store state machine, respectively, represented in FIG. 11A.

Figure 12A:
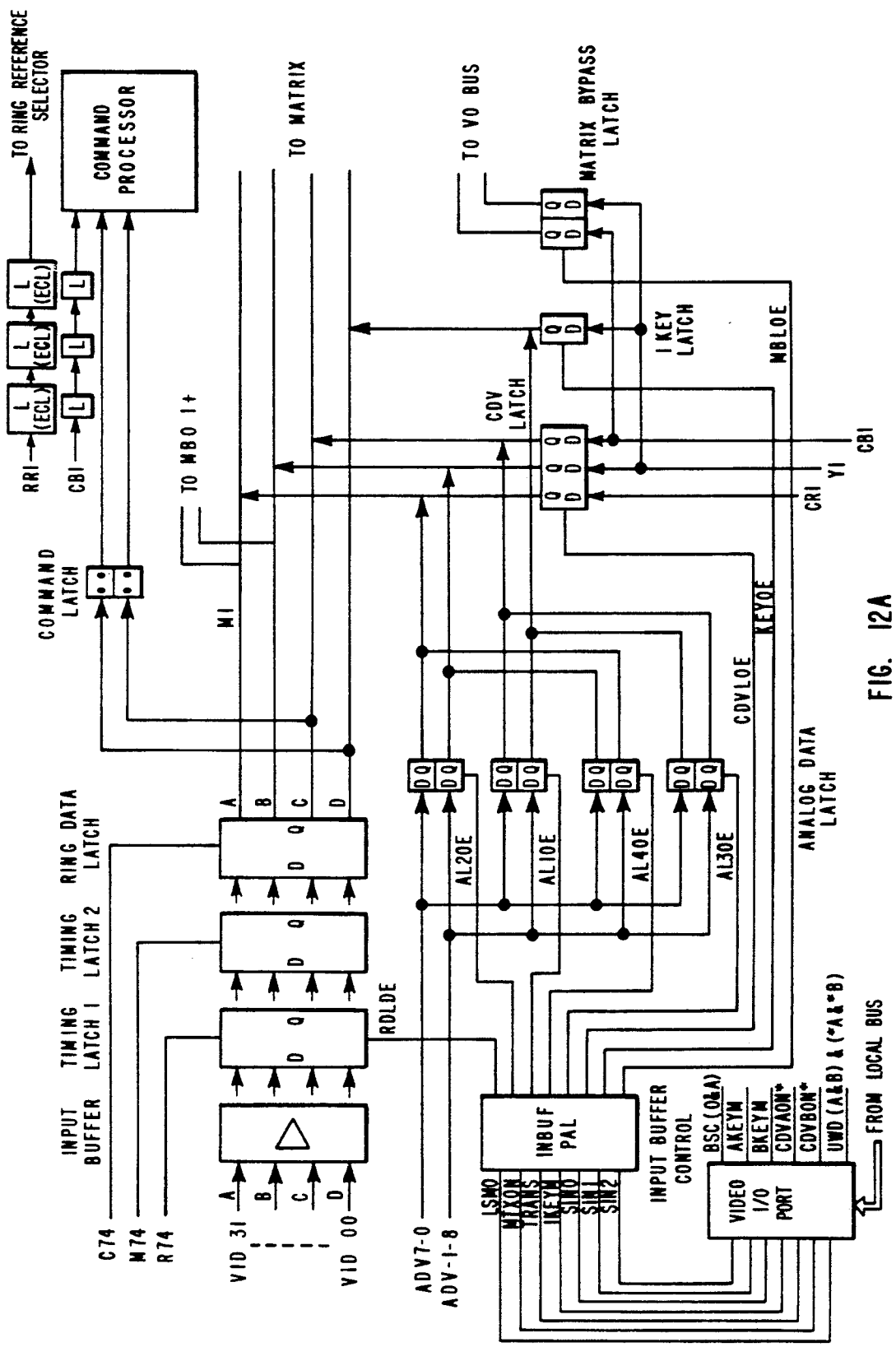

FIG. 12A provides a block diagram illustrating the structure of the V-ring input represented in FIG. 7.

Figure 12B:
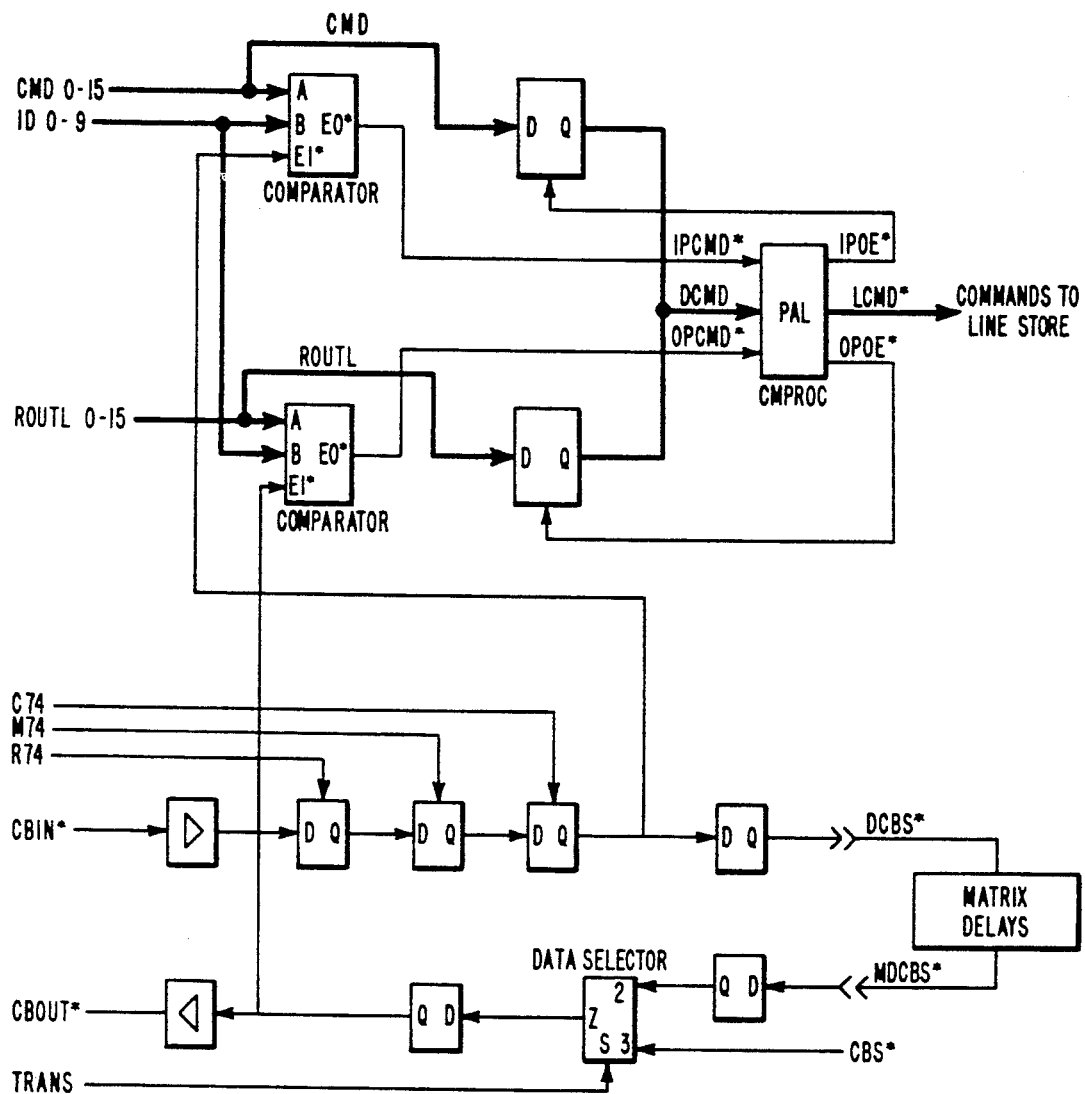

FIG. 12B provides a block diagram illustrating the structure of the command processor represented in FIG. 12A.

Figures 1, 13:
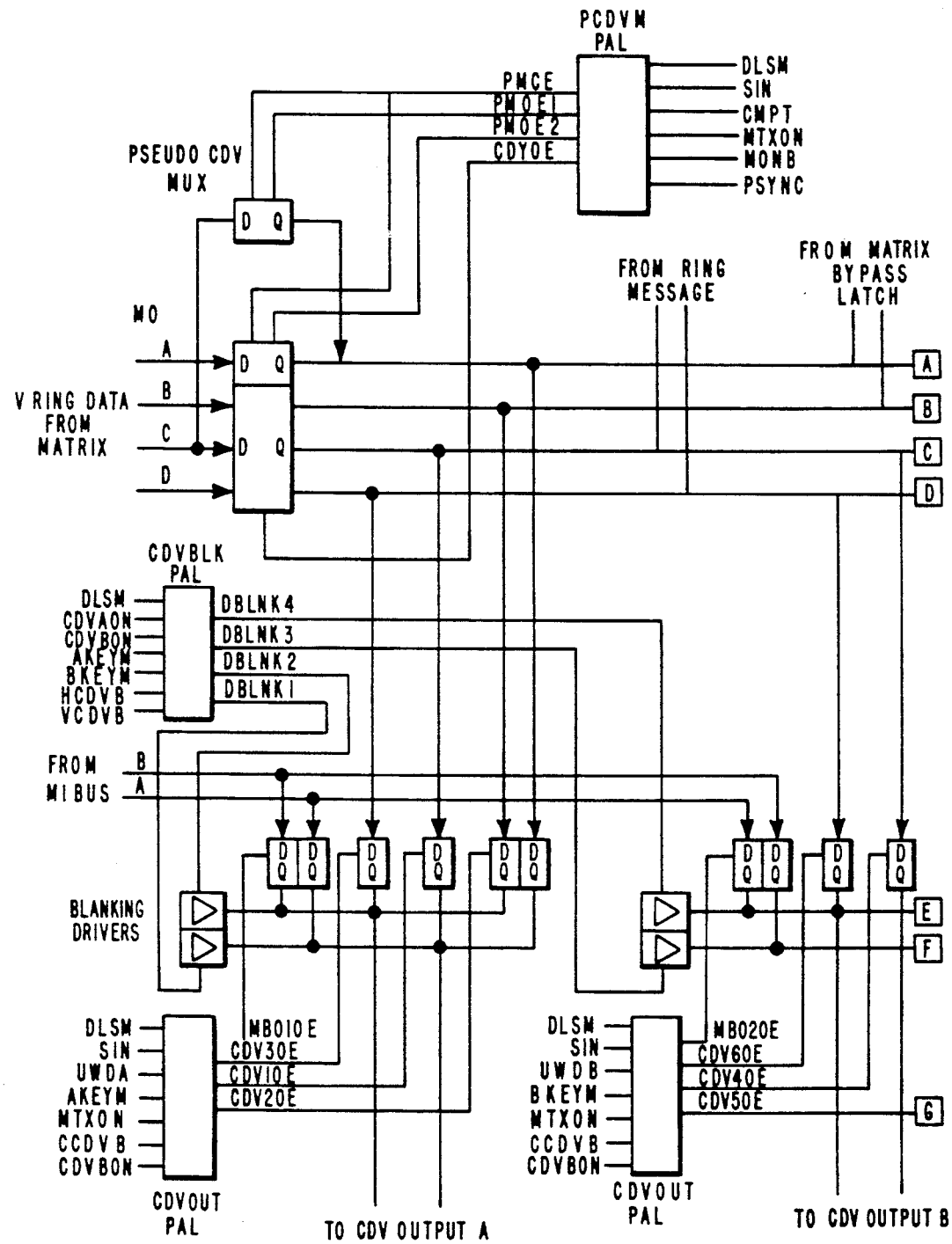

FIG. 13-1 and 13-2 provides a block diagram illustrating the organization of the ring output represented in FIG. 7.

Figure 14:
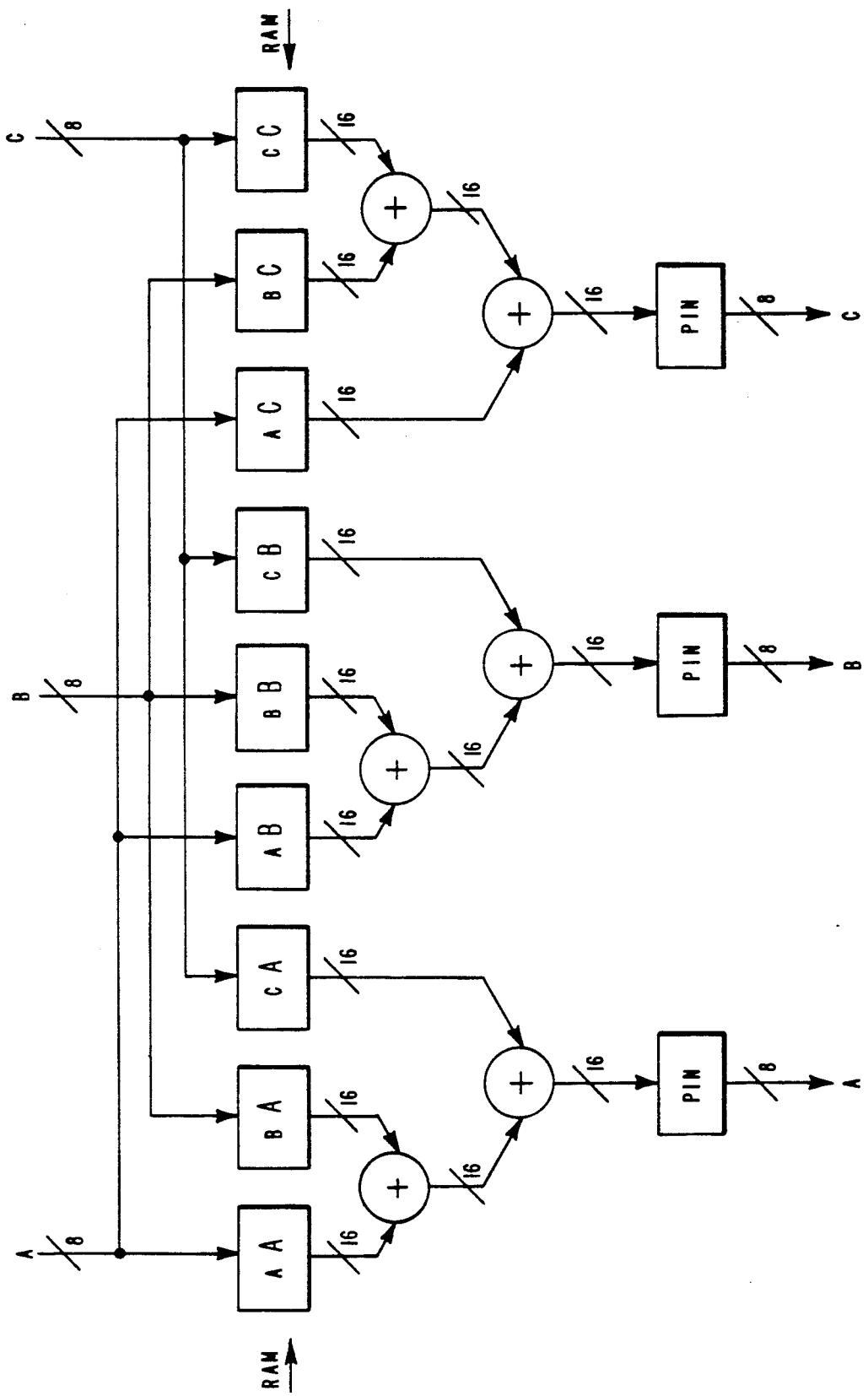

FIG. 14 provides a block diagram illustrating the structure of the matrix module represented in FIG. 7.

Figure 15:
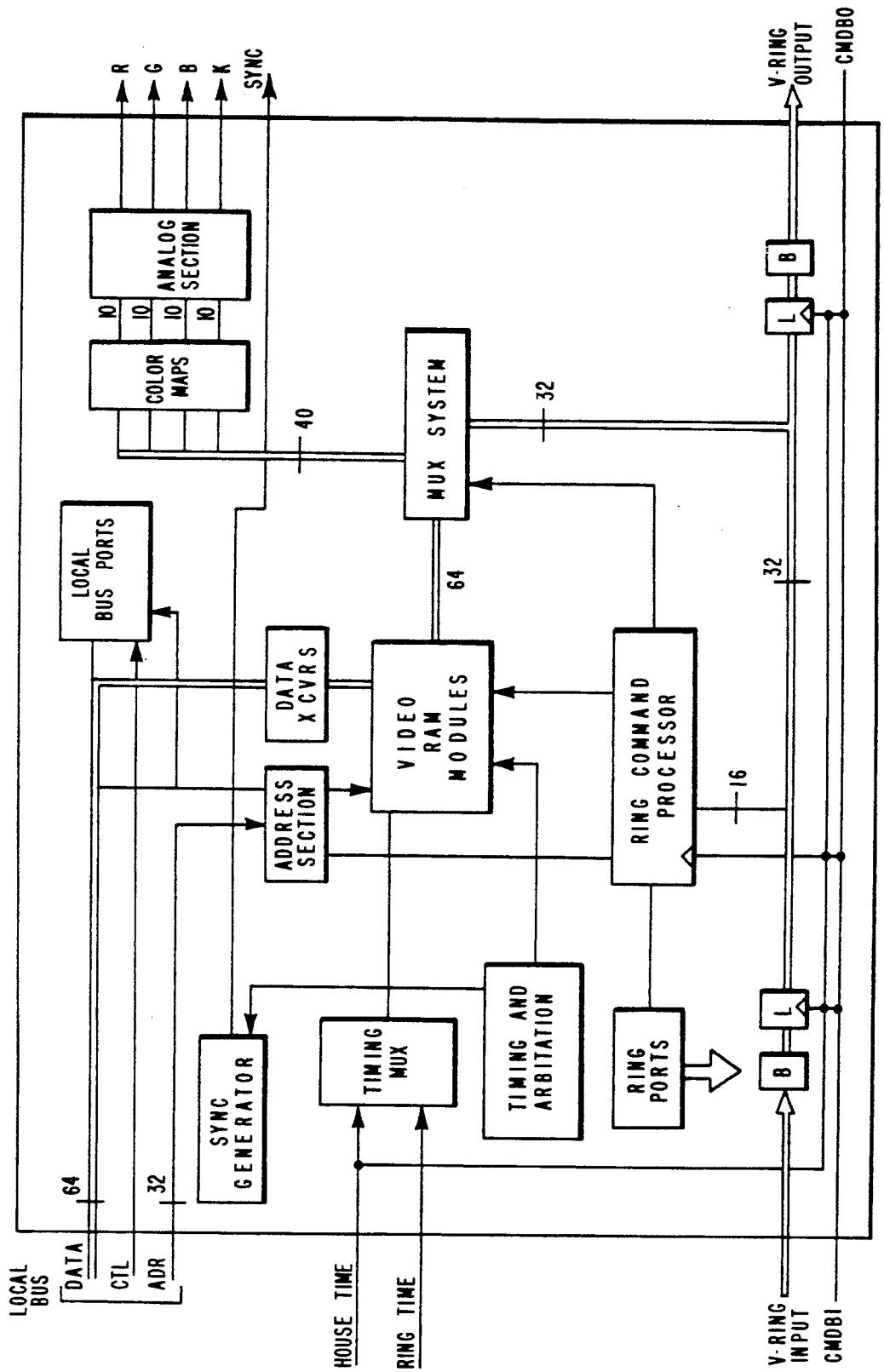

FIG. 15 provides a block diagram of a representative embodiment of the frame buffer represented in FIG. 2B.

DETAILED DESCRIPTION OF THE PREFERRED EMBODIMENTS

A. General Overview of the Basic Inventive Concepts Represented in the System and Methods of the Present Invention: FIGS. 1A, 1B, and 1C In the following description, reference will be made to the drawings wherein like structures are provided with like reference characters. It is to be understood that the structures represented in the drawings and described herein are merely the preferred structures and methods used to carry out the present invention. Thus, this description only represents possible embodiments of the invention and is not intended to limit the scope of the invention as defined in the claims.

Those skilled in the art will appreciate that in order to succinctly explain the principal features, structures, and functions of the present invention, only those structures and methods which require explanation to one having skill in the art have been described herein. For example, power supply, cabling, and other connections and components which may be devised by those skilled in the art have not been included in order to emphasize the inventive concepts found in the present invention.

As appreciated by members of industrial societies, the widespread use of digital computing devices has had a dramatic impact on all aspects of modern life. Particularly those involved in industrial and scientific pursuits readily acknowledge the critical importance of digital computing devices in furthering research and industrial development.

While digital computing devices deal best with numerical values, human users deal best with graphical representations of data and information. Importantly, the representations of real life occurrences can best be understood by human users when graphically represented.

The need for humans to receive graphic information, as opposed to merely numerical information, has created many areas which require that digital computing devices provide results to their human users in the form of graphic representation. These applications include computer-aided design ("CAD"), remote sensing and mapping, scientific visualization, medical imaging, and computer animation.

The effective implementation of computer handling of many of these applications has required the development of digital computing systems having massive amounts of memory and capable of carrying out millions of instructions per second (MIPS) and millions of floating point operations per second (MFLOPS).

For example, in medical imaging applications, the high resolution graphical representation of the entire human body using volumetric data techniques requires the storage and manipulation of more than 100 megabytes of digital data. The P-ring of the present invention is particularly adapted to rapidly carry out the massive number of calculations required in such applications.

As is known in the art, in order to increase the processing speed of a computer system, a parallel processing architecture is necessary. Disadvantageously, previously available computer graphics system, while capable of achieving a high MIPS or MFLOPS rating by using a parallel processing architecture, were hindered by slow inputting and outputting of data between the computer system and a peripheral device, such a video monitor.

Moreover, prior art computer graphics systems lacked configurability. When dealing with computer graphics image computation, the previously available computer systems were hardware bound to a particular method of handling a computer graphics image computation task. Thus, a computer system particularly constructed for computer-aided design tasks could not be adapted, or could only be adapted with great difficulty, to medical imaging or computer animation tasks.

The present invention's advances over the prior art are several. The present invention allows the numerical data calculated by the plurality of processors on the P-ring to be rapidly gathered and assembled as a video image. The present invention provides for the expandability of both the P-ring and the V-ring. The present invention provides for configurability of embodiments of the present invention. That is, embodiments incorporating the present invention are flexible and versatile enough to handle many different graphic image computation tasks as the need arises while also providing efficient operation.

Recognizing that computer graphics image computation requires extremely fast numerical processing, prior art computer systems have only emphasized processing speed. The singular emphasis on fast numerical processing has left many end users dissatisfied with the overall performance of the computer system. For example, a computer graphics image computation system may be able to complete an image computation task in one second. Nevertheless, it is common for such a system to require, for example, one minute to transfer the large volume of data representing the finished results from the computer to a peripheral device such as a disc drive or to a video monitor using a conventional communications network such as the well-known Ethernet communications network.

The present invention provides a significant advance over the prior art by combining both high-speed digital processors and high-speed digital video processors in an architecture which allows the rapid transfer of data, commands, and digital video signals among the digital processors and video processors. This combination of digital video signal processing with digital computational processing provides a computer graphics image computation system and method which performs its task far better than any previously available system.

All of the above-mentioned features and advantages are inherent in the structures and methods of the presently preferred embodiments described herein.

Provided in FIG. 1A is a block diagram representing the architecture of one presently preferred embodiment of the present invention. The representation provided in FIG. 1A is greatly simplified so as to allow a clear description of the highest level functioning of the embodiment.

As can be seen in FIG. 1A, the presently preferred embodiments include a processor ring designated by bracket 12 (herein referred to as a P-ring) which includes a plurality of computational subsystems 20A-20B and a P-ring controller 18. Each of the computational subsystems 20A-20B may comprise only a single digital microprocessor but preferably each computational subsystem in the described embodiments includes a powerful digital computing system.

It is preferred, but not necessary, that each computational subsystem and the P-ring controller are provided on individual circuit boards which are installed in a chassis and which are interconnected by way of a backplane connector. More information concerning the P-ring and the computational subsystems can be found in the United States Patent Application entitled "System and Method for High Speed Digital Computing using an Asynchronous Multiprocessor Ring having Parallel Data Transfer Connections," which was previously incorporated by reference.

The components of the P-ring communicate with an external computer 10 by way of an Ethernet (NFS) communication network 16. The Ethernet communication network 16B is used to transfer relatively small amounts of data between the external computer 10 and the embodiment. It will be appreciated that other methods of providing communication between the external computer 10 and the P-ring 12 can be provided. However, the design of the embodiments described herein emphasize compatibility with industry standards and the Ethernet communications network is a standard communications network commonly used and widely understood in the industry. Thus, by utilizing industry standards whenever possible, the versatility of the embodiments described herein is enhanced.

Shown in FIG. 1A are the P-ring controller I/O connections indicated at 24, which include a time code input, such as from a SMPTE time code generator, and also a machine control connection allowing interaction with other machines, such as video recording devices, to provide machine control during the operation of the embodiment. The inclusion of the machine control and time code I/O connections 24, as well as the Ethernet network link, represents the concept emphasized in the described embodiments of facilitating the interchange of data and control between the embodiments of the present invention and "external" peripheral computing and video devices.

Importantly, the P-ring itself comprises a plurality of digital processors contained within the computational subsystems 20A-20B. The computational subsystems 20A-20B are closely coupled by the communication paths 22A-22C provided between each of the computational subsystems. Each communication path between the computational subsystems is a high speed parallel data pathway.

Also represented in FIG. 1A are the components which comprise the V-ring designated by bracket 14. The V-ring 14 includes a V-ring controller 26 and a plurality of video processors 28A-28B and the parallel communication paths 30A-30C therebetween. As is the case with the P-ring, it is preferred that the V-ring controller 26 and video processors 28A-28B are each provided on their individual circuit boards for mounting in a chassis and connection to appropriate backplane connectors.

As represented in FIG. 1A, the V-ring controller 26 of the presently preferred embodiment can receive input and provide output of both component digital video and analog video signals with peripheral devices as represented at 32. The V-ring controller 26 serves as one means for inputting and outputting video signals between various external peripheral video devices and the V-ring 14. Also, the V-ring controller 26 also serves as a means for inserting a video signal onto the V-ring 14. It will be appreciated that many structures can be devised to carry out these functions and thus the embodiments described herein are to be taken as merely the presently preferred structures for carrying out these functions.

The video processors 28A-28B of the embodiment represented in FIG. 1A comprise frame buffers 28A-28B which will be more fully described along with the V-ring controller 26 shortly in this disclosure. Importantly, as will be appreciated shortly, the V-ring 14 is particularly useful for high-speed transfer of large amounts of data in a digital video signal format which might otherwise overwhelm the P-ring if routinely placed thereon. Thus, the V-ring is used to move large blocks of bulk data to, from, and between the computational subsystems on the P-ring.

The communication paths 30A-30C between each video processor 28A-28B on the V-ring 14 and the V-ring controller 26 are parallel communication paths allowing high speed transfer of data from one location on the V-ring 14 to another location on the V-ring 14. In order to achieve high data transfer rates, the operation of the V-ring is synchronous and in real time. That is, video signals are passed through one video processor and on to the adjacent downstream video processor in real time and in step with a clock signal distributed to all locations on the V-ring 14.

Importantly, both the P-ring 12 and the V-ring 14 are expandable. That is, the structure of the P-ring 12 and the V-ring 14 allow a large number of computational subsystems 20A-20B or video processors 28A-28B to be added to the P-ring or V-ring, respectively.

Significantly, as shown in FIG. 1A, a plurality of local buses 34A-34C are provided which interconnect the computational subsystems 20A-20B on the P-ring 12 with the devices on the V-ring 14. These local buses, or local communication pathways, 34A-34C, similar to the parallel communication pathways forming the V-ring 14 and the P-ring 12 are buses comprising many parallel data or address lines. Thus, by way of the local buses 34A-34C, digital video signals traveling on the V-ring 14 may be acquired by any computational subsystem 20A-20B on the P-ring 12 and computer graphic images computed by the computational subsystems 20A-20B may be transferred to any of the video processors 28A-28B.

Significantly, as used herein, the term "video processor" is intended to encompass any number of video devices which process video signals in real time. For example, the term "video processor" is intended to include a frame buffer whose principal function is merely to store digital video signals and output the same on command as well as various digital video effects devices which are able to carry out sophisticated manipulation of digital video images in real time.

As mentioned, in order to rapidly move the massive amounts of data involved in digital video signals, the V-ring operates synchronously and in what will be referred to herein as "frame time". In other words, when dealing with an NTSC video signal, the equivalent of one frame of video passes through each video processor 28A-28B in one-thirtieth of a second. Similarly, when dealing with PAL video signals, the equivalent of one frame of video passes through a frame buffer in one twenty-fifth of a second. Importantly, as will be explained later, the video processors 28A-28B on the V-ring 14 operate either genlocked to a house timing signal or to a ring timing signal internal to the V-ring 14. The importance of each of these timing signals will be explained in greater detail shortly.

In order to provide embodiments which can be most efficiently used for a plurality of computer graphics computation tasks, the embodiments of the present invention may be configured into one or more logical machines each assigned a particular task. FIGS. 1B and 1C illustrated different configurations of an embodiment of the present invention.

FIG. 1B provides a representation of one embodiment of the present invention including a P-ring controller 18 and seven computational subsystems 20A-20G each coupled by parallel communication paths 22A-22H to form the P-ring 12. The embodiment of FIG. 1B also includes a V-ring controller 26 and five video processors (frame buffers) 28A-28E. Each video processor 28A-28E has a parallel communication path 30A-30F joining it to an adjacent video processor 28A-28E to form the V-ring 14.

Associated with each of the video processors 28A-28E is a work station 38A-38E having a video monitor 40A-40E. Each work station 38A-38E is in communication with a computational subsystem 20A-20G by way of a serial control line 42A-42E. Users at each work station 38A-38E are able to command the components of the P-ring 12 and the V-ring 14 in order to manipulate and move data and observe the results on the video monitors 40A-40E.

The embodiment illustrated in FIG. 1B is configured into four logical machines. Each logical machine carries out a particular computer graphics image computation task. As represented by the box marked 44, a computational subsystem 20A, a video processor 28A, and work station 38A are combined as one logical machine assigned to carry out a graphic image task. Such graphic image tasks may include a "paint" task. In other words, a user positioned at the work station 38A gives commands to paint with color the image being manipulated.

The combination of a computational subsystem 20A, video processor 28A, and work station 38A represented in box 44 may conveniently be referred to as a "user slice." Each user slice includes the components necessary to allow a user to manipulate some aspect of a graphic image and view or store the results. In contrast to a "user slice," a "compute slice" is a computational subsystem only and is used, generally in conjunction with other computational subsystems, for computation-intensive tasks such as rendering and filtering of images, computation of image sections with geometric objects, composing imaging layers, analyzing and transforming data, and so forth.

Another user slice of the embodiment represented in FIG. 1B is designated by the box marked 46 and is, for example, a logical machine programmed to carry out the task of modeling images. Furthermore, as represented by the block marked 48, two computational subsystems 20C-20D, a video processor 28C, and a work station 38C, are configured as a logical machine to carry out a task such as animation. Still further, as represented by the block marked 40, three computational subsystems 20E-20F, a video processor 28E and a user work station 38E are configured as a logical machine assigned to the task of rendering graphic images.

Thus, the structures on the P-ring 12 and the V-ring 14 are not dedicated to any particular function but may be configured as a variety of logical machines to perform the graphic image computation tasks at hand. Importantly, some tasks, such as rendering complicated images, are more computation intensive than other tasks. Thus, as represented by the box 50 in FIG. 1B, the task of rendering a graphic image may be assigned to three computational subsystems 20E-20G with one video processor 28E and work station 38E being provided to allow the user to direct the rendering process.

The configurability and versatility of the embodiment represented in FIG. 1B is further demonstrated by the configuration of the embodiment represented in FIG. 1C. In the embodiment represented in FIG. 1C, all seven computational subsystems 20A-20G have been grouped into one logical machine, represented by the box marked 52, and assigned the task of rendering a graphic image. This versatility allows embodiments of the present invention to be most cost effectively used for graphics image computation tasks. For example, if a particular assignment requires complex modeling and rendering but yet the animation will be relatively simple, an embodiment of the present invention may be first configured as one large modeling machine and then one large rendering machine.

It will be appreciated that the architecture of the embodiments of the present invention, as well as the software systems allow the particular modeling, rendering, or other computer graphics task to be distributed among the various computational subsystems, as will be explained shortly. In the example just given, since the animation tasks are relatively simple, they can be carried out using only one computational subsystem or, in order to most rapidly complete the task, the animation tasks may be divided among many computational subsystems with several users directing segments of the animation at various work stations.

In the fashion just described, the embodiments of the present invention provide that the most cost effective use of an embodiment may be obtained. For example, a single user may be assigned to carry out complex rendering tasks during night hours when all computational subsystems in the embodiment may be most beneficially grouped as a single logical machine to carry out rendering tasks. Then, during normal business hours, the embodiment may be divided into various logical machines to carry out less complex tasks with a user directing each of the various tasks from a work station.

As will appreciated from the foregoing, the embodiments of the present invention provide a system and method for high speed computer graphics image computation which provides advantages not previously available in a computer graphics system. By incoluding the structures of the V-ring, the present invention allows the massive amounts of data involved in high resolution computer graphics images to be rapidly moved anywhere within the embodiment. The power of the embodiments may also be increased by the addition of additional components on the V-ring and the P-ring. Moreover, the embodiments of the present invention may be configured so that the computational subsystems which make up the P-ring and the video processors which make up the V-ring may be grouped as logical machines, each logical machine carrying out a different graphic image computation task.

In order to further explain the novel concepts inherent in the present invention, the organization of the V-ring will now be more specifically described with the structure of the P-ring being described in the above-referenced United States Patent Application.

B. General Description of the Components of the Video Ring: FIGS. 2A and 2B.

As is appreciated by those skilled in the pertinent arts, the creation and manipulation of high quality computer graphics requires the handling of massive amounts of data. In order to efficiently handle such massive amounts of data, the present invention utilizes the video ring. The video ring, or V-ring, allows digital video signals to be passed to both downstream and upstream video processors in real time as well as receive data from, and place data on, the P-ring. The V-ring provides a structure for rapidly moving large amounts of data in a digital video format which is readily used by other video devices.

In contrast to the computational subsystems forming the P-ring which operate asynchronously from each other, the devices on the V-ring operates synchronously with each other and are particularly adapted for carrying large amounts of video data which would tend to overwhelm the P-ring. The presently preferred embodiment of the V-ring controller and the video processors (frame buffers) which are shown in FIGS. 1A-1C are represented by the block diagrams of FIGS. 2A and 2B, respectively.

As mentioned, in order to efficiently accommodate the massive amounts of data which must be moved in order to rapidly compute high-resolution graphic images, the V-ring provides a very fast data pathway which allows video images to be moved to any video processor on the V-ring and to any of the computational subsystems on the P-ring. Thus, the V-ring compliments the P-ring.

To provide the described embodiments with the greatest compatibility and versatility, data on the V-ring is in the form of a standard component digital video signal. In the described embodiments, the component digital video signal is compatible with CCIR Recommendation 601 utilizing a 4:4:4:4 luminance to color signal ratio and including a key channel. Use of a video signal compatible with CCIR Recommendation 601 greatly facilitates interfacing embodiments of the present invention with external video devices.

As stated earlier, the principle components of the V-ring are the V-ring controller and the plurality of video processors which, in the presently preferred embodiment, are frame buffers which are adapted for transferring data between the computational subsystems and the V-ring and converting the same into a digital video signal. The digital video signal can be viewed by a user, moved around the V-ring, or moved out of the V-ring to an external video device. The video ring controller, aside from controlling the operation of the video processors on the V-ring, serves as a means for inserting a video signal onto the V-ring and as a means for outputting a video image which is on the V-ring.

FIG. 2A provides a block diagram representing the principle functional blocks of the V-ring controller. It will be appreciated that under the definition herein adopted, the V-ring controller may be considered a specific type of video processor. Likewise, FIG. 2B provides a block diagram representing the major functional blocks of the frame buffers utilized in the presently preferred embodiment and the high level functions carried out by the frame buffers.

As shown in FIG. 2A, the V-ring controller is in communication with the local bus 140, the V-ring parallel input 130, and the V-ring parallel output 156. The local bus connection 140 provides a direct path for data transfer between the V-ring controller and the P-ring controller as represented in FIG. 1A.

The parallel V-ring input 130 and the parallel V-ring output 156 are each thirty-two bit wide buses providing a total of four bytes for pixel data in addition to a command bit line and a horizontal sync pulse line (not explicitly represented in FIGS. 2A and 2B). The four pixel data bytes of the V-ring are designated A, B, C, D and carry the four components (R, G, B, K) of a CCIR 601 component digital video signal. The component digital video signal may pass through the V-ring controller to the parallel V-ring output 156 unchanged or the digital video signal may be manipulated in some way.

It is preferred that digital video signals placed on the V-ring be in the form of a component digital video signal compatible with the CCIR Recommendation 601 or its United States counterpart, RP-125. It is, however, within the scope of the present invention to utilize composite digital video signals on the V-ring. Even further, it is to be understood that it is within the scope of the present invention to utilize a non-standard or proprietary video signal encoding scheme on the V-ring.

The embodiment illustrated in FIG. 2A is provided with two video signal inputs 132 and 136 and one video signal output 154. The analog input 132 is connected to an analog input module 134 which contains those components necessary to generate a component digital video signal and place the component digital video signal on the V-ring in the proper sequence.

The CDV (component digital video) input 136 likewise is connected to a CDV input module 138 which contains the components necessary to properly place a component digital video signal onto the V-ring. It will be appreciated that the analog input module 134 and the CDV input module both function as a means for inserting a video signal onto the V-ring. Other, as well as additional, components, however, may also perform this function. The analog input module may serve the function of a means for generating a component digital video signal which is suitable for placement on the V-ring However, other structures may perform the same function.

The CDV output 154 receives the video signal from the CDV output module 152. The CDV output module 152 contains those components necessary to extract a component digital video signal from the V-ring and output it to an external video device. The CDV output module 152 is one of the structures which may serve the function of a means for outputting a video signal received at the V-ring input 130. It will be appreciated that the analog input 132, the CDV input 138, and the CDV output 154 connections all can be interfaced with various video devices which are readily available in the art.

The matrix module represented in FIG. 2A forms part of the V-ring, and as is known in the art, serves the functions of converting a component digital video signal having one format into a corresponding component digital video signal having another format, e.g., RGB format to CrYCb format. The psuedo-CDV multiplexor (Pseudo CDV MUX) 148 also forms part of the V-ring and is used to produce psuedo-component digital video signals and place the same in the proper bytes of the V-ring.

The sync generator 146 represented in FIG. 2A functions to provide the numerous synchronization signals which are required to properly operate the V-ring and the components associated therewith. Those skilled in the art will be able to determine, according to the structure of the particular embodiment of the invention and the description provided hereafter, what synchronization signals must be generated and distributed among the various components of the V-ring controller and other components of the V-ring. Importantly, the sync generator 146 functions as a means for synchronizing the operation of the video processors on the V-ring While not represented in FIG. 2A, various clock and synchronization signals are distributed to the components on the V-ring in order to synchronize their operation with one another.

As mentioned earlier, the primary purpose of the V-ring is to allow rapid and efficient movement of video signals from one point on the V-ring to another. However, data may only travel in one direction around the V-ring. In order to facilitate moving a video signal to an upstream location on the V-ring, the line store 142 is provided. The line store 142 functions as a means for storing a video signal.

The described embodiments of the V-ring organize and handle video signals into lengths equal to one video scan line. Thus, when one frame buffer desires to pass a video signal to an upstream frame buffer, the video signal is first passed downstream, line by line, to the V-ring controller and the lines are placed in the line store 142. Once placed in the line store 142, the lines of the video signal may wait until it is their turn to be properly inserted onto the V-ring as a video train signal having appropriate commands and control signals provided by V-ring controller. Thus, the line store 142 provides a novel approach for allowing for efficient transfer of video signals to upstream video processors on the V-ring.

Also represented in FIG. 2A is the command control stack 150. The command control stack 150 functions as a means for generating commands for the V-ring. The command control stack 150 inserts into the command portion of the video signal train the proper command and address bits so that the downstream frame buffers will carry out the desired operations. In this way, the V-ring controller is able to control the operation of each of the frame buffers or video processors. It will be appreciated that any of the structures herein described which are capable of placing pixel data onto the V-ring may, in combination with the command control stack, function as a means for generating a video signal train which includes both a command portion and a pixel data portion. More information concerning a representation of the embodiment of the V-ring controller will be provided later in this disclosure.

FIG. 2B provides a high level block diagram representing the components of each frame buffer which comprise the other major components of the V-ring. As mentioned earlier, the frame buffer is just one type of video processor which may be included on the V-ring. For example, sophisticated real time video digital effects generators may be included on the V-ring in order to accomplish particular effects. Importantly, such digital video processors must operate in real time since operation of the V-ring is synchronous.

FIG. 2B shows the frame buffer's connections to the local bus 164, and the parallel V-ring input 160, and the parallel V-ring output 162. Similar to the V-ring controller represented in FIG. 2A, the V-ring input 160 and the V-ring output 162 each include 34 parallel conductors (32 bits data and 2 bits control).

The frame buffer represented in FIG. 2A is provided with a ring command processor 166 which functions as a means for receiving commands and which interprets and executes the commands placed at the head of the video signal train by the command control stack (150 in FIG. 2A). A multiplexing system (MUX System) 168 is used in the frame buffer to direct the digital video signals captured from the V-ring to the video RAM modules 170 for storage or direct the digital video signals to the analog output 172. The multiplexing system 168 also includes the components necessary to place a video signal received by way of the local bus 164 or stored in the video RAM modules 170 onto the V-ring. Thus, the multiplexing system 168 represents just one structure which may be used as a means for inserting a video signal onto the V-ring.

It should be noted that a computational subsystem on the P-ring has access to the digital video signals placed in the video RAM modules 170 by way of the local bus 164. Thus, the computational subsystems can utilize the V-ring to transfer data both internally to the system as well as to the outside world.

In the embodiment represented in FIG. 2B, the analog output 172 produces an RGB analog video signal which may be viewed by a user. In this way, the user can immediately view the results of instructions given to the system utilizing the present invention. The analog output receives an analog signal from a digital to analog (D/A) converter 171 and serves as a means for outputting a video image which has been received at the V-ring input 160 or by way of the local bus 164.

The structure of the V-ring provides an efficient communication path for moving the bulk data of a digital video signal from one point to another within the embodiments of the present invention. More information concerning the structure of a representative embodiment of the V-ring components will be provided later in this disclosure.

C. Representative System and Application Incorporating the Present Invention: FIG. 3

Having explained the high level structure of the principle components of the presently preferred embodiments of the present invention, the system represented in FIG. 3 is provided to illustrate the organization of an overall computer graphics system incorporating the present invention. Similarly to the earlier provided figures and descriptions, those skilled in the art will appreciate that only the major devices, and the connections to those devices, have been illustrated in FIG. 3 in order to increase the clarity of this disclosure.

As illustrated in FIG. 3, the P-ring includes a P-ring controller 18 and five computational subsystems 20A–20E. The V-ring includes a V-ring controller 26 and five frame buffers 28A–28E. The configuration of the embodiment represented in FIG. 3 provides that a maximum of three computational subsystems and three video frame buffers may installed in one chassis. The chassis are represented by the boxes marked 198 and 200 in FIG. 3. Thus, the two chassis 198 and 200 are interconnected by way of connectors and expansion cables indicated at bracket 186. DRAM memories 70A–70E are connected to each local bus 72A–72F allowing both the MC 68020 processor and the programmable hardware booster (both contained on the computational subsystems) to access to the DRAM memories 70A–70E.

Also represented in FIG. 3 is a work station 10, preferably a Sun Microsystems 3/110 workstation, provided with two additional 140 Mbyte random access memory devices, which together function as a external computer. The workstation 10 is connected to the P-ring controller by way of an Ethernet network 16 as well as a serial bus 180 and a terminal cable 182. It will be appreciated that if the application warrants, additional workstations could be added to the Ethernet network to interface with the embodiment of the present invention or with other work stations.

As is common in video applications, an external sync generator 184 is provided to distribute house sync signals to various pieces of video equipment and particularly for use by the V-ring of the embodiment.

Also represented in FIG. 3 is a video disc device 188 which is preferably a video disc device manufactured by Abekas Model A-60. The video disc device 188 is connected so as to input video signals into the V-ring controller 26 and also receive video signals from the V-ring controller 26. As mentioned earlier, the P-ring controller 18 is provided with machine control inputs and outputs. In the embodiment represented in FIG. 3, the machine control input and output represented at 202 is connected to the video disc device 188 and thus the operation of the video disc device 188 may be controlled.

Also represented in FIG. 3 is a video source 194 representing any of a plurality of video devices which may be used to provide video input to the V-ring. For example, the video source may be a video camera (not shown). The output of the video source, preferably in RGB format, is input to a 601 encoder 190 which outputs a component digital video signal which is compatible with CCIR Recommendation 601. The output of the 601 encoder 190 is passed to the V-ring controller 26. Similarly, a 601 decoder receives output from the V-ring controller 26. The 601 decoder 192 is shown providing an RGB video signal to a high resolution video monitor 196.

Also represented in the embodiment of FIG. 3 are four color monitors 204A-204D connected to four of the frame buffers 28A-28D, respectively. Each receives an RGB signal output from one of the frame buffers 28A-28D, respectively. Also provided is a terminal and a data input tablet, represented at 38A-38D, both of which are connected to the respective computational subsystems by way of serial communication lines 206A-206D. As explained earlier, this arrangement allows a user to direct and monitor the tasks being carried out by the respective computational subsystem.

The embodiment represented in FIG. 3 may, under appropriate software, be configured into one or more logical machines programmed to carry out specific image computation tasks. The ability of the embodiment to transfer information on the V-ring and on the P-ring, as well as between the V-ring and the P-ring, makes maximum use of the computing power of the computation subsystems which make up the P-ring.

The embodiment illustrated in FIG. 3 is merely representative of one possible embodiment incorporating the present invention. It will be appreciated that the P-ring and the V-ring may be expanded as needed and other peripheral devices may be added to the embodiment. Moreover, the combination of the P-ring and the V-ring allows computer graphic image computation, as well as image display and storage, to be carried out more efficiently than previously possible.

D. Representative Software Organization for Use With the Present Invention: FIGS. 4–6

Having gained an appreciation of the general organization of the structures of the presently preferred embodiment, the functions and organization of the software used therewith can now be understood.

The application software architecture to be described is devised in order to allow the computational subsystems to be partitioned into logical machines and to allow applications to be gracefully adapted to a variable number of computational subsystems in the logical machine on which they are running. The ability to reconfigure the embodiment and reallocate computational subsystems according to the immediate needs of the users is important to gaining maximum performance from the embodiments of the present invention. As indicated earlier, and as represented in FIGS. 1B and 1C, the ability to organize the computational subsystems into logical machines greatly enhances the versatility of the embodiments of the present invention and allows graphic image computational tasks to be handled most efficiently.

Preferably, the system software used with the present invention should view the hardware as a set of computational subsystems which are to be partitioned. The computational subsystems in each partition are joined to form a single logical machine. The system software should view the application software as a task network which is distributed over the computational subsystems in the logical machine.

When an application software system is written, it is organized as a network of processes which can execute concurrently on different computational subsystems. The resulting organization of these tasks into a network of tasks is referred to as a logical task network diagram. A logical task network contains information (supplied by the programmer) of which tasks in the network communicate with each other, the amount of processing relative to other tasks, and so forth.

Given a logical task network diagram and a logical machine, it is possible to derive a preferred physical task layout. The physical task layout describes exactly on which computational subsystems each task will reside. Therefore, as the embodiment is expanded and more computational subsystems become available, the system may adjust the physical task layout to take best advantage of the number of computational subsystems available.

Having provided a general overview of the architecture of the hardware embodying the present invention, the preferred organization and standards of the application software system to be used with the embodiments of the present invention can be generally explained. All application software should be particularly written so as to take full advantage of the hardware architecture of the embodiments.

In general, one of the most demanding applications of the presently preferred embodiments of the present invention is to generate three-dimensional computer animations combined with live action. However, the present invention allows such applications to be handled more efficiently than previously possible.

The organization of the application software is generally represented in FIG. 4. The application software consists of a data base 212 which contains information for the computer animation (models, attributes, key frames, etc.), the description of the filtering and compositing necessary, and necessary device control commands.

As in any complex software system, it is necessary to provide some internal standards. The following provides some of the more important preferred standards:

1. Time should be calculated in floating point seconds so that any time per frame can be supported. Furthermore, calculating time in floating point seconds allows motion blur which requires many closely spaced samples in time to produce a single frame.

2. Pixel files are used for storing images. They consist of eight bit components or sixteen bit components. All four components R, G, B, and K are stored.

3. Matte files are used for storing mattes. They consist of eight-bit or sixteen-bit components. Only the K component is stored.

4. Texture maps are used for wrapping textures onto surfaces of objects. All four components, R, G, B, and K are stored. Texture maps are organized in pages of 64 pixels by 64 scanlines.

As shown in FIG. 4, the application software system should include appropriate translators, editors, etc., as represented at 210. Those skilled in the art utilizing the disclosure contained herein will be able to provide appropriate additional standards and produce representative software for use with the embodiments of the present invention.

The device control and imaging handling system portion of the application software is responsible for dealing with the outside world. It performs tasks such as frame capture, single framing, constructing texture maps, and so forth. The device control portion consists of drivers (specialized software modules) for each device type such as a video disc device.

There is a baseline command set that each device must be able to support. The baseline commands are "store image" (time, pixel file name) and "load image" (time, pixel file name) Each device driver must be able to convert from time and seconds to whatever units are appropriate for the device and vice versa. The device must also convert pixel files to the format the device needs and vice versa. Each device driver should be independent from the other device drivers. This greatly minimizes maintenance costs and simplifies adding new drivers.

The image handling system 214 represented in FIG. 4 is responsible for generating matte files, texture matte files, and so forth, from pixel files. It is also used for storing, copying, and deleting the image-type files stored on the system.

The major responsibility of the compositing and image processing system 216 is to composite and filter existing image layers into final frames. These frames are then either saved as pixel files or sent to some external device such as a video tape recorder (VTR).

The compositing and image processing system 216 operates on pixels and matte files. Preferably, the term "file" should not be thought of to imply disk storage and retrieval, but may mean such. The file handling system for these types of files, and for all image type files, should be designed to keep as much of the file in RAM as possible. Therefore the system makes accesses to magnetic disc only when necessary. This gives systems having different amounts of physical RAM similar capability but varying performance.

The filter and compositing operators are organized as a set of small code modules. Each code module is preferably completely independent. The code module takes as input one or more pixel or matte files and produces one or more pixel or matte files as output. Facilities should be provided within the software for importing any other parameters to the operators. The operators initially may be written in a high-level language, and with little effort they may be ported to the programmable hardware booster in the computational subsystem. This facilitates adding new operators or increasing the performance of the system.

Also represented in FIG. 4 is the rendering system portion of the application software. The major responsibility of the rendering system 218 is to generate an image file (i.e., a pixel file) which is used by the compositing and image processing system 216 to form the final image. As represented in FIG. 5, the rendering system 218 includes three major portions: the director 220, the tile processors 222A-222C, and the pixel collector 224. Each of these portions of the rendering system 218 will be explained below.

A single copy of the director 220 and pixel collector 224 exists for each logical machine partitioned in the embodiments of the present invention. However, a tile processor 222A-222C is instantiated on each computational subsystem. This allows the rendering system to easily utilize all of the computational subsystems during the rendering process.

In FIG. 5, the lower portion of the figure, designated by bracket 226, shows a possible division of the screen into screen tiles which each include some portion of an abstract image.

The director 220 controls the rendering process. The major task of the director is to determine how to divide the screen into tiles which are processed by the tile processors 222A-222C. A tile is a rectangular portion of the screen. A tile processor may fail if the complexity of the screen tile exceeds the resources, e.g., memory, available to it. If a tile processor 222A-222C fails, the director 220 receives notification of the failed tile and replaces the tile with more smaller tiles.

If a tile processor 222A-222C succeeds, it returns the time it took to compute the tile and the complexity of the tile to the director 220. If the complexity of the tile is simple compared to the resources available to the tile processor, the director 220 coalesces adjacent tiles into a single tile when their total complexity can be handled by a single tile processor.

This dynamic reallocation of tiles on the screen provides an effective method of load balancing and "chasing" the complexity of the image around the screen. In contrast, a static allocation of processors to screen tiles suffers unless the complexity is evenly distributed across the screen. Furthermore, when the tiles are statically allocated, each tile processor 222A-222C must be able to handle the worst case situation requiring all tile processors 222A-222C to be ready to handle the most complex tile. The dynamic reallocation of tiles avoids this difficulty by adapting the tiles so that the complexity of the tiles matches the capability of the tile processors. Preferably, when rendering an animated sequence, the last screen tile subdivision is used as a starting point for the next frame.

As represented in FIG. 5, a plurality of tile processors 222A-222C are provided. The tile processor's responsibility is to compute the R, G, B, and K value for each of the pixels in its currently assigned tile. As represented in FIG. 6, each tile processor is further broken into five major sections: (1) the object processor 228; (2) the geometry modifier 230; (3) the splitter/shader 232; (4) the scan converter 234; and, (5) the ray/surface intersector 236.

The object processor 228 culls objects from the screen tiles. For the pieces of each object which cannot be discarded, the attributes (geometry attributes and shading attributes) for those pieces are collected. Each piece of the object comprising geometric primitives is then sent to the geometry modifier 230.

The geometry modifier 230 applies the geometric attribute to each piece of geometry as it comes in and produces rendering primitives. The geometric attribute is a code module. It applies some rule, e.g., stochastic subdivision, and produces the corresponding rendering primitives. As with compositing and filtering operators, preferably, all geometric attributes are independent code modules which may be easily modified and new ones may be added.

As represented in FIG. 6, the splitter/shader 232 functions to recognize each of the rendering primitives. The splitter/shader 232 shades each vertex of the primitive as an initialization step. After shading each vertex of the primitive, only the new points created during the subdivision process are shaded. The primitives are subdivided until their screen projection is small.

Rays can be created during the shading process. When this occurs, the rays are passed to the ray/surface intersector 236. The ray/surface intersector 236 returns the color from the ray which is used in the shading process. Once the screen projection is small enough, the primitives are converted to droplets (suggesting droplets of paint) which are passed onto the scan converter 234. Preferably, the shading model is a code module as well. This allows for a variety of shading models and techniques to be easily implemented. Techniques such as solid texturing can be used with great effect and efficiency with the software system of the present invention.

It is preferred that shading calculations be performed before hidden surface determination. The major factor contributing to this preference are (1) transparency (along with other attributes such as color and surface normal) are allowed to change as a result of the shading calculation; (2) scan conversion is much simpler as the shading models would not have to be carried with each rendering primitive; and (3) accessing texture maps and other large tables is much more efficient since only the information for a single surface element is needed at a time. Also, preferably, lights in the system are also treated as code modules. This allows virtually any type of light to be easily added.

As represented in FIG. 6, the major responsibility of the scan converter 234 of the application software system is to perform hidden surface calculations including correct handling of transparency and to perform the necessary sampling and filtering to produce pixels. The completed pixels are then sent to the pixel collector 224 (FIG. 5).

The ray surface intersector 236 of the application software system is given only those objects which are selected to block rays. Rays created during the shading process are sent to the ray/surface intersector. The nearest intersection point relative to the origin of the ray is found and shaded.

It is important to note that shading a surface point may cause generation of other rays which in turn are processed by the ray/surface intersector 236. Shading models that fire rays as part of the shading calculations will be shadowed by and/or show reflections of the objects which were given to the ray/surface intersector. The adoption of this technique is preferred since it provides an incremental approach to ray tracing, i.e., only those objects selected are ray-traced, the other objects in the scene are rendered in a more conventional fashion.

As represented in FIG. 5, once the previous portions of the application software system have been carried out, the pixel collector 224 receives the pixels from each tile processor 222A-222C to form the completed image layer, i.e., the pixel file. The pixel collector 224 then reports the status of each of the tiles back to the director 220.

Using the provided information, those skilled in the art will be able to produce software for use with the hardware of the present invention. As can now be appreciated, the hardware and software representing the presently preferred embodiments of the present invention provide an elegant solution to many of the drawbacks and disadvantages found in the prior art systems.

Having explained the high level structure and function of the presently preferred embodiments of the present invention, representative embodiments of the components comprising the V-ring will be explained in greater detail below.

E. The Presently Preferred Embodiment and Present Best Mode for Implementing the V-Ring Controller: FIGS. 7–14

As indicated earlier, the V-ring controller (26 in FIGS. 1A and 2A) performs the principle functions of distributing commands to the other video processors on the V-ring, serving as an insertion and removal point for video signals, and allowing video processors to send data to upstream video processors by way of the V-ring. The following description sets forth in detail a representative embodiment of the V-ring controller with the understanding that the other structures may be used within the scope of the invention.

FIG. 7 is a detailed block diagram showing the principal functional blocks of the V-ring controller. Many of the blocks illustrated in FIG. 11 are illustrated in greater detail in a later figure and explained in the accompanying text.

The width of the V-ring communication path is 34-bits including ring bytes A, B, C, D, a command bit (represented at CBI—command bit in) and a ring reference bit (represented at RRI—ring reference in). The ring reference bit or signal contains both horizontal reference timing bits (such as the horizontal start pulse (HSP) to be described later) and vertical reference timing bits. The basic data element passed around the V-ring is referred to as a digital signal train. The first 90 "cars" on the signal train are reserved for ring commands, the last 768 "cars" (in an NTSC compatible signal) are reserved for pixel data The pixel data carried on a train corresponds to one scanline. The horizontal start pulse of the ring reference signal marks the beginning of each train.

During each scanline of "ring time," a train is dispatched from the V-ring controller onto the V-ring. The flow of trains never stops on the V-ring. The purpose of these trains is to carry scanlines of pixel data from one place to another on the V-ring. In the following description, all of the video processors on the V-ring will be frame buffers of the type described later in this disclosure.

The V-ring has several purposes which include the following:

1. To allow real time frame capture from the V-ring controller any frame buffer on the V-ring;
2. To allow real time delivery of frames from any frame buffer to the V-ring controller;
3. To allow real time delivery of picture information from a group of frame buffers to a frame buffer selected for output, i.e., for video output; and
4. To allow high-speed transfer of general data from one frame buffer to another frame buffer, in particular, bulk data that would tend to clog the P-ring.

The general concept of using the V-ring is as follows. Each frame buffer in the V-ring is normally engaged in some sort of local function, such as paint. In this mode, the frame buffer is genlocked to house timing and the user watching the output from a frame buffer sees a changing picture as the image data is manipulated.

If a user does not want to risk being bothered by possible V-ring activity, he can clear the ring enable bit in the V-ring control port of the frame buffer. This in effect disconnects the V-ring commands from the frame buffer and the signals on the V-ring are passed unchanged through the frame buffer.

If a user wants to be the initiator of some V-ring activity, he must compile a control stack, send it to the V-ring controller, ring-enable his frame buffer, and wait for the V-ring controller to schedule his requested ring process. The communication by which this user sets up a video ring activity occurs on the P-ring.

If a user contains data on his frame buffer which might be of use to other users having other frame buffers, the user has the option of leaving his frame buffer ring-enabled. In this way, other users can access data in a frame buffer by means of the V-ring. Such access might be in the form of extracting an entire image from the frame buffer or the occasional access of a texture map.

When some other user accesses data on a frame buffer, there will be a temporary corruption of the frame buffer's local video readout for a period of time corresponding to the length of the ring access. This might only be for a few scanlines and be unnoticed, or it might be a whole frame and the analog output of the frame buffer may then be noticeably corrupted. Of course, by leaving the frame buffer ring-enabled in a large system, the user is faced with the possibility that some other user might destroy data on his frame buffer via the V-ring.

1. Organization of a Video Signal Train

Provided in FIG. 8A is a diagram showing the organization of a video signal which is passed on the V-ring. The video signal is referred to as a video signal train due to its similarity to a train having an engine (the command area) and box cars (the pixel data). Provided below is a explanation of the major characteristics of the video train.

a. Length

For both PAL and NTSC compatible video signals, a 13.5 MHz clock is used which corresponds to 74.074 nanoseconds per pixel. The PAL compatible train is 864 "cars" long for a horizontal time length of 64.0 microseconds. The NTSC compatible train is 858 "cars" long for a horizontal time length of 63.555 microseconds. Thus, the PAL and NTSC compatible trains are of slightly different length.

b. Horizontal Start Pulse (HSP)

This hardware pulse marks car number 0 of each train. Obviously, the difference between PAL and NTSC compatible signals is that the horizontal start pulses are farther apart in a PAL compatible signal. The HSP is contained in the ring reference signal and travels along the V-ring along with the other bits of the signal. It is propagated in the same way the data bits and the command bit are propagated around the V-ring. It is delayed through frame buffers in exactly the same way.

c. Command Area

The first 90 or so "cars" on the train are called the command area. The ring commands are located in the command area. Each command consists of a command word and a variable number of parameter words. Each command is tagged with a command bit which is found on a separate line in the V-ring. In the example shown in FIG. 8A, there are only two commands, and each command is followed by one parameter word. This command arrangement is typical for movement of a scanline of data from one frame buffer to another.

d. Number of Commands Possible

The number of commands that can be placed in a train depends on the length of the commands, the cutoff point beyond which commands cannot exceed (e.g. car=50), and also the design of the command control stack on the V-ring controller to be explained shortly.

e. Ring Message (RM)

The first car of each train contains ring message (RM) bits that are transmitted to all frame buffers. The most recent ring message is always available in the ring message status port on the frame buffer. Like the commands, the ring messages must, of course, be generated by the V-ring controller command control stack.

f. Ring Bytes

The data portion of the video ring consists of 32 bits arranged in four bytes labeled A, B, C and D. In the RGBK display mode, ring bytes ABCD carry RGBK data, respectively, at 8-bits per component. This signal configuration is compatible with CCIR Recommendation 601.

In the command area of the train, the first 90 cars, ring bytes C and D carry the 16-bit ring command and parameter words. In the command area, bytes A and B are unused. In the pixel boxcar part of the train, which is the last 768 cars, the ring bytes carry the pixel data as just mentioned above.

g. Latch Delays and Local Time

As a video train passes through a frame buffer, it experiences a delay of exactly two "cars". This is because each frame buffer has two latches in series, one at the V-ring input port, and one at the V-ring output port. Thus, as the train progresses through many frame buffers, it gets progressively delayed relative to time at the V-ring controller. However, from the point of view of each individual frame buffer, this delay is of no concern. The horizontal start pulse always marks the precise beginning of a scanline for a video processor since the HSP experiences the same delays as the CMD and data bits. In other words, each frame buffer then has what may be referred to as a "local ring time" which varies by two clocks from adjacent frame buffers. However, this local ring time is not to be confused with local house time.

FIG. 8B is a representation of the organization of a command word used on the V-ring. V-ring commands consist of a command word followed by a variable number of parameter words. The command word is always identified by the presence of a command bit (CMD). Regardless of the command, the command word always has the same format, as explained below.

h. Op Code

This 6-bit field is what distinguishes different V-ring commands. Of the 64 possible op codes, five are used up by commands implemented on the frame buffer.

i. Cage

In order for a command to be recognized and executed by a frame buffer on the V-ring, the 6-bit cage field of the command must match the 6-bit cage bits of the cage (or chassis) in which the frame buffer is located.

j. Slot

In order for a ring command to be recognized and executed by a frame buffer in the V-ring, the 4-bit slot field of the command word must match the 4-bit slot number assigned to the frame buffer.

2. The Video Output Setup Ring Command

Figures 8C, 8D, 8E:
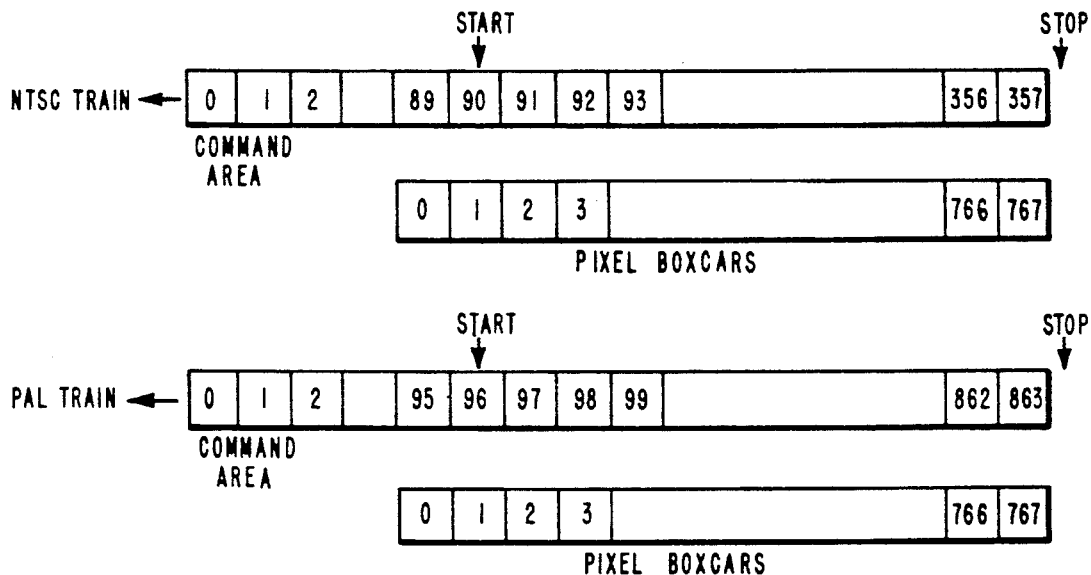

FIG. 8C is a representation of the organization of the video output setup ring command used on the V-ring. Start in FIG. 8C represents the count during which the address frame buffer is to deposit its first pixel into the train. Stop in FIG. 8C represents the count during which the addressed frame buffer is to deposit its last pixel into the train. Thus, Start and Stop are counts in the horizontal count system. In this system, a scanline ranges from Horizontal Count (HCNT)=0 to HCNT=857 for NTSC, and HCNT=863 for PAL. Pixels are carried in the last 768 "boxcars" of the train in either case.

FIG. 8D is a further representation of the organization of the video output setup ring command. In NTSC, for example, if Start=90 and Stop=858, the train will "pick up" all 768 pixels from a frame buffer which has been addressed by the command. Alternatively, if Start=90 and Stop=94, the signal train will pick up only pixels 0, 1, 2, 3 from the addressed frame buffer. Pixels 4 through 767 will pass through the address frame buffer unaltered. In general, using the Start/Stop numbers one can arrange to pick up an arbitrary, but continuous, segment of pixels from a frame buffer.

Since each frame buffer can be set up with its own Start/Stop numbers, one can arrange to assemble a single picture from several horizontally disjointed pieces located on different frame buffers. Since a segment picked up from a downstream frame buffer overwrites that which was picked up from an upstream frame buffer where the segments overlap, one can arrange to have the downstream frame buffer put "windows" over the upstream frame buffer. If one is willing to put a video output setup command on each train, one could arrange to have window of arbitrary shape, e.g., an ellipse.

a. Format

The Format field represented in FIG. 8C controls the distribution of the pixel bits onto the V-ring. FIG. 8E shows that the video random access memory (VRAM located on the frame buffers as represented in FIG. 15) bytes are labeled a, b, c, d, e, f, g h and can connect to the V-ring bytes A, B, C, D in various ways. Each VRAM byte can drive two of the V-ring bytes. One byte is called the primary byte, the other is called the secondary byte. The primary is always the byte that also drives the analog RGBK byte video output of the frame buffer represented in FIG. 15. For example, for VRAM byte "g," the primary ring output byte is D and the secondary is B. The Format field directs the VRAM bytes which V-ring bytes to drive. The 16-bit Format field can be thought of as eight 2-bit fields, one 2-bit field for each VRAM byte.

As represented in FIG. 8E, the following values for the SP (secondary/primary) bits have the following functions:

```
SP = 11 VRAM byte should drive neither V-ring byte
     10 VRAM byte should drive only the Primary V-ring
        byte
     01 VRAM byte should drive only the Secondary V-ring
        byte
     00 VRAM byte should drive both Primary and
        Secondary V-ring bytes
```

If the Format field is such that a particular V-ring byte is not being driven by a VRAM byte, that particular V-byte ring simply passes through the addressed frame buffer without alteration. This is true regardless of the values of the Start/Stop parameters. This allows pictures to be mixed in pixel depth from different video processors if desired.

It is the responsibility of the V-ring command programmer to make sure that no V-ring byte is driven by more than one VRAM byte. For example, it would be possible to set the Format field so that VRAM bytes a, d, e, h all drive ring byte A. This would cause bus contention and yield garbage. This contention would only exist during scanlines when the command control stack is extracting pixel data from the addressed frame buffer using the video output ring command.

b. Use of the Output Setup Command

Normally, if it is desired to pick up a picture from a frame buffer and deliver it to the V-ring controller, the video output set up command need only be issued once. Once received, the parameters are all latched into the frame buffer Then, when video output commands come along, those latched parameters control the manner in which the output occurs. Typically, the Start/Stop parameters are set to their "full scanline pickup" values, the hardware magnification parameters are turned off, pinning is generally turned on, and the format is set as desired. For example, for normal RGBK output onto the video ring, the following format would be used:

| Format (RGBK) = | 01 | 00 | 01 | 00 | 01 | 00 | 01 | 00 |
|---|---|---|---|---|---|---|---|---|
| | a | b | c | d | e | f | g | h |

Instead of sending the output setup command only once, it is possible to send it once each frame, perhaps during the vertical intervals. This is essential if horizontal scrolling is to be performed on the video ring. To accomplish horizontal scrolling, different numbers for Show and/or Pxstart (FIG. 8C) are sent before each frame. By adjusting the Start/Stop numbers used for each frame, some kind of moving window across the image could be obtained.

Importantly, with several frame buffers on the V-ring, an output setup command must be targeted to each frame buffer so that each is properly set up for video output. Again, these commands could be sent just once, once per frame, or once per scanline.

In summary, the video output setup command is used to "set up" the frame buffer for subsequent video output commands on the V-ring.

The setup command step is extremely general in that it prepares for many things to happen on the V-ring. For example, pixel data can be horizontally scrolled and magnified. The pixel data can also be vertically scrolled and magnified by the implicit ordering of commands on the command control stack compiled on the V-ring controller. The pixel data can be horizontally mixed between different frame buffers, using the Start/Stop fields, allowing area scan conversation segmentation of the image as well as fancy windowing functions. The pixel data can also be mixed in pixel depth between different frame buffers, using the Format parameters, as might be useful in some sort of still-store type application. Even with a single processor, when it operates in the 16-bit CY mode, the Format field can be set up so that any of the four stored 16-bit CY pictures can drive either half of the video ring.

3. The Video Ring Input Setup Command

Figure 8F:
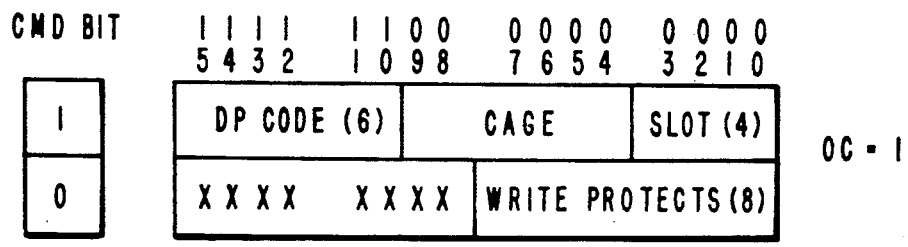

FIG. 8F is a representation of the organization of the video ring input setup command used on the V-ring. The video ring input setup command is used to set up a video processor for subsequent video input commands on the video ring.

The major field in the video input setup ring command is the write protect field. The format of the write protect bit is as follows:

P=1 means byte is write-protected
P=0 means byte is write enabled

The VRAM bytes (a, b, c, d, e, f, g, h,) whose corresponding bit in the eight bit write protect field is set will not be overwritten by the video ring input command.

4. The Video Ring Output Command

Figure 8G:
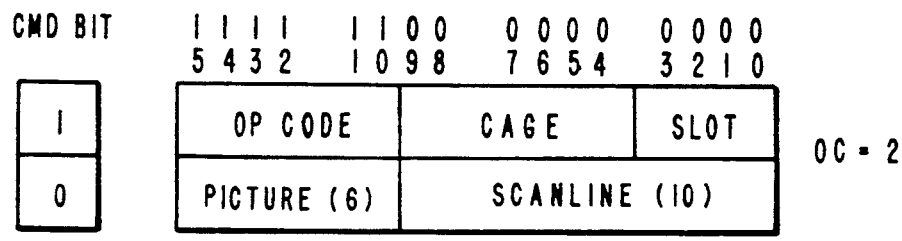

FIG. 8G is a representation of the organization of the video ring output command used on the V-ring. This ring command causes the frame buffer to output pixels into the video train in which this command occurs. The manner in which the pixels are output is controlled for the most part by the most recently received video ring output setup command.

a. Picture

This field tells the frame buffer which picture it should output data onto the V-ring.

b. Scanline

Within the picture specified by the Picture field, the Scanline field specifies which scanline should be output into the train. Normally, the visible NTSC picture is contained in scanlines 0-484 and the visible PAL picture in scanlines 0-584. As the pixel data is loaded into the video train, it may be scrolled and magnified, horizontally segmented by Start/Stop, pinned in various modes, and formatted in various ways. These data formatting attributes are all controlled by the most recently received video output setup ring command.

5. The Video Ring Input Command

Figure 8H:
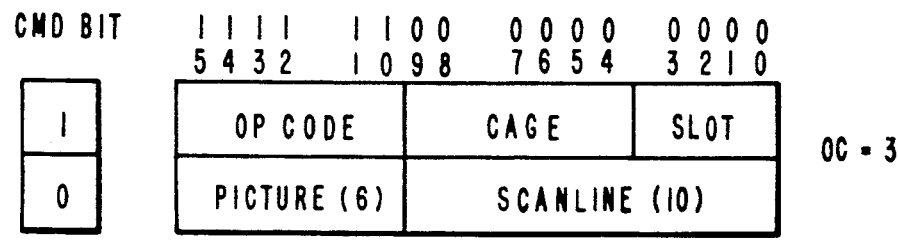

FIG. 8H is a representation of the organization of the video ring input command used on the V-ring. This command causes the frame buffer to input pixels from the video train in which this command occurs. The bytes of the pixels that will be written are determined by the write-protect field of the video ring input setup command.

a. Picture

This field tells the frame buffer into which picture it should deposit the data that comes in on the video signal train.

b. Scanline

Within the picture specified by the Picture field, the Scanline field specifies into which scan line the data will be written. The Picture and Scanline fields have the same meaning in the video ring input commands as in the video ring output commands. Only the direction of transfer is different. When data is written into a frame buffer using this command, that data also passes through to the video output port of the frame buffer along with the command information. Thus, it is possible to write a scanline into many frame buffers. This can be done by having several video input commands at the start of each signal train, each one addressed for a different frame buffer.

6. The Ring Timing Changeover Command

Figure 8I:
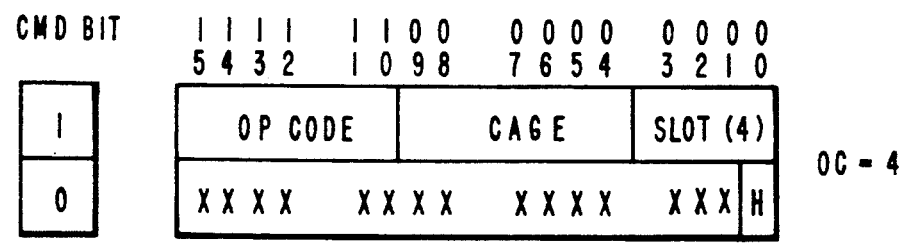

FIG. 8I is a representation of the organization of the ring timing changeover command used on the V-ring controller. The purpose of this command is to switch a frame buffer back and forth between local time and ring time. In this command, H=1 means switch to local time and H=0 means switch to ring time. The frame buffer can be genlocked either to local house timing, as would be appropriate for local paint mode and the like, or it can be genlocked to the video ring. These two timing systems can be totally asynchronous; they can be based on different crystal oscillators which free run through each other.

Since the two video setup commands simply load parameters into latches on the frame buffer, these commands can be executed with the frame buffer on either timing basis.

The video input and output commands, however, can only be properly executed if the frame buffer in question is genlocked to ring time. This is necessary because the pixel data that is read out of the VRAM must be phase locked to the V-ring clock.

The command control stack on the V-ring controller is responsible to make sure that it "changes over" the frame buffer to ring time before it tries to input or output data. To do this, it sends the timing changeover ring command.

When the timing changeover command is used, no other ring commands must exist on the same train or on the next one. This is because the timing changeover process takes between one and two horizontal pulse times and during this time the frame buffers ignore all other ring commands.

7. Data Paths Through the V-Ring Controller

Figure 9A:
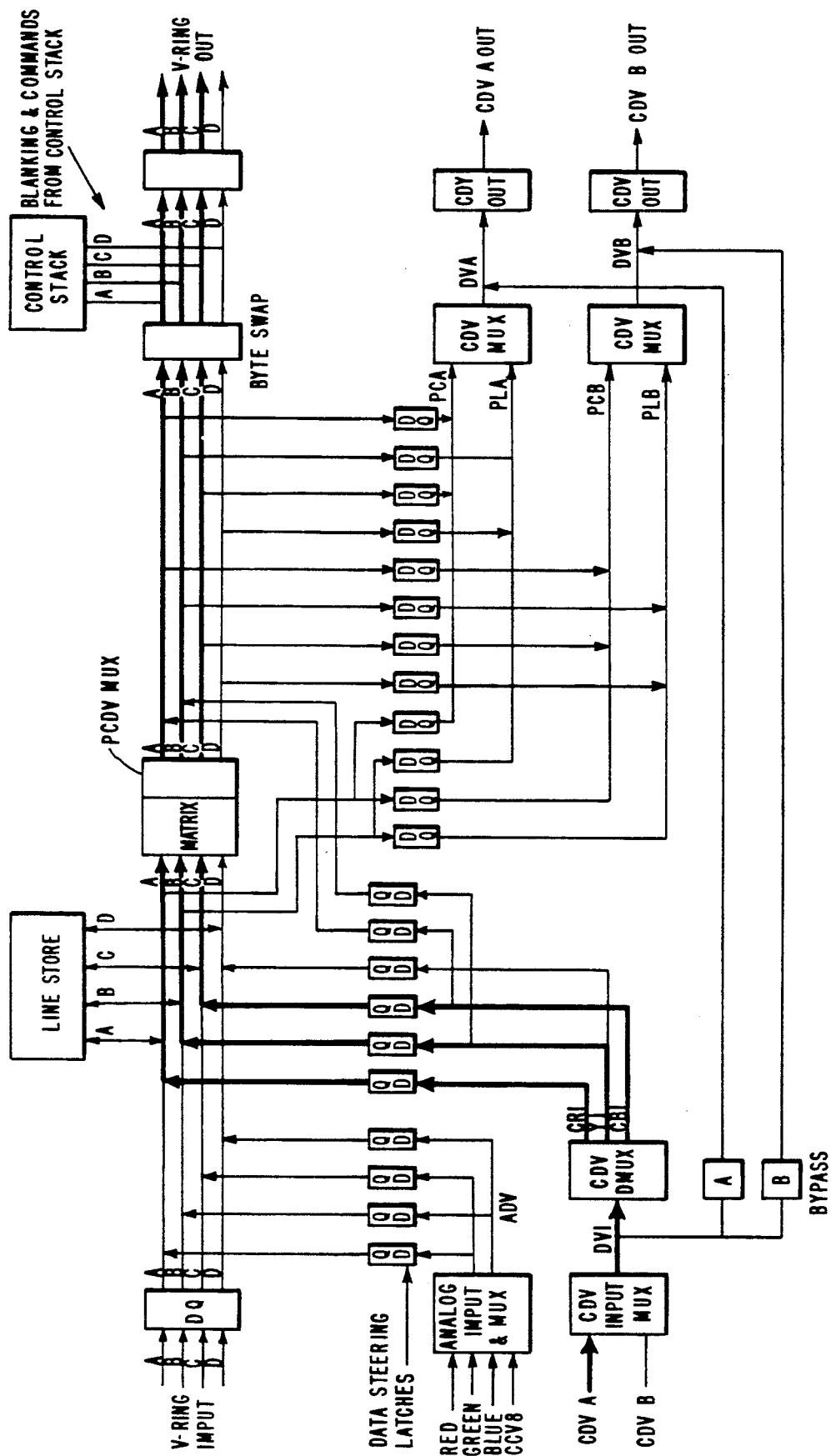

FIGS. 9A-9D are simplified block diagrams of the V-ring controller represented in FIG. 7. FIG. 9A represents the data path through the V-ring controller in the component digital video input mode. Component digital video (CDV) input is passed through one of two identical inputs (CDV A and CDV B) and is sent to the CDV INPUT MUX where one of the inputs is selected. From the CDV Input Multiplexor the CDV data goes to the CDV DMUX where one of the following two operations take place:

It is separated into component form (Cr, Y, and Cb) which is placed on bytes A, B and C respectively on the matrix input side of the V-Ring; or It is separated into Cr and Cb multiplexed onto one byte which is placed on byte A on the matrix input side of the V-ring and also separated into Y which goes to byte B. This second configuration of video data is referred to as Pseudo CDV.

If the data is in component form it can either be converted to RGB (in the matrix) or left as component to be sent on the V-ring to a frame buffer.

If the data is in Pseudo CDV form it may be stored in a frame buffer this configuration. By using the byte swap functions, to be described later, the Pseudo CDV signal can be sent to a frame buffer on bytes A&B or C&D. This allows two pictures to be stored in a frame buffer, one on bytes A and B, the other on bytes C and D.

Figure 9B:
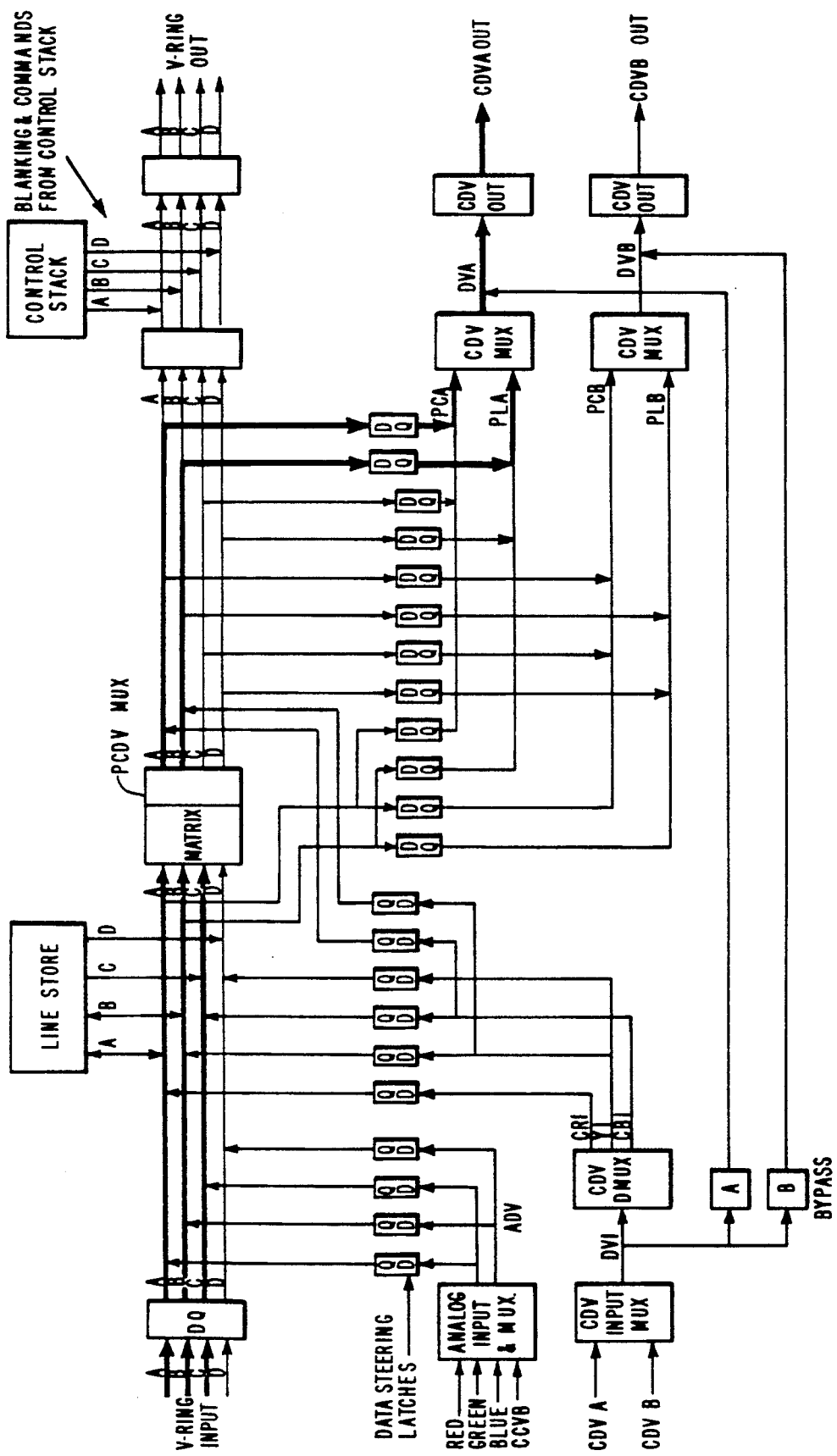

FIG. 9B represents the data path through the V-ring controller in the component digital video output mode. In this mode of operation, RGB data from a frame buffer enters the V-ring controller at the V-ring input on bytes A, B and C. In the matrix, it is converted to component form (Cb Y Cr), then the color components are multiplexed onto byte A by the PCDV MUX. This results in Pseudo CDV video on bytes A and B of the matrix output side of the V-Ring.

Alternately, the data can be stored in a frame buffer in component form and the matrix set to identity. The component data would then pass unchanged through the matrix to be converted into Pseudo CDV form in the PCDV MUX. The data could also be stored in a frame buffer in Pseudo CDV form on bytes A and B. The matrix would then be set to identity and the PCDV MUX would be turned off.

The Pseudo CDV data is routed through the data steering latches to the PC and PL buses and the CDV MUX and OUTPUT sections Here it is converted to CDV data and output on one of the CDV outputs.

Figure 9C:
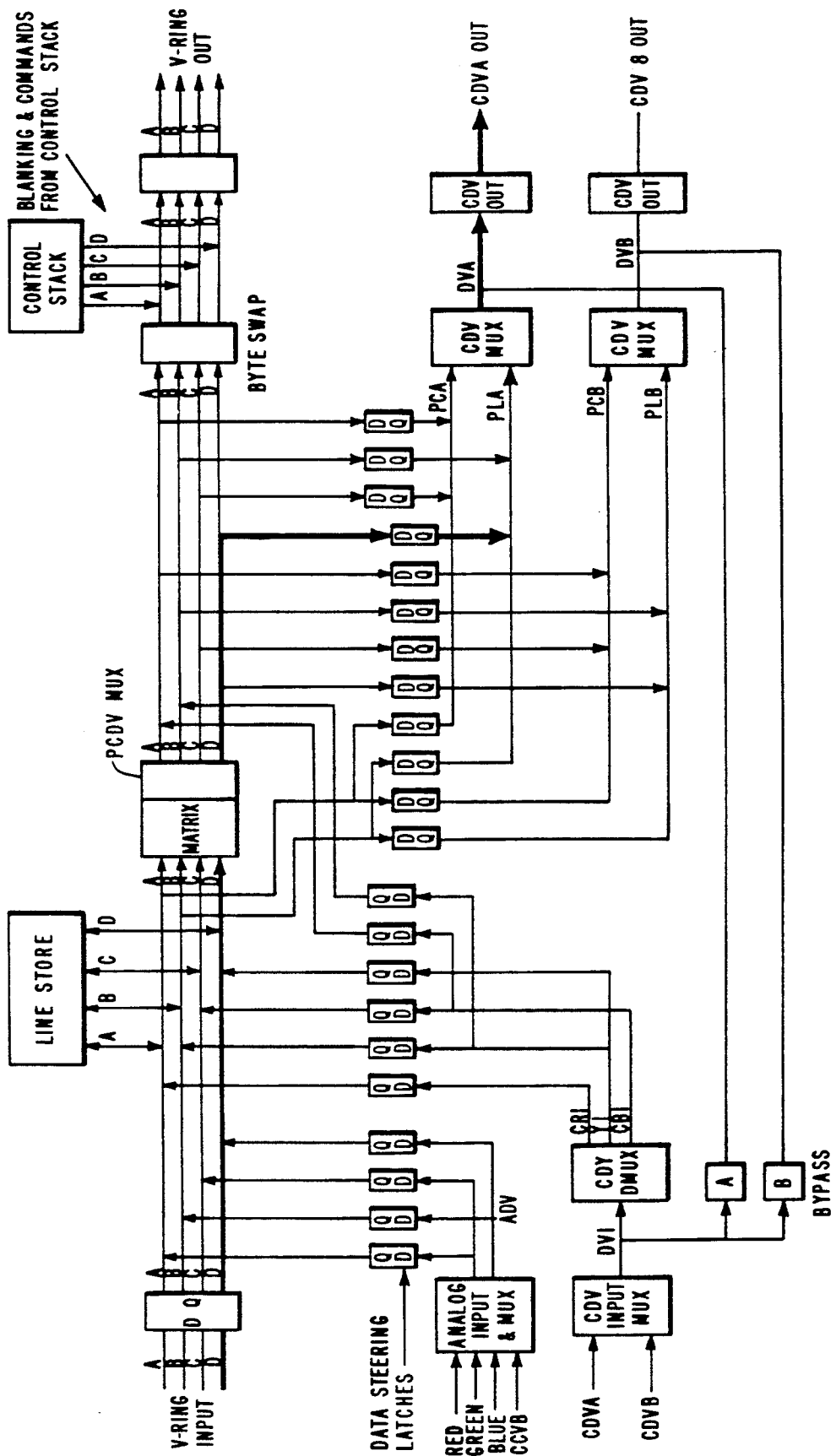

FIG. 9C represents the data path through the V-ring controller in the key channel output mode. In the key channel output mode, the K channel from a frame buffer enters the V-ring controller on byte D of the ring. It then goes through the matrix where it is unchanged and applied to the luminance input of one of the CDV MUX. In this case, the chroma input to the CDV MUX is driven to blanking.

The key channel output allows storage of the K channel data on a CDV storage device such as a digital recorder. This K channel output could also operate in parallel with the normal CDV appearing at one CDV output and key channel data appearing at the other CDV output.

Figure 9D:
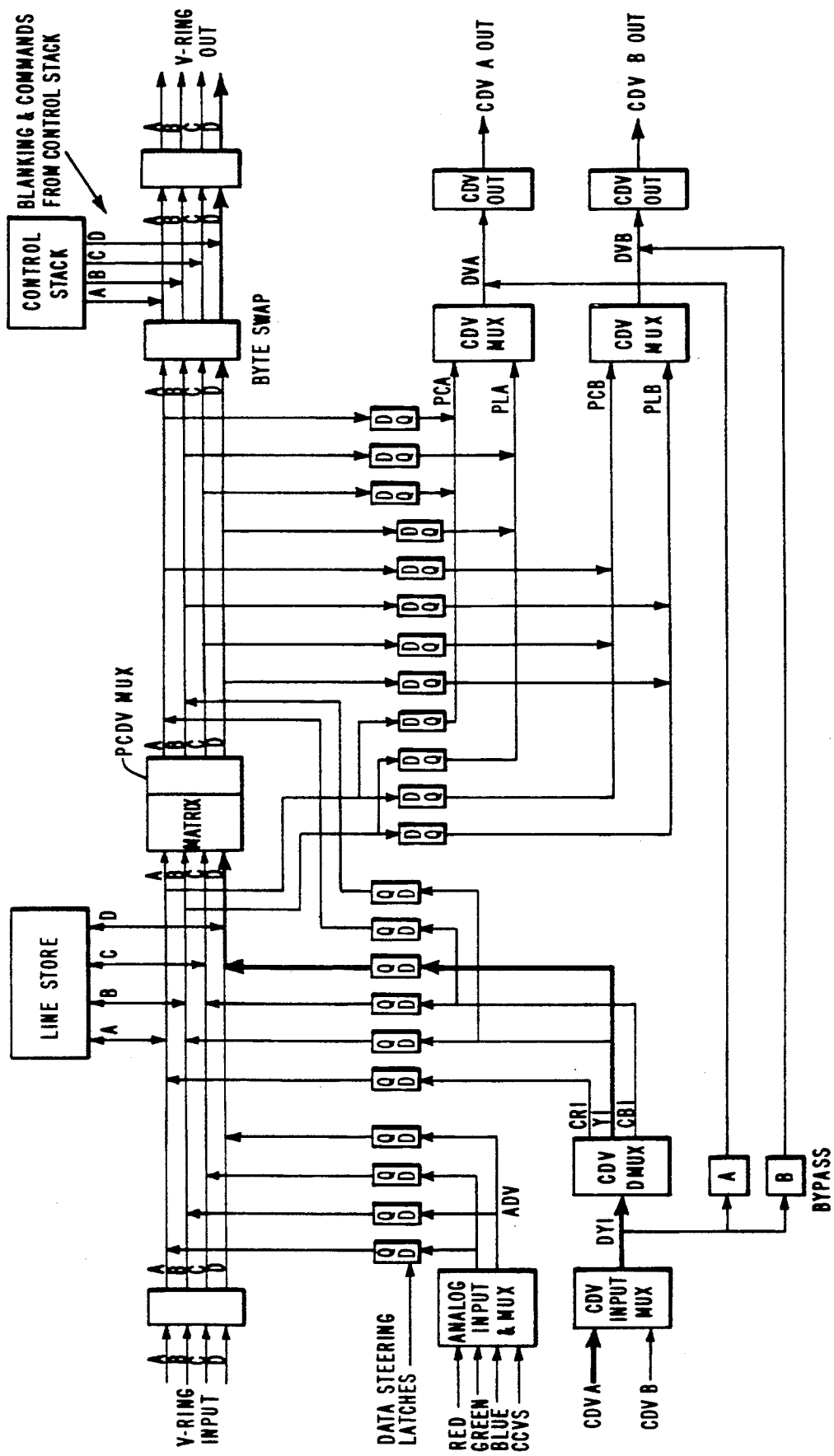

FIG. 9D represents the data path through the V-ring controller in the key channel input mode. The K channel data is recorded as luminance on a digital storage device which enters the V-ring controller on one of the CDV inputs. It then goes to byte D of the matrix input bus and passes through the matrix where it will generally be unchanged. It then goes onto the byte D of the V-ring and to addressed frame buffer.

8. The Command Control Stack of the V-ring Controller

FIG. 10A is a detailed block diagram showing the functional blocks of the command control stack represented in FIG. 7. The command control stack is used to send commands down to the frame buffers on the V-ring. The commands, some of which were summarized earlier, are sent on the V-ring during the horizontal blanking period of the video signal. The control words are 16 bits wide and are sent on the C&D bytes of the V-ring as explained earlier.

Following the control words sent during the horizontal blanking period, blanking data is sent. The blanking data can be programmed to match whatever video standard is used on the V-ring. The command control stack can also be programmed to send the proper blanking on the A&B bytes of the V-ring.

One main component of the control stack is a 16K by 20 bit command RAM. The command RAM is used to hold commands for the V-ring. The commands are placed in the command RAM in the order that they are to be sent around the V-ring. Each time a ring command is placed in the RAM the Command bit (bit 16) is set. This bit will travel with the command word around the V-ring.

The last word of a group of commands that are all for the same scan line should contain the blanking levels for the C and D bytes of the V-ring. The end of line bit (bit 17) is set with this word. This bit is used by the command control stack as an indication to quit sending commands around the ring and start sending the blanking levels.

The blanking level bit (bit 18) is also used in the command RAM. The data associated with the blanking level sets the blanking level that is sent on the A and B bytes of the V-ring. Once this level is set, it will remain the same until it is changed by new blanking level.

a. Video Start Port

The video start port is a pointer to the command RAM. It is loaded via the local bus and points to the first control word to be sent during the active video part of the frame.

b Video End Port

The video end port is loaded via the local bus to point at the last pixel data of the last line that is to be sent on the V-ring. When the values in the video counter and the video end port are equal, the video counter is loaded from the video start port.

c. Video Offset Port

By loading the video offset port to point to the top line to be displayed it can be used to make the frame scroll At the start of a frame the value in the video offset port is loaded into the vertical counter. The counter is then incremented to point at the control words that are being sent on the V-ring.

d. Vertical End Port

The vertical end port is loaded via the local bus to point to the last data of the last line that is to be sent on the V-ring. When the video end port and the vertical end port compare, the vertical counter is reloaded from the vertical start port.

e. Command Stack Control Port

The command stack (CSTACK) control port has two bits that apply to the command control stack. The first is bit 0, which, when active enables the command control stack to run. The second bit is the transfer mode bit. When the transfer mode bit is inactive, the command control stack runs as described. When the transfer mode bit is active, the vertical blanking period is ignored and only the video ports are used. The interlace mode is also ignored and every line is sent.

f. Ring Sync Generator Control Port

The interlace mode bit comes from this port. When active, the command control stack will cause every other line to be sent down the V-ring. Otherwise, the command control stack will send the lines in order.

Provided below in Glossary A is a list of all the mnemonics shown in FIG. 10A.

FIG. 10B is a state diagram showing the various states of the control stack. Provided below in Glossary B is a list of the further mnemonics represented in FIG. 10B. Also provided in Appendices A-C is the CUPL programming code for the PAL devices shown in FIG. 10A.

| Mnemonic | GLOSSARY A (FIG. 10A) Function |
|---|---|
| FSTART | Frame Start |
| ENCS | Enable Control Stack |
| VBLNK | Vertical Blank |
| SBRESET | Synchronous Board Reset |
| ENCSQ | Enable Control Stack Reset |
| INTL | Interlace |
| CSHSP | Control Stack Horizontal Sync Pulse |
| ACSHSP | Advanced Control Stack Horizontal Sync Pulse |
| SELC | Select Control Stack Memory |
| WRITE | Write Enable |
| CSCRD | Control Stack Control Port Read |
| CSCWR | Control Stack Control Port Write |
| TRANSF | Transfer Mode Enable |
| CNTEN | Count Enable |
| CPUIN | CPU In |
| COMPA | Compare |
| RD(17) | ROM Data Bit 17 |
| VERD | Vertical End Read |
| VSRD | Vertical Start Read |
| VSWR | Vertical Start Write |
| G | Stack Enable Gate |
| DIR | Direction |
| BLNKCLK | Blanking Latch Clock |
| CMDCLK | Command Clock |
| CBCLK | Command Bit Clock |
| VEWR | Vertical End Write |
| VIDEND | Video End Enable |
| VEREND | Vertical End Enable |
| VIDSTR | Video Start Enable |
| VIDOFF | Video Offset Enable |

-continued

GLOSSARY A
(FIG. 10A)

| Mnemonic | Function |
| --- | --- |
| VERCNT | Video Count Enable |
| VERPE | Vertical Parallel Enable |
| VIDCNT | Video Count |
| LDATA | Latch Data |
| WE | Write Enable |
| CE | Chip Enable |
| LEN | Latch Enable |
| DSACKC | Data Strobe Acknowledge Control Stack |
| VERERD | Vertical End Read |
| VEREWR | Vertical End Write |
| C74 | Clock 74 (74ns) |
| VORD | Video Offset Read |
| VOWR | Video Offset Write |
| VERSRD | Vertical Start Read |
| VERSWR | Vertical Start Write |
| STKEN | Control Stack Enable |
| VCD (16–31) | Video Command Data Bits 16-31 |
| VCD (0–15) | Video Command Data Bits 0-15 |
| CBS | Command Bit from Control Stack |

GLOSSARY B
(FIG. 10B)

| Mnemonic | Function |
| --- | --- |
| !SELC | Not Select Control Stack |
| S3#S6 | State 3 or State 6 |
| LDATA | Latch Data |
| !DSACK | Not Data Strobe Acknowledgement |
| !ACSHSP | Not Advanced Control Stack Horizontal Start Pulse |
| !WRITE | Not Write |
| SELC | Select Control Stack |
| EL | End Line |
| ENCSG | Enable Control Stack - Gated |
| CSHCP | Control Stack Horizontal Start Pulse |
| TRANSF | Transfer |
| !INTL | Not Interlace |
| INTL | Interlace |
| !TRANSF | Not Transfer |
| !VBLNK | Not Vertical Blankly |

9. The Line Store of the V-ring Controller

FIG. 11A provides a detailed block diagram of the line store represented in FIG. 7. The line store includes 4 Kbytes of memory, buffers to interface the memory to the local bus and the V-ring, an address counter, and four PAL devices.

The line store is a 1024×32 bit dual port memory capable of storing one line of video data, i.e. up to 1024 pixels. One of the ports of the dual port memory connects to the V-ring at the MI (Matrix Input) Bus. Through this port, data can be either put onto or captured from the ring in real time (13.5 MHz pixel rate). The second port interfaces the line store to the local bus.

The line store performs the following functions:

1. It acts as a temporary buffer when transferring data between frame buffers, necessary when the destination frame buffer is upstream on the V-ring from the source frame buffer;

2. It is used to insert VIRS into the video train so the destination frame buffer will have VIR reference when in the ring view mode;

3. It is used to capture information contained in the horizontal blanking interval such as ancillary data on a CDV input or burst reference on an analog input. This data can then be read by the P-ring controller over the local bus or it can be sent to a frame buffer over the V-ring during the active video transfer;

4. It is used to insert ancillary data into the horizontal blanking interval of the CDV output; and 5. It is used to put test signals onto the V-ring.

a. Memory

The line store memory preferably consists of eight CY7C149 static RAMs whose data lines connect to the LD bus and whose address lines connect to the LA bus. These are 1K by 4 bit high speed RAMS capable of reading or writing data at the pixel clock rate of 13.5 MHz. The LD bus connects to two sets of bidirectional buffers, one set going to the local bus and the other going to the V-ring. The LD bus comes from the address counter.

b. Local Bus Interface

The line store to local bus interface consists of four 74F244 octal bidirectional buffers, the CPUSM PAL, and parts of the LSWRC PAL, and the address counter. Data from the local bus section (D 31 - 0) interfaces to the LD bus through the four bidirectional buffers. The common output enable pinouts of the buffers are controlled by the CPUSM PAL while the direction lines connect to the SWRITE* signal from the local bus interface section.

The address lines from the local bus section (A 11 - 2) connect to the data inputs of the three address counter devices. During a local bus access, the counters are disabled and the load input to the counter is held low which causes the address on the data inputs to appear at the counter outputs. This load input is controlled by the CPUSM PAL. The write enable and chip select for the memory chips are generated in the CPUSM PAL, then sent to the LSWRC PAL which selects them during a local cycle.

c. CPUSM PAL

The CPUSM PAL (CPU State Machine) generates most of the signals required to complete a local bus to line store read or write cycle. FIG. 11B provides the CPU State Machine diagram. Provided in Appendix D is the CUPL programming code for the CPUSM PAL device.

d. Inputs to the Line Store

The LSMQ 3 - 0 and the SSELS* inputs to the line store are used to initiate a local bus cycle. The SSELS* is a decoded signal from a local bus interface section and is used to select the line store while the LSMQ bits hold off the local bus cycle until the line store state machine is finished with its present cycle (i.e., returns to state 0).

The SWRITE* input indicates to the state machine whether the cycle is to be a read cycle or a write cycle.

The DS* input is derived from the local bus interface section and is used to generate the DSACKL* signal. The DSACKL* signal acknowledges to the CPU that the local bus access cycle is complete.

The SBRESET* signal ensures that the CPU state machine starts out in state zero when the system is initialized.

e. Outputs

The signals shown in the CPU state diagram of FIG. 11B are the outputs as labeled on the CPUSM PAL shown in FIG. 11A.

LADLD* (Line Store Address Load) is the load to the address counter used during a local bus cycle.

LAWE* (Line Store to Local Bus Write Enable) asserts the write enable during a local bus write cycle.

LSAOE* (Line Store to Local Bus Output Enable) enables the bidirectional buffers during a local bus cycle.

LCSEN (Line Store Chip Select Enable) asserts the chip select during a local bus access.

f. Line Store State Machine—LSSTM PAL

FIG. 11C provides the line store state machine state diagram for the line store PAL device. The line store state machine is contained in the LSSTM PAL device shown in FIG. 11A with its inputs coming from the command processor section and the ring sync generator (FIG. 10A). Provided in Appendix E is the CUPL programming code for the LSSTM PAL device.

As shown in FIG. 11C, the line store state machine has four "active" states and six "wait" states. During the active states, the line store is doing one of four basic functions as summarized below:

1. State 2 (S2)/Write Line State. During State 2, the active video portion, a line (768 pixels) is written from the V-ring input into the line store memory.

2. State 4 (S4)/Read Line State. During State 4, a line of video data (768 pixels) is read from the line store memory and put onto the V-ring at the MI bus;

3. State 6 (S6)/Write Horizontal Blanking State. During State 6, the horizontal blanking interval of an incoming video signal (CDV or analog input) is written into the line store memory; or 4. State 8 (S8)/Read Horizontal State. During State 8, which is active during horizontal blanking, data in the line store memory is put onto the V-ring at the MI bus. This data is then picked up by the CDV output section and output during the blanking interval (ancillary data).

A state machine cycle is initiated by a command from the command processor section which moves the machine into one of the wait states. Here, the machine waits for a timing signal, which has the correct relationship to the video signal, and then moves into one of the active states. These timing signals may be derived from the sync generator or are derived from the V-ring reference at the V-ring input. At the end of an active state, another timing signal, or the termination of the same one, moves the machine back to S0 where it waits for the next command.

g. Line Store Commands

Provided below in Table A is a list of commands for the line store.

TABLE A

| CDMD* 3-0 | COMMAND | |
|---|---|---|
| 0 0 0 0 | NOOP | No operation, do nothing. |
| 0 0 0 1 | WLCMD | Write Line Command write a line to the line store. |
| 0 0 1 0 | RLCMD | Read Line Command read a line from the line store. |
| 0 0 1 1 | WHCMD | Write Horizontal Blanking Command write the horizontal blanking interval to the line store. |
| 0 1 0 0 | RHCMD | Read Horizontal Blanking Command read the horizontal blanking interval from the line store. |
| 0 1 0 1 | FCCMD | Frame Capture Command set the FCM latch. |
| 0 1 1 0 | ANCMD | Ancillary Mode Command set the ANCM latch. |
| 0 1 1 1 | EFCMD | End Frame Capture Command clear the FCM or ANCM latch. |

The RIHR* (Ring Input Horizontal Reference) comes from the V-ring input and is used to denote the end of active video on the V-ring input.

The RICS* (Ring Input Commands Start) is derived from the RIHR* signal and is used to denote the start of active video on the V-ring input.

The ACTV1* and ACTV2* (Active Video) signals come from the sync generator and are used to denote the active video area at the V-ring output. The two signals are timed differently, and one is selected depending on whether or not a matrix circuit is present.

The OBLNK1* and OBLNK2* (Output Blanking) signals come from the sync generator and denote the horizontal blanking area at the V-ring output. The two signals are timed differently, and one is selected depending on whether or not a matrix circuit is present.

The EEAVP* (Early End Active Video Pulse) signal takes place some time before the end of active video. This signal is used to terminate the cycle when transferring blanking interval data to a frame buffer.

The RBLNK* (Ring Blanking) denotes the horizontal blanking area when writing ancillary data or burst to the line store.

The SBRESET* and SSELS* inputs both force the state machine into its idle state (S0). They also reset the FCM and ANCM latches.

h. Outputs

The LSMQ 3-0 (Line Store State Machine Q) outputs shown in FIG. 11A are used by several circuits on the V-ring controller to arbitrate access to the V-ring between the line store and other circuits. Because some of these circuits are downstream on the V-ring from the line store, the LSMQ signals must be delayed to match the data delays. This is done by the state delay section. In the state delay section, the LSMQ signals are delayed by one clock to become the DLSM signals which are then sent to the matrix on the V-ring controller where they are delayed by the same number of clocks as the data. From the output of the matrix, the signals, now named ILSM, are sent back to the state delay section where they are delayed one more clock period and named SLSM.

The FCM* (Frame Capture Mode) signal is the output of a latch which is set when doing burst captures.

The ANCM* (Ancillary Mode) signal is the output of a latch which is set when doing certain ancillary data captures.

i. Address Counter

As represented in FIG. 11A, the line store address counter preferably consists of three 74FR163 synchronous counter devices. The count enable (LCNTE) and the clear (ADCLR*) signals, which control the counter during ring access, are derived from the LSWRC PAL.

During ring access, the address counter is controlled by the LSWRC PAL and LSSTM PAL. During the wait states, which precede the read and write states, the ADCLR* signal is asserted so the counter is held at count 0. During the read or write state, the counter is allowed to run (count up) until the state machine moves into the next state where it is either cleared or held at its last count (during state 0). During certain ancillary data transfers (ANCM asserted), the LCNTE line is toggled so the counter runs at one-half normal rate.

j. The LSWRC PAL (Line Store Write/Read Control)

The LSWRC PAL generates the control signals for the address counter plus the chip select and write enable for the memory chips. Appendix F provides the CUPL programming code for the LSWRC PAL device.

k. The LSRBC PAL (Line Store to V-Ring Buffer Control)

The LSRBC PAL controls the line store to V-Ring buffers. Appendix G provides the CUPL programming code for the LSRBC PAL device.

10. Ring Input Section and Command Processor Section

FIG. 12A shows a detailed block diagram of the V-ring input section of the V-ring controller represented in FIG.

7. The V-ring input section includes the V-ring input interface, the analog input latches, the CDV input latches, the command latch, and the matrix bypass latch. Also shown in FIG. 12A is the input buffer control (INBUF) PAL.

a. V-ring Input Interface

The V-ring input interface buffers data coming onto the V-ring controller from the V-ring. If necessary, the V-ring input interface buffers retime the data to the V-ring controller master clock (labeled C74). The incoming data is preferably buffered in four 74HC244 octal buffers, one for each data byte. The data bytes are labeled A, B, C, and D on the block diagram of FIG. 12A and are assigned the following bits:

Byte A = 24 bits through 31
Byte B = bits 16 through 23
Byte C = bits 8 through 15
Byte D = bits 0 through 7 b Timing Latch #1

After being buffered by the V-ring input interface buffers, the data is sent to the first timing latch which consists of four 74F374 octal latches. In the first timing latch the data is latched by a 13.5 MHz clock labeled R74. The R74 clock is derived from a 27 MHz clock (VRCLK) which travels around the ring with the data. 74 octal latches. In the second timing latch the data is latched by another 13.5 MHz clock labeled M74. M74 is a tunable clock in that its timing relationship can be varied relative to R74 and C74 clock signals.

c. Timing Latch #2

From the first timing latch, the data is sent to a second set of timing latches consisting of four 74F374 octal latches. In the second timing latch the data is latched by another 13.5 MHz clock labeled M74. M74 is a tunable clock in that its timing relationship can be varied relative to R74 and C74 clock signals.

d. Ring Data and Command Latches

From the second set of timing latches, the data is sent to the ring data latch and the command latch. Both of these latches are clocked by the master clock (C74). The ring data latch consists of four 74F374 octal latches whose output enables are controlled by the input buffer contro PAL.

The command latch consists of two 74F374 octal latches on V-ring data bytes C and D. The data from these latches is sent along with the command bit to the command processor section.

e. Analog Input Latch

The analog input latch consists of eight 74F374 octal latches which receive data from the V-ring controller analog input and drive it onto the V-ring.

f. CDV Data Latch

The CDV data latch shown in FIG. 12A consists of three 74F374 octal latches which receive data from the CDV input section and drive it onto the V-ring. As in the ring enables of the CDV data latch are controlled by the input buffer control PAL. Data comes from the CDV input section on the three buses labeled YI, CBI, and CRI as represented in FIG. 12A. These represent the luminance and color difference signals Y, Cb, and Cr, respectively.

The data from the CDV input section can be in one of two forms, the above-mentioned Y Cb Cr or a form referred to as Pseudo CDV. The Pseudo CDV form has the Y data on the YI bus and the Cr data multiplexed onto the CBI bus. In this form, a picture can be transferred on just two bytes of the V-ring and stored in two memory bytes of the frame buffer.

g. I Key Latch

As represented in FIG. 12A, the input key mode latch (IKEY LATCH) takes luminance data from the YI bus and puts it on byte D of the V-Ring. This latch is used to retrieve key data which was previously stored on some CDV device.

h. Matrix Bypass Latch

The matrix bypass latch represented in FIG. 12A, consists of two 74F374 octal latches whose inputs connect to the YI and CBI buses and whose outputs connect to V-ring bytes A and B by way of the VO bus. The output enables of the matrix bypass latch are derived from the input buffer control PAL. The matrix bypass latch allows Pseudo CDV data from the CDV input to be put directly on the V-ring after the matrix. This operation is useful for certain still store functions.

i. INBUF PAL

The INBUF PAL represented in FIG. 12A selects which input source will be put on the V-ring and ensures there is no contention with the line store section which interfaces to the ring at the same point.

All the inputs to the INBUF PAL come from either the video IO control port or the line store state machine (FIGS. 11A–11C). The SIN lines from the video IO control port select which video source is to be input. Provided below in Table B is a list of the SIN line values and the corresponding video input source.

TABLE B

| SIN (2-0) Value | Video Input Source |
| --- | --- |
| 0 | None |
| 1 | V-RING Input |
| 2 | CDVA |
| 3 | CDVB |
| 4 | RED from analog input red |
| 5 | GREEN from analog input green |
| 6 | Blue from analog input blue |
| 7 | CCVS from analog input CCVS |

The NTXON bit from the video IO control port determines whether the data will go through the matrix or around the matrix by way of the matrix bypass latch.

The IKEY bit turns on the IKEY latch and enables the luminance data from the CDV input onto byte C of the V-ring.

The TRANS bit puts the board in transparent mode which causes the V-ring data to pass through the board unchanged with the possible exception of the matrix.

The four inputs from the line store state machine (LSMQ 3-0) (FIG. 11C) are used to override the selected input and enable the line store onto the V-ring during certain line store operations.

Provided in Appendix H is the CUPL programming code for the INBUF PAL.

j. Command Processor

FIG. 12B is a block diagram showing the organization of the command processor represented in FIG. 12A.

11. Ring Output Section

FIG. 13 shows a detailed block diagram of the V-ring output section which is represented in FIG. 7. The V-ring output section includes the PCDVMUX, the CDVA and CDVB output latches, the CDV blanking drivers, the matrix output bypass latch, the byte swap latches, and the V-ring output latch. Also shown are the various PALs that control the circuits in this section.

a. Pseudo CDV MUX

The Pseudo CDV MUX represented in FIG. 13 consists of two 74F825 octal registers and three 74F374 octal latches whose inputs come from the matrix output. The outputs from the two registers both drive V-ring byte A while the inputs come from byte A for one register and byte C for the other.

In the normal operating mode, referred to as the component mode, the register whose input comes from byte A and the three latches are turned on, and the data passes through unchanged. The other register is turned off.

In the Pseudo CDV mode, Cr data on byte A and Cb data on byte C are latched into the registers at one-half the normal clock rate. The registers then alternately enabled onto ring byte A which in effect multiplexes Cr and Cb data onto one byte. The luminance (Y) signal passes through the latch on byte B and forms the other byte of the Pseudo CDV signal. Table C provides the relationship between the pseudo CDV MUX inputs and outputs.

TABLE C

| PSEUDO CDV MUX Inputs | | | | | | | | |
|---|---|---|---|---|---|---|---|---|
| Byte A | Cr1 | Cr2 | Cr3 | Cr4 | Cr5 | Cr6 | Cr7 → | Cr720 |
| Byte B | Y1 | Y2 | Y3 | Y4 | Y5 | Y6 | Y7 → | Y720 |
| Byte C | Cb1 | Cb2 | Cb3 | Cb4 | Cb5 | Cb6 | Cb7 → | Cb720 |
| PSEUDO CDV MUX Outputs | | | | | | | | |
| Byte A | Cb1 | Cr1 | Cb3 | Cr3 | Cb5 | Cr5 | Cb7 → | Cr719 |
| Byte B | Y1 | Y2 | Y3 | Y4 | Y5 | Y6 | Y7 → | Y720 |
| ↑ First Pixel | | | | | | | | ↑ | b. PCDVM PAL

As represented in FIG. 13 the inputs to the PCDVM PAL are obtained from the video IO control port and the ring sync generator.

The DLSM inputs are obtained from the line inputs of the line store state machine.

The SIN 2-0 and MTXON inputs are used to turn the latches off when in the matrix bypass mode.

The CMPT bit is used to put the MUX into Component or Pseudo CDV mode where CMPT=component digital video and CMPT*=psuedo component digital video.

The PSYNC* is derived from the ring sync generator and is used to synchronize the PSEUDO CDV MUX so that Cb is always on the first pixel.

Provided in Appendix I is the CUPL programming code for the PCDVM PAL device.

c. Byte Swap

In FIG. 13, the byte swap section consists of eight 74F374 latches and the BYTSW PAL. The byte swap functions to steer the V-ring data in byte pairs (words) to other byte pairs prior to being sent to the V-ring output latch.

This data steering is controlled by the two BSC (Byte Swap Control) bits in the video IO control port. The relationship between the two BSC bits and the output of the byte swap section is shown in Table D.

TABLE D

| BSC Bits | Byte Swap In | Byte Swap Out |
|---|---|---|
| 0 0 | A | A |
| | B | B |
| | C | C |
| | D | D |
| 0 1 | A | A & C |
| | B | B & D |
| | C | A & C |
| | D | B & D |
| 1 1 | A | C |
| | B | D |
| | C | A |
| | D | B | d. BYTSW PAL

The BYTSW PAL represented in FIG. 13 enables the appropriate byte swap latches and prevents contention with the command control stack or ring message section which drive the ring at the same point. Inputs to the BYTSW PAL come from the video IO control port, the line store state machine, and the ring sync generator. The BSC IO bits are derived from the video IO control port.

The SIN 2-0 bits enable the selected byte swap latches whenever any input except the V-ring is selected.

The LSMQ 3-0 bits enable the selected latches when the line store is inserting data onto the V-ring. The CMDAA (Command Area Active) and RMTP (Ring Message Timing Pulse) signals disable the byte swap latches so the control stack or ring message circuit can drive the V-ring.

The TRANS signal turns on the straight through latches and overrides all other inputs.

Appendix J provides the CUPL programming code for the BYTSW PAL.

e. V Ring Output Latch

The V-ring output latch and matrix bypass output latch represented in FIG. 13 consists of four 74F374 latches driving the V-ring output through 33 ohm resistors. The resistors serve as source terminations which absorb reflections caused by the unterminated receivers at the input of the next board on the ring. The matrix bypass output latch consists of a pair of 74F374 latches. These latches route the data from bytes A and B of the MI bus directly to the CDV output, thus bypassing the matrix and Pseudo CDV MUX sections. Control of these latches is derived from the CDVOUT PALs. These latches are used in certain types of still store operations.

f. CDV Output Latch

There are two identical CDV output latches represented in FIG. 13, one for each of the two CDV outputs. Each CDV output latch consists of four 74F374 latches and a control PAL. In normal operation, the CDV output section requires pseudo CDV data at its input, which can be on bytes A and B or bytes C and D. The CDV output latch circuit selects the byte pair, depending on the UWD (Upper Word Data) bit in the video IO control port (FIG. 12). For output A, the UWDA signal selects bytes A and B while the UWDA* signal selects bytes C and D.

If the key output mode is selected (AKEYM or BKEYM in the video IO control port), byte C is sent to the luminance (PL) input of the CDV output section and the chroma (PC) input is driven to blanking, resulting in a luminance only CDV output.

g. CDVOUT PALs

The inputs to the two identical control PALs, both labeled CDVOUT in FIG. 13 are obtained from the video IO control port, the output sync generator, and the line store state machine.

The CDVAON/CDVBON bits enables the pair of latches selected by the UWDA/UWDB bits while the CDVAON* signal disables the latches and allows the input to the CDV output section to be driven to by the CDV blanking drivers.

The UWDA/UWDB bits select data from bytes A and B while UWDA*/UWDB* select data from bytes C and D. The AKEYM/BKEYM bits enable the key output mode. The CCDVB* (Composite CDV Blanking) signal is obtained from the sync generator and disables the latches during blanking so the inputs to the CDV output section can be driven to blanking by the blanking drivers. The MTXON* and IN1 (from the SIN bits) signals turn on the matrix bypass output latch. The DLSM 3-0 bits from the line store state machine are used to insert ancillary data from the line store into the horizontal blanking interval.

Appendix K provides the CUPL programming code for the CDVOUT PAL devices represented in FIG. 13.

h. CDV Banking Drivers

The CDV blanking drivers represented in FIG. 13 consist of a pair of 74F244 buffers, for each of the two CDV outputs, and the CDVBLK PAL. The inputs to these buffers are hardwired to CDV blanking levels, 10h for luminance and 80h for chroma, and the outputs connect to the PL and PC buses. During blanking or when the CDV output is turned off, the buffers are turned on and drive the blanking levels onto these buses.

i. CDVBLK PAL

The inputs to the CDVBLK PAL represented in FIG. 13 come from the video IO control port, the line store state machine, and the output sync generator. The CDVAON* and CDVBON* signals turn on the blanking drivers to their respective CDV output section. The AKEYM and BKEYM signals turn on the blanking drivers to their respective PC bus so only chroma is blanked.

The HCDVB (Horizontal CDV Blanking) and VCDVB (Vertical CDV Blanking) signals are anded together to form a Composite CDV Blanking signal which is used to enable the blanking drivers. The DLSM bits from the line store state machine are used to disable the blanking drivers during the insertion of ancillary data.

Appendix L provides the CUPL programming code for the CDVBLK PAL device.

12. Matrix Module

Provided in FIG. 14 is a block diagram of the matrix module represented in FIG. 7. Those skilled in the art will readily recognize the structure of the matrix module. The matrix module represented in FIG. 14 may be routinely fabricated by those having ordinary skill in the art.

Briefly, the matrix module functions to convert a component digital video signal found on bytes A, B, and C of the V-ring from one format to another, e.g., from RGB format to CbYCr format. This is accomplished by properly programming the insertion of the pixel bits into, and their removal from, the RAM devices. The outputs of the RAM devices are passed to adder circuits and the resulting signal is pinned to ensure that no value less than zero or greater than all 8 bits asserted onto bytes A, B, and C which is possible since the outputs of the adders provide 16 bits of precision.

F. The Presently Preferred Embodiment and Present Best Mode for Implementing the Frame Buffer: FIG. 15

FIG. 15 provides a block diagram of a representative embodiment of the frame buffers included on the V-ring in the presently preferred embodiment. Each frame buffer is able to store a plurality of frames at video resolution. The video images contained in the frame buffer can be manipulated on a pixel-for-pixel basis by the computational subsystem connected to the frame buffer by way of the local bus. Any of the video images stored on the frame buffer can be viewed on an RGB monitor attached to the analog output.

Generally, the frame buffer serves as the picture-holding element for a general purpose graphics processing "slice" of the embodiment as explained earlier in connection with FIG. 1B and 1C. Commonly, such a slice consists of a computational subsystem, a DRAM section, and the frame buffer.

The frame buffer receives instructions from a computational subsystem by way of the local bus ports and also from the V-ring controller by way of the V-ring. It will be appreciated that depending upon the complexity of the functions to be carried out by the frame buffer, the structure of the local bus will need to vary to accommodate the complexity of the commands given to the frame buffer by the computational subsystem. For example, the local bus ports may contain circuits to provide port dcodes, color map dcodes, and video RAM decodes. Furthermore, it may contain various status ports.

The data transcievers (DATA XCVRS) provide a link between the video RAM modules and the data lines of the local bus. Preferably, the data transceiver section contains two complete 64 bit transceiver sets. One transceiver set is straight through while the other transciever set shuffles the data bits around in a certain way that is useful for high precision software color operations.

The address section represented in FIG. 15 performs the function of taking the logical address (in the form of picture, scanline, pixel) and converting it to a physical or hardware address (in the form of bank, section, row, column) The address section may perform these functions whenever access to the video RAM modules is desired by way of the local bus or by way of the V-ring, or to output the data contained in the video RAM modules to the analog output.

The video RAM modules represented in FIG. 15 preferably include RAM devices organized to store video data Preferably, the video data is in the form of R, G, B, and K.

The ring command processor examines incoming ring commands (validated by the command bit input at CMDBI) to determine if the command is addressed to the particular frame buffer. The ring command processor then executes the command after the appropriate parameter words are received.

The color maps and analog section receives video data from the video RAM modules by way of the multiplexor system (MUX SYSTEM) (four channels, ten bits each). Each channel of data is passed through a separate 10 bit to 10 bit color map RAM look-up table. The output of the color map RAMs is fed to the analog section which produces an analog RGB output. The sync signal for the frame buffer is generated by the sync generator controlled by the timing and arbitration circuit.

G. Representative Software

Provided in Appendix M is a representative source code listing used for programming the devices included in the described embodiment of the V-ring. It is to be understood that the provided source code listing is just one of the many possible examples of source codes which could be used to program the V-ring devices.

H. Conclusion

From the foregoing, it will be appreciated that the present invention provides a high speed computer graphics image computation system and method which is particularly adapted for carrying out demanding computer graphics computation tasks. The components of the video processing ring (V-ring) synchronously operate to move the large amounts of data associated with digital video signals to locations within the graphics image computation system. Thus, the V-ring enhances the performance of the computational subsystems of the processor ring (P-ring) by providing a flexible structure used for transporting bulk data that might otherwise overwhelm and slow the operation of the P-ring.

The embodiments of the present invention may be configured into one or more logical machines to most efficiently handle a variety of graphics image computation tasks Moreover, the embodiments of the present invention may be easily expanded to include additional computational subsystems on the P-ring and additional frame buffers on the V-ring. The described embodiments readily interface with external video and computing devices thus increasing the versatility of the embodiments. By the incorporation of the present invention, a high speed computer graphics image computation system is achieved which performs better than previously available systems.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX A to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING (CNTLST PAL)

```
PARTNO    45-038041-01B;
NAME      cntlst;
DATE      Aug. 11 1988;
REV       B;
DESIGNER  Lynn Arbuckle;
COMPANY   BTS;
ASSEMBLY  DV-5000 board;
DEVICE    p22v10;    /* 22V10A    */
LOCATION  U290;

/*******************************************************************/
/*                                                                 */
/* A state machine that controls the Video Ring Control Stack.     */
/* Also the bus arbiartion between the 68020 and the Video ring    */
/* is handled.                                                     */
/*                                                                 */
/*******************************************************************/
/* Allowable Target Device Types: PAL22v10A                        */
/*******************************************************************/
```

```
/* In going to Rev. B, Aug. 11 1988; forced vertical interval to be
   noninterlaced at all times */

/** Inputs **/

PIN 1        = c74      ;    /* Clock                              */
PIN 2        = !srest   ;    /* sync board reset                   */
PIN 3        = !cr      ;    /* CPU Request to get in to memory*/
PIN 4        = !wr      ;    /* Write line from 68020              */
PIN 5        = !ahsp    ;    /* Advanced horz start pulse          */
PIN 6        = !hsp     ;    /* horz start pulse                   */
PIN 7        = spareb   ;    /* spare                              */
PIN 8        = int      ;    /* interlace mode                     */
PIN 9        = !vblnk   ;    /* vertical blanking                  */
PIN 10       = en       ;    /* enable video ring control          */
PIN 11       = trans    ;    /* transfer mode                      */
PIN 13       = el       ;    /* end of line   Bit 17               */

/** Outputs **/

PIN 14       = !cnten   ;    /* Count enable                       */
PIN 15       = !cpuin   ;    /* the cpu is into the memory         */
PIN 16       = !ce      ;    /* RAM chip enable                    */
PIN 17       = !we      ;    /* RAM write pulse                    */
PIN 18       = ldata    ;    /* latch data on rising edge          */
PIN [19..21] = [S0..2]  ;    /* state Number output                */
PIN 22       = !len     ;    /* latch enable                       */
PIN 23       = !DSACK   ;    /* control stack DSACK                */

/** Declarations and Intermediate Variable Definitions **/

Field pres   = [S2..0]  ;    /* Present State                      */
Field nex    = [S2..0]  ;    /* Next State                         */

$define H     'b'1
$define L     'b'0
$define s0    'h'0
$define s1    'h'1
$define s2    'h'2
$define s3    'h'3
$define s4    'h'4
$define s5    'h'5
$define s6    'h'6
$define s7    'h'7
$define s8    'h'8
$define s9    'h'9
$define sa    'h'a
$define sb    'h'b
$define sc    'h'c
$define sd    'h'd
$define se    'h'e
$define sf    'h'f / Logic Equations /

/*        el & int & en & vblnk & hsp & ahsp & wr & cr        sx & sx */
nex.d =                           !hsp &              !cr & pres:s0 & s0
    #                     !en &    hsp &              !cr & pres:s0 & s0
    #                          !DSACK & !ahsp & wr &  cr & pres:s0 & s1
    #                          !DSACK & !ahsp & !wr & cr & pres:s0 & s2
    #                      en &    hsp &                   pres:s0 & s4
    #                                                      pres:s1 & s3
    #                                                      pres:s2 & s6
    #                                                      pres:s6 & s7
    #                                                      pres:s3 & s7
    # !el &                                                pres:s4 & s4
    #  el & int & !trans & !vblnk &                        pres:s4 & s5
    #  el &        trans &                                 pres:s4 & s0
    #  el & !int &                                         pres:s4 & s0
    #  el &  int &          vblnk &                        pres:s4 & s0
    # !el &                                                pres:s5 & s5
    #  el &                                                pres:s5 & s0
    #                                                      pres:s6 & s0
    #                                                      pres:s7 & s0 ;

/*        el & int & en & vblnk & hsp & ahsp & wr &    sx  */
cnten.d =                 en &    hsp &            pres:s0  /*s4*/
```

```
        # !el &                                               pres:s4  /*s4*/
        #  el & int & !trans & !vblnk &                       pres:s4  /*s5*/
        # !el &                                               pres:s5; /*s5*/ cpuin = pres:s1
      # pres:s2
      # pres:s3
      # pres:s6
      # pres:s7 ;

ce    = pres:s0
      # pres:s2
      # pres:s6
      # pres:s3
      # pres:s4
      # pres:s5 ;

/*       el & int & en & vblnk & hsp & ahsp & wr & cr       sx */
we.d =                                                      pres:s1 ;

/*       el & int & en & vblnk & hsp & ahsp & wr & cr       sx & sx */
ldata.d=                                                    pres:s6 ;

/*       el & int & en & vblnk & hsp & ahsp & wr & cr       sx & sx */
len.d =            en &         hsp &                       pres:s0
     # !el &                                                pres:s4 ;

/* DSACK.d = pres:s6 # pres:s3 # DSACK &  cr ; */

DSACK.d = pres:s6 # pres:s3 # DSACK & cr ;

ce.ar    = srest ;
ce.sp    = L ;
we.ar    = srest ;
we.sp    = L ;
len.ar   = srest ;
len.sp   = L ;
ldata.ar = srest ;
ldata.sp = L ;
nex.ar   = srest ;
nex.sp   = L ;
cnten.ar = srest ;
cnten.sp = L ;
cpuin.ar = srest ;
cpuin.sp = L ;
DSACK.ar = srest ;
DSACK.sp = L ;
```

APPENDIX B to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING (CNTLE PAL)

```
PARTNO     45-038042-01A   ;
NAME       cntle           ;
DATE       6 Oct 1987      ;
REV        X1.3            ;
DESIGNER   Lynn Arbuckle   ;
COMPANY    BTS             ;
ASSEMBLY   DV-5000 board   ;
DEVICE     p1618           ;
LOCATION   U291            ;
```

```
/*******************************************************************/
/*                                                                 */
/* This device generates the enables for the control stack to the  */
/* Latches that connect to the video ring and the cpubus.          */
/*                                                                 */
/*******************************************************************/
/*   Allowable Target Device Types: PAL16L8B                       */
/*******************************************************************/
/* update to 1.3 by Kent Spillman                                  */
/**  Inputs  **/

PIN 1       = blnk      ;   /* blanking bit from RAM            */
PIN 2       = !cpuin    ;   /* cpu in the RAM Memory            */
PIN 3       = sparea    ;
PIN 4       = spareb    ;
PIN 5       = !len      ;   /* latch enable from state          */
PIN 6       = sparec    ;
PIN 7       = spared    ;
PIN 8       = !write    ;   /* cpu write line                   */
PIN 9       = !cpureq   ;   /* cpu req access to memory         */
PIN 11      = c74       ;   /* pixel clock                      */

/**  Outputs  **/

PIN 12      = !g        ;   /* enable pin for cpu bus buffers   */
PIN 13      = !cmdclk   ;   /* command latch clock              */
PIN 14      = !cbclk    ;   /* command bit clock                */
PIN 15      = sparee    ;
PIN 16      = !blnkclk  ;   /* Blanking latch clock             */
PIN 17      = sparef    ;
PIN 18      = spareg    ;
PIN 19      = dir       ;   /* direction for cpu bus buffers    */

/** Declarations and Intermediate Variable Definitions **/

$define L 'b'0
$define H 'b'1

/  logic Equations  / g = cpuin & write # cpureq & !write;

cmdclk = len & !blnk & !c74;

blnkclk = len & blnk & !c74;

dir = write;

cbclk = len & !blnk & !c74;
```

APPENDIX C to

United States Patent Application for

SYSTEM AND METHOD FOR HIGH SPEED
COMPUTER GRAPHICS IMAGE COMPUTATION
USING A PARALLEL CONNECTED, ASYNCHRONOUS
MULTIPROCESSOR RING COUPLED TO A SYNCHRONOUS
SPECIAL PURPOSE VIDEO PROCESSING RING (CNTLOE PAL)

```
PARTNO    45-038040-01A    ;
NAME      cntloe           ;
DATE      26 June 1986     ;
REV       X1.4             ;
DESIGNER  Lynn Arbuckle    ;
COMPANY   Bosch            ;
ASSEMBLY  DV-5000 board    ;
DEVICE    p1618            ;
LOCATION  U272             ;

/****************************************************************/
/* This device generates the enables for the control stack of the */
/* DV-5000                                                        */
/****************************************************************/
/* Allowable Target Device_Types: PAL16L8B                       */
/****************************************************************/

/** Inputs **/

PIN 1     = !cnten    ;    /* count enable              */
PIN 2     = !cpuin    ;    /* the cpu is in the memory  */
PIN 3     = !vblnk    ;    /* vertical blanking         */
PIN 4     = fstart    ;    /* frame start               */
PIN 5     = sparea    ;    /* spare                     */
PIN 6     = spareb    ;    /* spare                     */
PIN 7     = sparec    ;    /* spare                     */
PIN 8     = spared    ;    /* spare                     */
PIN 9     = trans     ;    /* transfer mode             */
PIN 11    = !compare  ;    /* compare                   */

/** Outputs **/

PIN 12    = !vidoff   ;    /* enable video offset       */
PIN 13    = !verend   ;    /* enable vertical end       */
PIN 14    = !verpe    ;    /* vertical parallel enable  */
PIN 15    = !vercnt   ;    /* vertical count enable     */
PIN 16    = !vidend   ;    /* enable video end          */
PIN 17    = !vidpe    ;    /* video parallel enable     */
PIN 18    = !vidcnt   ;    /* video count enable        */
PIN 19    = !vidstr   ;    /* enable video start        */

/** Declarations and Intermediate Variable Definitions **/

$define L 'b'0
$define H 'b'1 vidload = !fstart & !vblnk & compare & !cpuin
        # fstart & !trans ;
```

```
verload = vblnk & compare & !cpuin & !fstart
        # fstart ;

/ Logic Equations / vidoff = fstart ;

vidend = !vblnk & !cpuin & !trans    /* normal mode   */
       #          !cpuin &  trans ;  /* transfer mode */ verpe = verload ;

vercnt = vblnk & cnten & !cpuin & !trans
       # verload ;

verend = vblnk & !cpuin & !trans ;

vidpe = vidload ;

vidcnt = !vblnk & cnten & !cpuin & !trans
       #          cnten & !cpuin &  trans
       # vidload ;

vidstr = !fstart & !vblnk & compare ;
```

APPENDIX D to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING (CPUSM PAL)

```
        PARTNO    45-038035-01A;
        NAME      cpusm;
        DATE      sep 30, 1987;
        REV       X1.2 ;
        DESIGNER  KENT SPILLMAN ;
        COMPANY   BTS;
        ASSEMBLY  DV-5000 board ;
        Device    p16r6 ;
        LOCATION  U119;

/****************************************************************/
/*                                                              */
/*  line store to a-bus interface state machine                 */
/*                                                              */
/****************************************************************/
/*  Allowable Target Device Types: 16r6a                        */
/****************************************************************/
```

```
/ INPUTS / pin 2  - lsmq3 ;      /* line store state machine q3    */
pin 3  - lsmq2 ;      /*                          q2    */
pin 4  - lsmq1 ;      /*                          q1    */
pin 5  - lsmq0 ;      /*                          q0    */
pin 6  - !ssels ;     /* select line store from a bus   */
pin 7  - !swrite ;    /* write from a bus               */
pin 8  - !ds ;        /* data strobe from a bus         */
pin 9  - !sbreset ;   /* board reset                    */

/ OUTPUTS / pin 12 - !dsack1;     /* data acknowledge to a bus              */
pin 13 - i_ancillary; /* input ancillary - state 8 from lsstm   */
pin 14 - !cpusq1;     /* cpu interface state machine q1         */
pin 15 - !cpusq0;     /*                             q0         */
pin 16 - !lawe;       /* a bus write enable w/r control         */
pin 17 - !lcsen;      /* line store chip select enable          */
pin 18 - !ladld;      /* line store address load - a bus to ls  */
pin 19 - !lsaoe;      /* line store to a bus buffer enable      */

/ DECLARATIONS AND INTERMEDIATE VARIABLE DEFINITIONS / field s = [lsmq3..0];

$define c0 'h' 0
$define c1 'h' 1
$define c2 'h' 2
$define c3 'h' 3 field state = [cpusq1..0];

/ EQUATIONS / i_ancillary.d = s:8;

/ STATE EQUATIONS / sequence state { present c0
        if  ssels & s:0 & !swrite      next c1    out ladld;
        if  ssels & s:0 & swrite       next c1    out ladld
                                                  out lawe;

default                        next c0;

present c1
        if  ds & !sbreset
            & !swrite & ssels          next c3    out ladld
                                                  out lcsen;

if  ds & !sbreset
            & swrite & ssels           next c3    out ladld
                                                  out lcsen
                                                  out lawe;

if  sbreset # !ssels           next c0;

if  !ds & !sbreset
            & !swrite & ssels          next c1    out ladld
                                                  out lcsen;

if  !ds & !sbreset
            & swrite & ssels           next c1    out ladld
                                                  out lcsen
                                                  out lawe;
                                                  out lsaoe;

present c3
        if  !swrite & !sbreset
            & ssels                    next c2    out ladld
                                                  out lcsen;
```

```
            if  swrite & !sbreset
                & ssels                         next c2      out ladld;

if  sbreset # !ssels                next c0;
                                                             out lsaoe;

present c2
            if  !ssels # sbreset                next c0;

if  ssels & !swrite
                & !sbreset                      next c2      out lcsen
                                                             out ladld;

if ssels & swrite

& !sbreset                      next c2      out ladld;

if  ds                                           out lsaoe
                                                             out dsackl;
}
```

APPENDIX E to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING (LSSTM PAL)

```
            PARTNO    45-038032-01A;
            NAME      lsstm;
            DATE      sep30, 1987;
            REV       X1.1 ;
            DESIGNER  KENT SPILLMAN ;
            COMPANY   BTS ;
            ASSEMBLY  DV-5000 board ;
            Device    p22v10 ;
            LOCATION  U105;
/****************************************************************/
/*                                                              */
/*  line store state machine                                    */
/*                                                              */
/****************************************************************/
/*  Allowable Target Device Types: 22v10                        */
/****************************************************************/

/ INPUTS / pin 1 = ck;          /* c74                                    */
pin 2 = !lcmd3;      /* commands from ring - bit 3             */
pin 3 = !lcmd2;      /*                          2             */
pin 4 = !lcmd1;      /*                          1             */
```

```
pin 5  = !lcmd0;     /*                                          0      */
pin 6  = !rihr;      /* ring input horizontal reference                 */
pin 7  = !rics;      /* ring in commands start - active video*/
pin 8  = !actv1;     /* output active video area wo/matrix              */
pin 9  = !actv2;     /* output active video area w/matrix               */
pin 10 = !oblnk1;    /* output blanking area wo/matrix                  */
pin 11 = !oblnk2;    /* output blanking area w/matrix                   */
pin 13 = !eeavp;     /* early end active video pulse                    */
pin 14 = !monb;      /* matrix installed on board                       */
pin 15 = !rblnk;     /* ring blanking-h input mode                      */
pin 16 = !ssels;     /* line store select - from a bus                  */
pin 23 = !sbreset;   /* board reset                                     */

/ OUTPUTS / pin 17 = lsmq0;      /* state machine output q0                         */
pin 18 = lsmq1;      /*                      q1                         */
pin 19 = lsmq2;      /*                      q2                         */
pin 20 = lsmq3;      /*                      q3                         */
pin 21 = !ancm;      /* ancillary data mode - h capture                 */
pin 22 = !fcm;       /* frame capture mode - burst capture              */

/** DECLARATIONS AND INTERMEDIATE VARIABLE DEFINITIONS **/

$define s0  'h' 0
$define s1  'h' 1
$define s2  'h' 2
$define s3  'h' 3
$define s4  'h' 4
$define s5  'h' 5
$define s6  'h' 6
$define s7  'h' 7
$define s8  'h' 8
$define s9  'h' 9
$define s10 'h' a
$define s11 'h' b
$define s12 'h' c
$define s13 'h' d
$define s14 'h' e
$define s15 'h' f $define f0 'b' 0
$define f1 'b' 1

$define a0 'b' 0
$define a1 'b' 1 field lcmd = [lcmd3..0];

noop  = lcmd:0;
wlcmd = lcmd:1;
rlcmd = lcmd:2;
whcmd = lcmd:3;
rhcmd = lcmd:4;
fccmd = lcmd:5;
ancmd = lcmd:6;
efcmd = lcmd:7;

lsmq3.sp = 'b'0;
lsmq3.ar = sbreset;
lsmq2.sp = 'b'0;
lsmq2.ar = sbreset;
lsmq1.sp = 'b'0;
lsmq1.ar = sbreset;
lsmq0.sp = 'b'0;
lsmq0.ar = sbreset;
fcm.sp = 'b'0;
fcm.ar = sbreset;
ancm.sp = 'b'0;
ancm.ar = sbreset;
```

```
field state = [lsmq3..0];

field ancml = ancm;

field fcml = fcm;

/ STATE EQUATIONS / sequence ancml { present a0
        if  ancmd & !(sbreset # ssels)          next a1;
        default                                 next a0;

present a1
        if  efcmd                               next a0;
        default                                 next a1;
        if  sbreset # ssels                     next a0;
} sequence fcml { present f0
        if  fccmd & !(sbreset # ssels)          next f1;
        default                                 next f0;

present f1
        if  efcmd                               next f0;
        default                                 next f1;
        if  sbreset # ssels                     next f0;
} sequence state { present s0
        if  (whcmd # fcm) & !(sbreset # ssels)  next s5;
        if  rlcmd & !(sbreset # ssels)          next s3;
        if  (ancm # rhcmd) & !(sbreset # ssels) next s7;
        if  wlcmd & !(sbreset # ssels)          next s1;
        default                                 next s0;

present s1
        if  rics & !(sbreset # ssels)           next s2;
        default                                 next s1;
        if  sbreset # ssels                     next s0;

present s2
        if  rihr # eeavp & ancm                 next s0;
        default                                 next s2;
        if  sbreset # ssels                     next s0;

present s3
        if  (actv1 & !monb # actv2 & monb)
             & !(sbreset # ssels)               next s4;
        default                                 next s3;
        if  sbreset # ssels                     next s0;

present s4
        if  !fcm & (!actv1 & !monb # !actv2 & monb)
             # fcm & eeavp                      next s0;
        default                                 next s4;
        if  sbreset # ssels                     next s0;

present s5
        if  rblnk & !(sbreset # ssels)          next s6;
        default                                 next s5;
        if  sbreset # ssels                     next s0;

present s6
        if  !fcm & !rblnk                       next s0;
        if  fcm & !rblnk & !(sbreset # ssels)   next s9;
        default                                 next s6;
        if  sbreset # ssels                     next s0;

present s7
        if  (oblnk1 & !monb # oblnk2 & monb)
             & !(sbreset # ssels)               next s8;
```

```
            default                              next s7;
            if  sbreset # ssels                  next s0;

present s8
        if !ancm & (!oblnk1 & !monb # !oblnk2 & monb)
                                                 next s0;
        if  ancm & (!oblnk1 & !monb # !oblnk2 & monb)
             & !(sbreset # ssels)                next s10;
        default                                  next s8;
        if  sbreset # ssels                      next s0;

present s9
        if !(sbreset # ssels)                    next s4;
        if  sbreset # ssels                      next s0;

present s10
        if !(sbreset # ssels)                    next s2;
        if  sbreset # ssels                      next s0;

present s11                                  next s0;

present s12                                  next s0;

present s13                                  next s0;

present s14                                  next s0;

present s15                                  next s0;
}
```

APPENDIX F to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING (LSWRC PAL)

```
        PARTNO    45-038033-01A;
        NAME      lswrc;
        DATE      oct 1,1987;
        REV       X1.1 ;
        DESIGNER  KENT SPILLMAN ;
        COMPANY   BTS ;
        ASSEMBLY  DV-5000 board ;
        Device    p16r4 ;
        LOCATION  U129;

/****************************************************************/
/*                                                              */
/*   line store read write control                              */
/*                                                              */
/****************************************************************/
/* Allowable Target Device Types: 16r4b                         */
/****************************************************************/
```

```
/ INPUTS / pin 2  = lsmq3 ;       /* line store state machine q3         */
pin 3  = lsmq2 ;       /*                          q2         */
pin 4  = lsmq1 ;       /*                          q1         */
pin 5  = lsmq0 ;       /*                          q0         */
pin 6  = !lcsen;       /* line store chip select enable       */
pin 7  = !lawe;        /* a bus write enable                  */
pin 8  = !ancm;        /* ancillary mode                      */
pin 9  = !fcm;         /* frame capture mode - burst capture  */
pin 12 = d74;          /* delayed c74 - write enable          */
pin 13 = sin2;         /* input select bit 2                  */

/ OUTPUTS / pin 14 = !pcen;        /* internal state decodes      nc      */
pin 15 = !adclr;       /* address counter clear               */
pin 16 = !lwe;         /* line store write enable             */
pin 17 = lcnte;        /* address counter count enable        */
pin 18 = !lcs1;        /* line store memory chip select 1     */
pin 19 = !lcs2;        /*                               2     */

/ DECLARATIONS AND INTERMEDIATE VARIABLE DEFINITIONS / field s = [lsmq3..0];

/ EQUATIONS / lcs2 = pcen & !lwe # pcen & lwe & d74 & !ancm
     # pcen & lwe & d74 & ancm & !fcm & lcnte
     # pcen & lwe & d74 & ancm & fcm # lcsen;

lcs1 = pcen & !lwe # pcen & lwe & d74 & !ancm
     # pcen & lwe & d74 & ancm & !fcm & !lcnte
     # pcen & lwe & d74 & ancm & fcm # lcsen;

adclr.d = s:1 # s:3 # s:5 # s:7 # s:9 # s:a;

lwe.d = s:2 # s:6 # lawe;

pcen.d = s:2 # s:4 # s:6 # s:8;

lcnte.d = s:6 # s:8 # s:9 # s:a # s:4 & !ancm # s:2 & !ancm
        # s:4 & ancm & !lcnte # s:2 & ancm & !lcnte;
```

APPENDIX G to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING (LSRBC PAL)

```
                PARTNO    45-038034-01A;
                NAME      lsrbc;
                DATE      oct 1, 1987;
                REV       X1.2 ;
                DESIGNER  KENT SPILLMAN ;
                COMPANY   BTS;
                ASSEMBLY  DV-5000 board ;
                Device    p16r6 ;
                LOCATION  U118;

/*******************************************************************/
/*                                                                 */
/*  line store ring buffer control                                 */
/*                                                                 */
/*******************************************************************/
/*  Allowable Target Device Types: 16r6a                           */
/*******************************************************************/

/   INPUTS   / pin 2  = lsmq3 ;      /* line store state machine q3    */
pin 3  = lsmq2 ;      /*                          q2    */
pin 4  = lsmq1 ;      /*                          q1    */
pin 5  = lsmq0 ;      /*                          q0    */
pin 6  = sin2 ;       /* input select bit 2             */
pin 7  = sin1 ;       /*                  1             */
pin 8  = sin0 ;       /*                  0             */
pin 9  = lcnte ;      /* address counter count enable   */
pin 12 = !ancm ;      /* ancillary mode                 */
pin 19 = spare;

/   OUTPUTS   / pin 13 = lsr1d;       /* ls to ring buffer direction bit 1   */
pin 14 = !lsr2oe;     /* ls to ring buffer output enable 2   */
pin 15 = !lsr1oe;     /*                                 1   */
pin 16 = lsr2d;       /* ls to ring buffer direction bit 2   */
pin 17 = !lsr4oe;     /* ls to ring buffer output enable 4   */
pin 18 = !lsr3oe;     /*                                 3   */

/   DECLARATIONS AND INTERMEDIATE VARIABLE DEFINITIONS   / field s = [lsmq3..0];

field in = [sin2..0];

/   EQUATIONS   / lsr1oe.d = s:2 & !ancm # s:6 # s:4
    # s:8 & (in:0 # in:1);

lsr2oe.d = s:2 # s:6 # s:4; /* & (in:0 # in:1 # sin2);*/
/* above comment allows virs from ls during ring video */ lsr3oe.d = s:4 & (in:2 # in:3) & lcnte # s:2 & ancm & in:1;

lsr4oe.d = s:4 & (in:2 # in:3) & lcnte # s:2 & ancm & in:1;

lsr1d.d = s:4 # s:8;

lsr2d.d = s:4;
```

APPENDIX H to

United States Patent Application for

SYSTEM AND METHOD FOR HIGH SPEED
COMPUTER GRAPHICS IMAGE COMPUTATION
USING A PARALLEL CONNECTED, ASYNCHRONOUS
MULTIPROCESSOR RING COUPLED TO A SYNCHRONOUS
SPECIAL PURPOSE VIDEO PROCESSING RING (INBUF PAL)

```
PARTNO    45-038027-01A;
NAME      inbuf;
DATE      may 17, 1988;
REV       X1.3 ;
DESIGNER  KENT SPILLMAN ;
COMPANY   BTS;
ASSEMBLY  DV-5000 board ;
Device    p22v10 ;
LOCATION  U120;

/*******************************************************************/
/*                                                                 */
/* INPUT BUFFER CONTROL                                            */
/*                                                                 */
/*******************************************************************/
/* Allowable Target Device Types: 22v10                            */
/*******************************************************************/

/ INPUTS / pin 1  = clk;        /* c74                                  */
pin 2  = lsmq3;      /* line store state machine q3          */
pin 3  = lsmq2;      /*      "                      q2       */
pin 4  = lsmq1;      /*      "                      q1       */
pin 5  = lsmq0;      /*      "                      q0       */
pin 6  = sin2;       /* input select bit 2                   */
pin 7  = sin1;       /*    "       "    1                    */
pin 8  = sin0;       /*    "       "    0                    */
pin 9  = mtxon;      /* matrix on vs matrix bypassed         */
pin 10 = !trans;     /* transparent mode                     */
pin 11 = ikeym;      /* input key mode                       */
pin 13 = i_pseudo;   /* input pseudo cdv mode                */
pin 14 = spare;

/ OUTPUTS / pin 15 = gi_pseudo;  /* gated i_pseudo                       */
pin 16 = !al4oe;     /* analog latch #4 output enable        */
pin 17 = !al3oe;     /* analog latch #3 output enable        */
pin 18 = !mbloe;     /* matrix bypass latch output enable    */
pin 19 = !keyoe;     /* key latch output enable              */
pin 20 = !cdvloe;    /* cdv latch output enable              */
pin 21 = !rdloe;     /* ring data latch output enable        */
pin 22 = !al2oe;     /* analog latch #2 output enable        */
pin 23 = !al1oe;     /* analog latch #1 output enable        */
```

```
/ DECLARATIONS AND INTERMEDIATE VARIABLE DEFINITIONS / field s = [lsmq3..0];

field in = [sin2..0];

rdloe.sp = 'b'0;
rdloe.ar = 'b'0;
alloe.sp = 'b'0;
alloe.ar = 'b'0;
al2oe.sp = 'b'0;
al2oe.ar = 'b'0;
cdvloe.sp = 'b'0;
cdvloe.ar = 'b'0;
keyoe.sp = 'b'0;
keyoe.ar = 'b'0;
mbloe.sp = 'b'0;
mbloe.ar = 'b'0;
al3oe.sp = 'b'0;
al3oe.ar = 'b'0;
al4oe.sp = 'b'0;
al4oe.ar = 'b'0;
gi_pseudo.sp = 'b'0;
gi_pseudo.ar = 'b'0;

/ EQUATIONS / rdloe.d = in:1 & s:0 # in:1 & s:2 # (!mtxon & !(s:4)) & (in:2 # in:3)
    # s:1 # s:7 # s:a # trans;

al2oe.d = sin2 & !trans & !(s:4);

alloe.d = sin2 & s:6 & !trans;

cdvloe.d = (in:2 # in:3) & (mtxon & !(s:4) & !trans);

keyoe.d = (in:2 # in:3) & (mtxon & ikeym & !trans & !(s:4))
    # (in:2 # in:3) & (mtxon & i_pseudo & !trans & !(s:4));

mbloe.d = (in:2 # in:3) & (!mtxon & !trans);

al3oe.d = 'b'0; /* temporary */ al4oe.d = 'b'0; /* temporary */ gi_pseudo.d = i_pseudo; /* temporary */

/* note:when doing inequalities cupl seems to like brackets around
   the expression. example not state 4 = !(s:4)
   !s:4 does not work                         */
```

APPENDIX I to

United States Patent Application for

SYSTEM AND METHOD FOR HIGH SPEED
COMPUTER GRAPHICS IMAGE COMPUTATION
USING A PARALLEL CONNECTED, ASYNCHRONOUS
MULTIPROCESSOR RING COUPLED TO A SYNCHRONOUS
SPECIAL PURPOSE VIDEO PROCESSING RING (PCDVM PAL)

```
PARTNO    45-038028-01A;
NAME      pcdvm;
DATE      sep 29,1987;
REV       X1.2 ;
DESIGNER  KENT SPILLMAN ;
COMPANY   BTS;
ASSEMBLY  DV-5000 board ;
Device    p16r4 ;
LOCATION  U150;

/*******************************************************************/
/*                                                                  */
/* pseudo cdv buffer control                                        */
/*                                                                  */
/*******************************************************************/
/* Allowable Target Device Types: 16r4a                             */
/*******************************************************************/

/ INPUTS / pin 2  = dlsm3 ;   /* delayed line store state machine q3  */
pin 3  = dlsm2 ;   /*           "                      q2  */
pin 4  = dlsm1 ;   /*           "                      q1  */
pin 5  = dlsm0 ;   /*           "                      q0  */
pin 6  = sin2 ;    /* input select bit 2                   */
pin 7  = sin1 ;    /*   "          "   1                   */
pin 8  = sin0 ;    /*   "          "   0                   */
pin 9  = cmpt ;    /* component mode vs pseudo cdv mode    */
pin 12 = mtxon ;   /* matrix on vs matrix bypassed         */
pin 19 = !psync ;  /* h pulse -  syncs pseudo cdv mux      */

/ OUTPUTS / pin 13 = spare1;
pin 14 = !cdvoe ;  /* cdv output enable - bytes b c d      */
pin 15 = !pmce ;   /* cdv mux clock enable                 */
pin 16 = !pmoe2 ;  /* cdv mux output enable byte c to a    */
pin 17 = !pmoe1 ;  /* cdv mux output enable byte a to a    */
pin 18 = spare2;

/ DECLARATIONS AND INTERMEDIATE VARIABLE DEFINITIONS / field s  = [dlsm3..0];

field in = [sin2..0];
```

/ EQUATIONS / pmoe1.d = cdvoe
    & (!pmoe1 & !cmpt # psync & !cmpt # cmpt);

pmoe2.d = cdvoe
    & !(!pmoe1 & !cmpt # psync & !cmpt # cmpt);

pmce.d = !pmoe1 & !cmpt # cmpt;

cdvoe.d = !(in:2 & !mtxon # in:3 & !mtxon);

APPENDIX J to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING -

(BYTSW PAL)

```
PARTNO    45-038031-01A;
NAME      bytsw;
DATE      sep 30, 1987;
REV       X1.1 ;
DESIGNER  KENT SPILLMAN ;
COMPANY   BTS;
ASSEMBLY  DV-5000 board ;
Device    p22v10 ;
LOCATION  U132;
```

```
/*******************************************************************/
/*                                                                 */
/* byte swap buffer control                                        */
/*                                                                 */
/*******************************************************************/
/* Allowable Target Device Types: 22v10                            */
/*******************************************************************/

/ INPUTS / pin 1  = clk;        /* c74                                        */
pin 2  = slsm3;      /* delayed line store state machine q3        */
pin 3  = slsm2;      /*                                  q2        */
pin 4  = slsm1;      /*                                  q1        */
pin 5  = slsm0;      /*                                  q0        */
pin 6  = sin2;       /* input select bit 2                         */
pin 7  = sin1;       /*             1                              */
pin 8  = sin0;       /*             0                              */
pin 9  = !cmdaa;     /* command area active                        */
pin 10 = bsc1;       /* byte swap control bit 1                    */
pin 11 = bsc0;       /*                     0                      */
```

```
pin 13 = !trans;      /* transparent mode                        */
pin 14 = !rmen;       /* ring message on                         */
pin 15 = rmsel;       /* ring message select                     */
pin 16 = !rmtp;       /* ring message timing pulse               */

/ OUTPUTS / pin 17 = !lvout;      /* logical video scan line # select        */
pin 18 = !stken;      /* control stack enable                    */
pin 19 = !bsl4oe;     /* byte swap latch 4 output enable         */
pin 20 = !bsl3oe;     /*                  3                      */
pin 21 = !bsl1oe;     /*                  1                      */
pin 22 = !bsl2oe;     /*                  2                      */
pin 23 = !rmout;      /* ring message select out                 */

/ DECLARATIONS AND INTERMEDIATE VARIABLE DEFINITIONS / field s = [slsm3..0];

field in = [sin2..0];

stken.sp  = 'b'0;
stken.ar  = 'b'0;
bsl1oe.sp = 'b'0;
bsl1oe.ar = 'b'0;
bsl2oe.sp = 'b'0;
bsl2oe.ar = 'b'0;
bsl3oe.sp = 'b'0;
bsl3oe.ar = 'b'0;
bsl4oe.sp = 'b'0;
bsl4oe.ar = 'b'0;
rmout.sp  = 'b'0;
rmout.ar  = 'b'0;
lvout.sp  = 'b'0;
lvout.ar  = 'b'0;

/ EQUATIONS / lvout.d = rmen & rmtp & !rmsel & !trans;

bsl1oe.d = (in:2 # in:3 # in:4 # in:5 # in:6 # in:7 # s:4)
    & (!bsc1 & !cmdaa) # trans;

bsl2oe.d = (in:2 # in:3 # in:4 # in:5 # in:6 # in:7 # s:4)
    & (!bsc0 & !cmdaa) # trans;

bsl3oe.d = (in:2 # in:3 # in:4 # in:5 # in:6 # in:7 # s:4)
    & (bsc1 & !cmdaa & !trans);

bsl4oe.d = (in:2 # in:3 # in:4 # in:5 # in:6 # in:7 # s:4)
    & (bsc0 & !cmdaa & !trans);

stken.d = (cmdaa & !trans) & !(rmen & rmtp) #
    (in:0 # in:1) & !trans & !(s:4) & !(rmen & rmtp);

rmout.d = rmen & rmtp & rmsel & !trans;
```

APPENDIX K to

United States Patent Application for

SYSTEM AND METHOD FOR HIGH SPEED
COMPUTER GRAPHICS IMAGE COMPUTATION
USING A PARALLEL CONNECTED, ASYNCHRONOUS
MULTIPROCESSOR RING COUPLED TO A SYNCHRONOUS
SPECIAL PURPOSE VIDEO PROCESSING RING (CDVCOUT PAL)

```
        PARTNO    45-038029-01A;
        NAME      cdvout;
        DATE      oct 16, 1987;
        REV       X1.3 ;
        DESIGNER  KENT SPILLMAN ;
        COMPANY   BTS;
        ASSEMBLY  DV-5000 board ;
        Device    p16r4 ;
        LOCATION  U151 & U153;

/*********************************************************************/
/*                                                                   */
/*       cdv output buffer control (output A or B )                  */
/*                                                                   */
/*********************************************************************/
/* Allowable Target Device Types: 16r4a                              */
/*********************************************************************/

/   INPUTS   / pin 1  = clk;       /* c74                                         */
pin 2  = dlsm3;     /* delayed line store state machine q3         */
pin 3  = dlsm2;     /*          "                       q2         */
pin 4  = dlsm1;     /*          "                       q1         */
pin 5  = dlsm0;     /*          "                       q0         */
pin 6  = sin2 ;     /* input select bit 2                          */
pin 7  = sin1 ;     /*     "           1                           */
pin 8  = sin0 ;     /*     "           0                           */
pin 9  = cdvaon ;   /* cdv output a on                             */
pin 12 = uwda ;     /* select upper word - bytes a & b             */
pin 13 = keym;      /* key mode of operation                       */
pin 18 = !ccdvb ;   /* composite digital video blanking            */
pin 19 = mtxon ;    /* matrix on vs matrix bypassed                */

/   OUTPUTS   / pin 14 = !mboloe ;  /* matrix bypass latch output enable           */
pin 15 = !cdv1oe ;  /* cdv output latch 1 output enable            */
pin 16 = !cdv2oe ;  /*  "                2                         */
pin 17 = !cdv3oe ;  /*  "                3                         */

/   DECLARATIONS AND INTERMEDIATE VARIABLE DEFINITIONS   / field s = [dlsm3..0];
``` field in = [sin2..0];

/ EQUATIONS / cdv3oe.d = !uwda & mtxon & cdvaon & !(s:8) & !ccdvb;

cdv2oe.d = uwda & mtxon & !keym & cdvaon & !(s:8) & !ccdvb;

cdvloe.d = !uwda & mtxon & !keym & cdvaon & !(s:8) & !ccdvb;

mboloe.d = in:1 & !mtxon & !keym & cdvaon & !ccdvb
    # s:8 & cdvaon & !keym ;

APPENDIX L to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING (CDVBLK PAL)

```
        PARTNO    45-038030-01A;
        NAME      cdvblk;
        DATE      sep 30, 1987;
        REV       X1.1 ;
        DESIGNER  KENT SPILLMAN ;
        COMPANY   BTS;
        ASSEMBLY  DV-5000 board ;
        Device    p16r4 ;
        LOCATION  U152;
```

/****************************************************************/
/*                                                              */
/*          cdv blanking control                                */
/*                                                              */
/****************************************************************/
/* Allowable Target Device Types: 16r4a                         */
/****************************************************************/

/ INPUTS /

```
pin 1  = clk;      /* c74                                   */
pin 2  = dlsm3;    /* delayed line store state machine q3   */
pin 3  = dlsm2;    /*                                  q2   */
pin 4  = dlsm1;    /*                                  q1   */
pin 5  = dlsm0;    /*                                  q0   */
pin 6  = cdvaon ;  /* cdv output a on                       */
pin 7  = cdvbon ;  /* cdv output b on                       */
pin 8  = akeym ;   /* a output key mode                     */
pin 9  = bkeym ;   /* b output key mode                     */
pin 12 = !hcdvb ;  /* horizontal digital blanking           */
pin 13 = !vcdvb ;  /* vertical digital blanking             */
pin 19 = spare ;
```

/ OUTPUTS /

```
pin 14 = !dblnk1 ;   /* digital blanking to pca bus       */
pin 15 = !dblnk2 ;   /*                      pla          */
pin 16 = !dblnk3 ;   /*                      pcb          */
pin 17 = !dblnk4 ;   /*                      plb          */
pin 18 = !ccdvb  ;   /* composite digital video blanking  */
```

/ DECLARATIONS AND INTERMEDIATE VARIABLE DEFINITIONS / field s = [dlsm3..0];

/ EQUATIONS / ccdvb = vcdvb # hcdvb;

dblnk4.d = !cdvbon # hcdvb & !(s:8) # vcdvb & !hcdvb;

dblnk3.d = !cdvbon # bkeym # hcdvb & !(s:8) # vcdvb & !hcdvb;

dblnk2.d = !cdvaon # hcdvb & !(s:8) # vcdvb & !hcdvb;

dblnk1.d = !cdvaon # akeym # hcdvb & !(s:8) # vcdvb & !hcdvb;

APPENDIX M to

United States Patent Application for

SYSTEM AND METHOD FOR HIGH SPEED

COMPUTER GRAPHICS IMAGE COMPUTATION

USING A PARALLEL CONNECTED, ASYNCHRONOUS

MULTIPROCESSOR RING COUPLED TO A SYNCHRONOUS

SPECIAL PURPOSE VIDEO PROCESSING RING (Representative Software)

```
/**************************************************************/
/*                        ac_to_ao.c                          */
/**************************************************************/

/**************************************************************
Author:
    MLC CE
**************************************************************/
#include <stdio.h>
include <boolean.h>
include <sys/cv_driver.h> include    "cv_mem_map.h"
include    "cv_cmd.h"
#include    "ring_cmd.h"
```

```c
#define PRI_W    0x55       /* Enable Primary writes     */
#define SEC_W    0xAA       /* Enable Secondary writes   */
#define PRI_R    0xBBBB     /* Enable Primary reads      */
define SEC_R    0xEEEE     /* Enable Secondary reads    */ define DV_INT_LEVEL3 27

/* local globals */ static boolean         semaphore;         /* interrupt semaphore       */ static unsigned long   *csmemp;           /* Control Stack Pointer     */

/* External Functions */
/*extern void   Video_Input_Setup(),
               Video_Input(),
               Read_Linestore(),
               Timing_Changeover(),
               AE_Blanking(),
               CC_Blanking();*/

/**************************************************************************/
void ao_to_ao(cs_cmd, ao_cmd_src, ao_cmd_dest, dv_port, mode, pal)
/**************************************************************************/
    dv_cmd    *cs_cmd;        /* Pointer to dv_cmd structure
                                 initialized by init_dv_cmds()            */
    ring_cmd  *ao_cmd_src,    /* Pointer to ring_cmd structure
                                 initialized by init_ring_cmds()          */
              *ao_cmd_dest;   /* Pointer to ring_cmd structure
                                 initialized by init_ring_cmds()          */
    dv_ports  *dv_port;       /* Pointer to the dv_ports                  */
    int       mode;           /* Transfer direction                       */
    boolean   pal;            /* PAL if true, else NTSC                   */
/**************************************************************************/
{
    void rawirt();

/* local variables */ char      input[255];

int       old_level,
              picture, scanline,
              pin, hshcb, hmag,
              pxstart, start, stop,
              format,
              write_protect,
              timeout,
              slt,
              n;
    int       clovect;

dv_ports  dvp;            /* Dv port shadow                           */

/* fill cs with BLANK */
    csmemp = (unsigned long *)CS_START;        /* point to mem start      */
    while ((long)csmemp < CS_END)
    {
        CC_Blanking(cs_cmd, &csmemp);
    }

/**************************************************************************
            Set up the Transfer in the Control Stack
***************************************************************************/
    picture = 0;
    pin = hshcb = hmag = pxstart = 0;
    start = 85;
    stop = 857;
    switch(mode)
    {
```

```
    case DV_ACXFER_PRIMARY:
        format = PRI_R;
        write_protect = PRI_W;
        break;
    case DV_ACXFER_SECONDARY:
        format = SEC_R;
        write_protect = SEC_W;
        break;
    case DV_ACXFER_P_TO_S:
        format = PRI_R;
        write_protect = SEC_W;
        break;
    case DV_ACXFER_S_TO_P:
        format = SEC_R;
        write_protect = PRI_W;
        break;
    default:
        fprintf(stderr,"Bad mode in ac to ac\n");
    break;
    }
/*  format = (mode) ? PRI_R : SEC_R;
    write_protect = (mode) ? SEC_W : PRI_W;*/ csmemp = (unsigned long *)CS_START;     /* point to mem start    */ dv_port->video_start.ul = ((long)csmemp >> 2;
    dv_port->video_offset.ul = ((long)csmemp >> 2;

/* do the source timing changeover */
    Timing_Changeover(ac_cmd_src,&csmemp,RING);

/* if different, do another TC on same scanline */
    if(!(( ao_cmd_src->video_output.cmd_wrd.cage == ac_cmd_dest->video_output.cmd_wrd.cage) &&
         (ao_cmd_src->video_output.cmd_wrd.slot == ao_cmd_dest->video_output.cmd_wrd.slot)) )
        Timing_Changeover(ac_cmd_dest,&csmemp,RING);
    *csmemp++ = 0x0;           /* Filler to protect from AB_Blanking    */
    AB_Blanking(cs_cmc,&csmemp);
    CD_Blanking(cs_cmc,&csmemp);
    CC_Blanking(cs_cmc,&csmemp);

printf("format=%x, write_protect=%x, mode=%x\n",format,write_protect,mode);
    Video_Output_Setup(ac_cmd_src,&csmemp,pin,
                       hshcw,hrag,pxstart,start,stop,format);
    Video_Input_Setup(ao_cmd_dest,&csmemp,write_protect);
    CC_Blanking(cs_cmc,&csmemp);

slt = (pal) ? 575 : 485;

for (scanline = 0; scanline <= slt; scanline++)
    {
        Video_Output(ao_cmd_src,&csmemp,picture,scanline);
        Write_Linestore(cs_cmc,&csmemp);
        CC_Blanking(cs_cmc,&csmemp);

for(n=0; n < 12; n++)
        *csmemp++ = 0x0;       /* Filler for 5 ACs, DKB 3/16/88    */
        Read_Linestore(cs_cmc,&csmemp);
        Video_Input(ao_cmd_dest,&csmemp,picture,scanline);
        CC_Blanking(cs_cmc,&csmemp);
    }
    dv_port->video_end.ul = ((long)csmemp >> 2;
/***********************************************************************
                     Let it Rip
***********************************************************************/
    /* set Dv shadow video_ic port to current port value    */
    dvp.video_ic.ul = dv_port->video_io.ul;

/* Modify the video_ic shadow port */
    dvp.video_ic.port.sel_input = VRING_INPUT;
    dvp.video_ic.port.sync_sel  = HOUSE_SI;
    dvp.video_ic.port.rgba_out  = ON;
    dvp.video_ic.port.cdv_a     = ON;
    dvp.video_ic.port.cdv_b     = ON;

/* set Dv video_io port to current shadow port value    */
    dv_port->video_io.ul = dvp.video_io.ul;

semaphore = false;
    setvector(DV_INT_LEVEL3,rawint);
```

```c
    /* set intterrupt level */
    old_level = spl0();

/* Set Cv shadow values */
    dvp.ring_control.ul = 0;                    /* clear Cv shadow port   */
    dvp.ring_control.port.ring_mes_sel = ON;/* select ring message    */
    dvp.ring_control.port.transfer     = ON;/* Set Transfer Mode!     */
    dvp.ring_control.port.enable       = ON;/* turn Control Stack on! */

/* Set Dv Port */
    dv_port->ring_control.ul = dvp.ring_control.ul;

/* Enable transfer inerrupts   */
    dv_port->interupt_mask.ul =(unsigned long)OFF;

/* wait on semaphore */
    while(!semaphore) {
        if (timeout++>1000000) {
            printf("got timeout after CS on\n");
            return;
        }
    }

/* Dissable transfer inerrupts */
    dv_port->interupt_mask.ul =(unsigned long)ON;

/* Turn control stack off */
    dvp.ring_control.port.enable = OFF;
    dvp.ring_control.port.transfer = OFF;
    dv_port->ring_control.ul = dvp.ring_control.ul;

/* set original interrupt level */
    splx(old_level);
}

/*****************************************************************/
static void rawint()
/*****************************************************************/
/* here is where the interrupt branches to */
{
    void cv_int_serv();
    asm("       movem.l A0-A1/D0-D1,-(A7)");
    asm("       jsr     cv_int_serv");
    asm("       movem.l (A7)+,A0-A1/D0-D1");
    asm("       rte");
} static void dv_int_serv()
{
    semaphore = true;
}

/*****************************************************************/
/*                      ao_tc_cdv.c                               */
/*****************************************************************/

/*****************************************************************
    Send Ao video to CDV output
Author:
    Dave Elair  May 22, 1987
*****************************************************************/
#include <stdio.h>
include <boolean.h> include     "/usr/kings/cavet/diag/Dv_lib/dv_mem_map.h"
include     "/usr/kings/cavet/diag/Dv_lib/dv_cmd.h"
#include     "/usr/kings/cavet/diag/Dv_lib/ring_cmd.h"

/* local globals */
```

```
static int    picture,
              scanline;

static unsigned long    *csmemp;    /* Control Stack Pointer      */

/* External Functions */
/*extern void   Video_Output_Setup(),
               Video_Output(),
               write_Linestore(),
               Timing_Changeover(),
               AB_Blanking(),
               CD_Blanking();*/

/************************************************************************/
void ao_tc_ccv(cs_cmd,ao_cmd,dv_port,pal)
/************************************************************************/
    dv_cmd      *cs_cmd;        /* Pointer to cv_cmd structure
                                   initialized by init_dv_cmds()         */
    ring_cmd    *ao_cmd;        /* Pointer to ring_cmd structure
                                   initialized by init_ring_cmds()       */
    dv_ports    *dv_port;       /* Pointer to the dv_ports               */
    boolean     pal;            /* PAL if true, else NTSC                */
/************************************************************************/
{
    static void ac_line();

/* local variables */ dv_ports    dvp;            /* Cv port shadow                        */ int    pir,
           hstcw,
           hmag,
           pxstart,

. CD_Blanking(cs_cmc,&csmemp);
}
/************************************************************************/
/*                         cdv_tc_ao.c                                  */
/************************************************************************/

/************************************************************************
Fill the Ac with what is on the CCV input.

Author:
    Dave Blair  March 8, 1988
************************************************************************/
#include <stdio.h>
include <boolean.h> include    <sys/cv_mem_map.h>
include    "/usr/kings/cavet/diag/Dv_lib/dv_cmd.h"
#include    "/usr/kings/cavet/diag/Dv_lib/ring_cmd.h"

#define DV_INT_LEVEL3 27

/* local globals */ static int    write_protect,
              picture,
              scanline;

static boolean  semaphore;          /* interrupt semaphore               */ static unsigned long    *csmemp;    /* Control Stack Pointer             */

/* External Functions */
/*extern void   Video_Input_Setup(),
               Video_Input(),
               Read_Linestore(),
               Timing_Changeover(),
               AB_Blanking(),
               CD_Blanking(),
               Linestore_VIR();*/
```

```c
/*************************************************************/
void cdv_tc_ac(cs_cmd,ao_cmd,dv_port,input_a,one_shot,pal)
/*************************************************************/
    dv_cmd      *cs_cmd;        /* Pointer to cv_cmd structure
                                   initialized by init_dv_cmds()     */
    ring_cmd    *ao_cmd;        /* Pointer to ring_cmd structure
                                   initialized by init_ring_cmds()   */
    dv_ports    *dv_port;       /* Pointer to the dv_ports           */
    boolean     input_a;        /* CDV input A? else B               */
    boolean     one_shot;       /* One frame capture? else continuous*/
    boolean     pal;            /* PAL if true, else NTSC            */
/*************************************************************/
{
    static void dc_line();

void rawint();

/* local variables */ boolean         rgb;

int             old_level,
                    n,
                    timeout,
                    virline,slt,end_vert;

unsigned long   old_ring_timing,
                    old_video_id;

dv_ports    dvp;            /* Dv port shadow  */

/*** start code ****/ dvp.ring_control.ul = 0;                        /* clear Dv shadow port     */
/*  dvp.ring_control.port.frame_ba = ON;*/         /* set ba capture mode      */
    dvp.ring_control.port.enable = OFF;             /* turn Control Stack off!  */
    /* Set Dv Ports */
    dv_port->ring_control.ul = dvp.ring_control.ul;

/* fill cs with BLANK       */
    csmemp = (unsigned long *)CS_START;    /* point to mem start*/

/* clear out the entire control stack */
    while ((int)csmemp < CS_END)
    {
        CD_Blanking(cs_cmd,&csmemp);
    }

/*************************************************************
                Set up the Active Video area
*************************************************************/
    csmemp = (unsigned long *)CS_START;    /* point to mem start */

/* this is RPIC used in video ring commands, it never changes */
    picture = 0;
    slt = (pal) ? 575 : 485;

/* active video first train starts at CS_START */
    dv_port->video_start.ul = (long)csmemp >> 2;

/* do line 0 */
/*  scanline = 0;
    do_line(cs_cmd,ao_cmd);
*/
    /* right now csmemp = CS_START + one train */
    /* this makes stack start with commands on train #1, rot #0 */
    dv_port->video_offset.ul = (long)csmemp >> 2;
    for (scanline = 0; scanline <= slt; scanline++)
    {
        do_line(cs_cmd,ao_cmd);
    }
    CD_Blanking(cs_cmd,&csmemp); /* Tick video counter to do odds next */ dv_port->video_end.ul = (long)csmemp >> 2;
    *csmemp++ = 0x0;            /* Filler to isolate from Vertical  */
```

```c
/****************************************************************
            Set up the vertical retrace area
****************************************************************/
    /* set vertical start port  */
    dv_port->vertical_start.ul = (long)csmemp >> 2;

write_protect = 0x55;        /* Enable primary writes only   */

/* second train has only video input setup */
    Video_Input_Setup(ao_cmd,&csmemp,write_protect);
    Timing_Changeover(ao_cmd,&csmemp,RING);
    *csmemp++ = 0x0;    /* Filler to protect from AB_Blanking    */
    AB_Blanking(cs_cmd,&csmemp);
    CD_Blanking(cs_cmd,&csmemp);

virline = (pal) ? PAL_VIR : NTSC_VIR;
    end_vert = (pal) ? 625 : 525;

for (scanline = slt; scanline < end_vert; scanline++)
    {
        /* if we are on a VIR line... */
        if(scanline >= 518 && scanline <= 521)
        {
             /* read VIR scanline from linestore (for view ring) */
             Read_Linestore(cs_cmd,&csmemp);
/*           Video_Input(ao_cmd,&csmemp,picture,scanline);       */
        }

/* whether or not VIR line, end train with CD */
        CD_Blanking(cs_cmd,&csmemp);
    }

/* set vertical end port    */
    dv_port->vertical_end.ul = (long)csmemp >> 2 ;

/****************************************************************
                    Let it Rip
****************************************************************/
    /* set Dv shadow video_io port to current port value    */
    old_video_io = dvp.video_io.ul = dv_port->video_io.ul;

/* Modify the video_io shadow port  */ dvp.video_io.port.sel_input = input_a ? CDV_A_INPUT : CDV_B_INPUT;
    dvp.video_io.port.sync_sel  = input_a ? CDV_A_SI    : CDV_B_SI;
    dvp.video_io.port.ryte_out  = ON;
    dvp.video_io.port.ccv_a     = OFF;
    dvp.video_io.port.ccv_b     = OFF;

/* set Dv video_io port to current shadow port value   */
    dv_port->video_io.ul = dvp.video_io.ul;

/* set Dv shadow ring_timing port to current port value */
    old_ring_timing = dvp.ring_timing.ul = dv_port->ring_timing.ul;

/* Modify the ring_timing shadow port   */
    dvp.ring_timing.port.h_phase = (pal) ? 0x348 : 0x342;
    dvp.ring_timing.port.v_phase = (pal) ? 0x2 : 0x1;

/* set Dv ring_timing port to current shadow port value */
    dv_port->ring_timing.ul = dvp.ring_timing.ul;

if(one_shot)
    {
        setvector(DV_INT_LEVEL3,rawint);

/* Set Dv Ports */

/* Set LVSL for int */
        dv_port->logical_video_sl.ul = (unsigned long)3;

/* Enable LVSL interrupts   */
        dv_port->interupt_mask.ul =(unsigned long)OFF;
```

```c
    /* enable interrupts */
    old_level = splC();

/* Set Dv shadow values */
    dvp.ring_control.ul = 0;                       /* clear Dv shadow port */
    dvp.ring_control.port.ring_mes_sel = ON;       /* select ring message */
/*  dvp.ring_control.port.frame_ba=ON; */         /* set ba capture mode */
    /* Set Dv Port */
    dv_port->ring_control.ul = dvp.ring_control.ul;

/* wait for ring sync generator to lock up! */
    for(n = 0,semaphore = false; n < 4; n++) { timeout=0;
        while(!semaphore) {
            if (timeout++>1000000)  {
                printf("got timeout wait for lock\n");
                return;
            }
        }
        semaphore = false;
    } dvp.ring_control.port.enable = ON;  /* turn Control Stack on! */
    /* Set Dv Port */
    dv_port->ring_control.ul = dvp.ring_control.ul;

/* wait till start of next frame */
    timeout=0;
    while(!semaphore) {
        if (timeout++>1000000)  {
            printf("got timeout after CS on\n");
            return;
        }
    }
    semaphore = false;

/* Do it again!! */
    /* wait till start of next frame */
    timeout=0;
    while(!semaphore) {
        if (timeout++>1000000)  {
            printf("got timeout after CS on\n");
            return;
        }
    }
    semaphore = false;

/* Turn control stack off */
    /* this command will take effect at start of next frame */
    dvp.ring_control.port.frame_ba = OFF;  /* set ba OFF for default */
    dvp.ring_control.port.enable = OFF;
    dv_port->ring_control.ul = dvp.ring_control.ul;

/* wait for start of next frame */
    timeout=0;
    while(!semaphore) {
        if (timeout++>1000000)  {
            printf("got timeout after CS off 1\n");
            return;
        }
    }
    semaphore = false;

/* wait for start of next frame */
    timeout=0;
    while(!semaphore) {
        if (timeout++>1000000)  {
            printf("got timeout after CS off 2\n");
            return;
        }
    }
    semaphore = false;
```

```
        /* Set Cv Ports */
        /* Disable LVSL interrupts */
        dv_port->interupt_mask.ul =(unsigned long)0N;

/* set original interrupt level */
        splx(old_level);

/* Reset Cv ports to old port values   */
        dv_port->ring_timing.ul = old_ring_timing;
        dv_port->video_io.ul = old_video_io;
    }
    else
    {

/* here if NOT one-shot */

/* Write CDV VIR in Linestore */
        rgb = false;
        linestore_VIR(rgb);

dvp.ring_control.ul = 0;                    /* clear Cv shadow port */
        dvp.ring_control.port.ring_mes_sel = ON;/* select ring message */
        dvp.ring_control.port.enable        = ON;/* turn Control Stack on! */

/* Set Cv Ports */
        dv_port->ring_control.ul = dvp.ring_control.ul;
    }
}

/***********************************************************************/
static void do_line(cs_cmd,ac_cmd)
/***********************************************************************/
    dv_cmd      *cs_cmd;        /* Pointer to dv_cmd structure
                                   initialized by init_dv_cmds() */
    ring_cmd    *ao_cmd;        /* Pointer to ring_cmd structure
                                   initialized by init_ring_cmds() */
/***********************************************************************/
{

/* build one train's worth of commands: video in, CD blank */

Video_Input(ao_cmd,&csmemp,picture,scanline);
    CD_Blanking(cs_cmd,&csmemp);

}

/***********************************************************************/
static void rawint()
/***********************************************************************/
/* here is where the interrupt branches to */
{ void cv_irt_serv();

asm("       movem.l A0-A1/D0-D1,-(A7)");
    asm("       jsr     cv_irt_serv");
    asm("       movem.l (A7)+,A0-A1/D0-D1");
    asm("       rte");
} static void dv_int_serv()
{
    semaphore = true;
}
/***********************************************************************/
/*                                                                     */
/*          Cv Board hardware, and Default Memory Map Equates.         */
/*          C.K.D.  3/17/87                                            */
/*                                                                     */
/***********************************************************************/
```

```
#define NC_INPUT            0x0
#define VRING_INPUT         0x1
#define CCV_A_INPUT         0x2
#define CCV_B_INPUT         0x3
#define ANALCG_R_INPUT      0x4
#define ANALCG_G_INPUT      0x5
#define ANALCG_B_INPUT      0x6
define ANALCG_CCVS_INPUT   0x7 define V_RING_SI   0x0
define CCVS_SI     0x4
#define EXT_SI      0x5
#define GREEN_SI    0x6
#define CCV_A_SI    0x8
#define CCV_B_SI    0x9
define HCLSE_SI    0xc define CCV_IN_H_PHASE  0x345 define MX1_ST  0xFFFC00CC
define MX2_ST  0xFFF040CC
#define MX3_ST  0xFFF030CC
define MX4_ST  0xFFFC0CCC define aA_ST   0x0
define aB_ST   0x400
#define aC_ST   0x800
#define bA_ST   0xc00
#define bB_ST   0x1000
#define bC_ST   0x1400
#define cA_ST   0x1800
#define cB_ST   0x1c00
define cC_ST   0x2000 define CMAP_ST 0x2400 define ON  1
define OFF 0 ifndef _iv_mem_map_
include <sys/iv_mem_map.h>
endif ifndef _ao_mem_map_
include <sys/ac_mem_map.h> endif ifndef _cv_mem_map_
define _cv_mem_map_

/***************************************************************************/
/*              The Cv board port structure.                               */
/***************************************************************************/

/************ ports ***************/ typedef struct standard_port {
    unsigned    unused    : 16;
    unsigned    standard  : 16;         /* PAL or NTSC preload    */
} standard_port;

typedef struct video_start_port {
    unsigned    unused       : 16;
    unsigned    video_start_f:  2;      /* Future video_start bits */
    unsigned    video_start  : 14;      /* Video Start pointer     */
} video_start_port;

typedef struct video_end_port {
    unsigned    unused       : 16;
    unsigned    video_end_f  :  2;      /* Future video_end bits   */
    unsigned    video_end    : 14;      /* Video End pointer       */
} video_end_port;
```

```c
typedef struct video_offset_port {
   unsigned    unused            : 16;
   unsigned    video_offset_f    :  2;    /* Future video_offset bits */
   unsigned    video_offset      : 14;    /* Video offset pointer     */
} video_offset_port;

typedef struct vertical_start_port {
   unsigned    unused            : 16;
   unsigned    vertical_start_f  :  2;    /* Future vert start bits   */
   unsigned    vertical_start    : 14;    /* Vertical Start pointer   */
} vertical_start_port;

typedef struct vertical_erc_port {
   unsigned    unused            : 16;
   unsigned    vertical_erc_f    :  2;    /* Future vert end bits     */
   unsigned    vertical_erd      : 14;    /* Vertical End pointer     */
} vertical_erc_port;

typedef struct ring_ctl_port {
   unsigned    unused            : 24;
   unsigned    ring_mes_dis      :  1;    /* Ring Message Dissable    */
   unsigned    ring_mes_sel      :  1;    /* Ring Message Select      */
   unsigned    unused1           :  4;
   unsigned    transfer          :  1;    /* Transfer Mode Bit        */
   unsigned    enable            :  1;    /* Control Stack Enable     */
} ring_ctl_port;

typedef struct clamp_port {
   unsigned    unused            : 16;
   unsigned    clamp             : 16;    /* Input Video offset level port */
} clamp_port;

typedef struct amplitude_port {
   unsigned    unused            : 24;
   unsigned    amplitude         :  8;    /* Input Video Gain port    */
} amplitude_port;

typedef struct timing_port {
   unsigned    unused            : 10;
   unsigned    v_phase           : 10;    /* Vertical Blanking Phase  */
   unsigned    unused1           :  2;
   unsigned    h_phase           : 10;    /* Horizontal Blanking Phase */
} timing_port;

typedef struct ring_timing_port {
   unsigned    unused            : 10;
   unsigned    v_phase           : 10;    /* Vertical Blanking Phase (Ring) */
   unsigned    pal               :  1;    /* PAL Mode bit             */
   unsigned    interlace         :  1;    /* Interlace mode bit       */
   unsigned    h_phase           : 10;    /* Horizontal Blanking Phase (Ring)*/
} ring_timing_port;

typedef struct video_io_port {
   unsigned    unused            :  8;
   unsigned    sel_input         :  2;    /* Selects Video Source     */
   unsigned    sync_sel          :  4;    /* Ring sync Gen Reference  */
   unsigned    rgba_out          :  1;    /* Output RGB & A mode      */
   unsigned    matrix            :  1;    /* Digital Matrix Enable    */
   unsigned    input_alpha       :  1;    /* Input luminance on D     */
   unsigned    raster            :  1;    /* Master Slave mode bit    */
   unsigned    unused1           :  1;
   unsigned    input_p_ccv       :  1;    /* Input Pseudo CCV         */
   unsigned    byte_swap         :  2;    /* Byte Swapping Mode       */
   unsigned    output_ref        :  1;    /* Output Sync Gen Reference */
   unsigned    cdv_a             :  1;    /* Component Digital Video A On */
   unsigned    bypass_a          :  1;    /* Bypass A                 */
   unsigned    upper_sel_a       :  1;    /* Upper word Select A      */
   unsigned    a_alpha           :  1;    /* A output Alpha           */
   unsigned    cdv_b             :  1;    /* Component Digital Video B On */
   unsigned    bypass_b          :  1;    /* Bypass B                 */
   unsigned    upper_sel_b       :  1;    /* Upper word Select B      */
   unsigned    b_alpha           :  1;    /* B output Alpha           */
} video_io_port;
```

```c
typedef struct logical_video_sl_port {
   unsigned     unused            : 12;
   unsigned     logical_video_sl  : 10; /* Interrupt on Logical SL# */
} logical_video_sl_port;

typedef struct ring_message_port {
   unsigned     unused            : 16;
   unsigned     ring_message      : 16;     /* Ring Message              */
} ring_message_port;

typedef struct interupt_mask_port {
   unsigned     unused            : 31;
   unsigned     interupt_mask     :  1; /* Logical SL Interrupt Mask */
} interupt_mask_port;

/************ unions ************/ typedef union standard_union {
   standard_port           port;
   unsigned     long       ul;
} standard_union;

typedef union video_start_union {
   video_start_port        port;
   unsigned     long       ul;
} video_start_union;

typedef union video_end_union {
   video_end_port          port;
   unsigned     long       ul;
} video_end_union;

typedef union video_offset_union {
   video_offset_port       port;
   unsigned     long       ul;
} video_offset_union;

typedef union vertical_start_union {
   vertical_start_port     port;
   unsigned     long       ul;
} vertical_start_union;

typedef union vertical_end_union {
   vertical_end_port       port;
   unsigned     long       ul;
} vertical_end_union;

typedef union ring_ctl_union {
   ring_ctl_port           port;
   unsigned     long       ul;
} ring_ctl_union;

typedef union clamp_union {
   clamp_port              port;
   unsigned     long       ul;
} clamp_union;

typedef union amplitude_union {
   amplitude_port          port;
   unsigned     long       ul;
} amplitude_union;

typedef union timing_union {
   timing_port             port;
   unsigned     long       ul;
} timing_union;

typedef union ring_timing_union {
   ring_timing_port        port;
   unsigned     long       ul;
} ring_timing_union;
```

```
typedef union video_io_union {
    video_io_port           port;
    unsigned    long        ul;
} video_io_union;

typedef union logical_video_sl_union {
    logical_video_sl_port   port;
    unsigned    long        ul;
} logical_video_sl_union;

typedef union ring_message_union {
    ring_message_port       port;
    unsigned    long        ul;
} ring_message_union;

typedef union interupt_mask_union {
    interupt_mask_port      port;
    unsigned    long        ul;
} interupt_mask_union;

/************ whizbang **********/ typedef struct cv_ports { idportunion             boarc_io_status;
    standard_union          standard;
    video_start_union       video_start;
    video_end_union         video_end;
    video_offset_union      video_offset;
    vertical_start_union    vertical_start;
    vertical_end_union      vertical_end;
    ring_ctl_union          ring_control;
    clamp_union             clamp;
    amplitude_union         amplitude;
    timing_union            timing;
    ring_timing_union       ring_timing;
    video_io_union          video_io;
    logical_video_sl_union  logical_video_sl;
    ring_message_union      ring_message;
    interupt_mask_union     interupt_mask;
} cv_ports;

#endif

/*****************************************************************/
/*                          cv_cmd.h                             */
/*****************************************************************/

/*****************************************************************
Cv board Ring Command Equates.

Author:
    Dave Blair   March 26, 1987
*****************************************************************/
#define CS_START    (unsigned long) 0xfff40000   /* Control stack memory start */
#define CS_END      (unsigned long) 0xfff44000   /* Control stack memory end   */

/* linestore command op codes */
#define WRITE_LINESTORE          0x10
#define WRITE_LINESTORE_H_BLANK  0x11
#define READ_LINESTORE           0x1c
#define READ_LINESTORE_H_BLANK   0x19
#define FRAME_CAPTURE            0x1a
#define ANCILLARY_DATA           0x1b
define END_FRAME_CAPTURE        0x1c /* control stack command cc codes */
define AB_BLANKING     2
#define CC_BLANKING     1

/* misc. */
#define BLANK   0
```

```
#define HCLSE   1
define RING    0 define VIR 15
define PAL_VIR   573+(2 * VIR)
#define NTSC_VIR  493+(2 * VIR)

#ifdef  _iv_mem_map_
#include <sys/ac_mem_map.h>
endif ifndef _cv_mem_map_
include <sys/cv_mem_map.h>
endif ifndef _cv_cmc_
define _cv_cmc_

/* define external functions   */

/* extern void     Write_Linestore(),
                   Write_Linestore_H_Blank(),
                   Read_Linestore(),
                   Read_Linestore_H_Blank(),
                   Frame_Capture(),
                   Ancillary_Data(),
                   End_Frame_Capture(),
                   AB_Blanking(),
                   CD_Blanking();
*/

/****************************************************************/
/*              The Cv board command structure.                 */
/****************************************************************/

/********* Linestore Command Struct *********/
typedef struct linestore {
    unsigned        unused   :   15;
    unsigned        cmd_bit  :    1;
    unsigned        op_code  :    6;
    unsigned        slot     :   10;
} linestore;

/*********** control stack blanking **********/
typedef struct blanking {
    unsigned        unused   :   12;
    unsigned        x        :    1;
    unsigned        op_code  :    2;
    unsigned        cmd_bit  :    1;
    unsigned        blanking :   16;
} blanking;

/************ Cv Command Struct ************/
typedef struct cv_cmd {
    linestore       write_linestore;
    linestore       write_linestore_h_blank;
    linestore       read_linestore;
    linestore       read_linestore_h_blank;
    linestore       frame_capture;
    linestore       ancillary_data;
    linestore       end_frame_capture;
    blanking        ab_blanking;
    blanking        cd_blanking;
} cv_cmd;

#endif

/****************************************************************/
/*                           ring_cmc.h                          */
/****************************************************************/

/****************************************************************
Cv board Ring Command Equates.
```

```
Author:
    Dave Blair March 26, 1987
*********************************************************************/

/* ring command op codes */
#define VIDEO_OUTPUT_SETUP      0
#define VIDEO_INPUT_SETUP       1
#define VIDEO_OUTPUT            2
#define VIDEO_INPUT             3
define TIMING_CHANGEOVER       4 ifndef _iv_mem_map_
include <sys/iv_mem_map.h>
endif ifndef _ov_mem_map_
include <sys/ov_mem_map.h>
endif ifndef _ring_cmd_
define _ring_cmd_

/* define external functions    */

/* extern void   Video_Output_Setup(),
                 Video_Input_Setup(),
                 Video_Output(),
                 Video_Input(),
                 Timing_Changeover();
*/

/*********************************************************************/
/*              The Cv board ring command structure.                 */
/*********************************************************************/

/* command_word is used in all ring command structures */
typedef struct command_word {
    unsigned    unused      :   15;
    unsigned    cmd_bit     :    1;
    unsigned    op_code     :    6;
    unsigned    cage        :    6;
    unsigned    slot        :    4;
} command_word;

typedef struct video_output_setup {
    command_word    cmd_wrc;
    unsigned        unused      :   16;
    unsigned        x           :    8;
    unsigned        pin         :    8;
    unsigned        unused1     :   16;
    unsigned        hshow       :    8;
    unsigned        hmag        :    8;
    unsigned        unused2     :   16;
    unsigned        x1          :    6;
    unsigned        pxstart     :   10;
    unsigned        unused3     :   16;
    unsigned        x2          :    6;
    unsigned        start       :   10;
    unsigned        unused4     :   16;
    unsigned        x3          :    6;
    unsigned        stop        :   10;
    unsigned        unused5     :   16;
    unsigned        format      :   16;
} video_output_setup;

typedef struct video_input_setup {
    command_word    cmd_wrc;
    unsigned        unused      :   16;
    unsigned        x           :    8;
    unsigned        wpbits      :    8;
} video_input_setup;
```

```
typedef struct video_output {
    command_word    cmd_wrc;
    unsigned        unused   : 16;
    unsigned        picture  : 6;
    unsigned        scanline : 10;
} video_output;

typedef struct video_input {
    command_word    cmd_wrc;
    unsigned        unused   : 16;
    unsigned        picture  : 6;
    unsigned        scanline : 10;
} video_input;

typedef struct timing_changeover {
    command_word    cmd_wrc;
    unsigned        unused   : 16;
    unsigned        x        : 15;
    unsigned        house    : 1;
} timing_changeover;

/*********** whizbang **********/ typedef struct ring_cmd {
    video_output_setup      video_output_setup;
    video_input_setup       video_input_setup;
    video_output            video_output;
    video_input             video_input;
    timing_changeover       timing_changeover;
} ring_cmd;

#endif

/*****************************************************************/
/*                      AB_Blanking.c                            */
/*****************************************************************/

/*****************************************************************
Puts the ab_blanking command in the current control stack position
and then increments the control stack pointer.
*****************************************************************/ include    "/usr/kings/davet/diag/Dv_lib/dv_cmd.h"
include    <boolean.h>
/*****************************************************************/
void AB_Blanking(DV_Cmd,ls_ptr_ptr)
/*****************************************************************/
    dv_cmd          *DV_Cmd;        /* Pointer to dv_cmd structure
                                       initialized by init_dv_cmds() */
    unsigned long   *ls_ptr_ptr;    /* Pointer to the Cont Stk pointer */
/*****************************************************************/
{

/* local variables */

/* External Functions */
    extern void dg_longcopy();

dg_longcopy(&DV_Cmd->ab_blanking,*ls_ptr_ptr,sizeof(blanking));
    *ls_ptr_ptr += sizeof(blanking);
}

/*****************************************************************/
/*                      Ancillary_Data.c                         */
/*****************************************************************/

/*****************************************************************
Puts the ancillary_data command in the current control stack
position and then increments the control stack pointer.
*****************************************************************/ include    "/usr/kings/davet/diag/Dv_lib/dv_cmd.h"
include    <boolean.h>
```

```c
/****************************************************************/
void Ancillary_Data(DV_Cmd,ls_ptr_ptr)
/****************************************************************/
    dv_cmd          *DV_Cmd;        /* Pointer to dv_cmd structure
                                       initialized by init_dv_cmds() */
    unsigned long   *ls_ptr_ptr;    /* Pointer to the Cont Stk pointer */
/****************************************************************/
{

/* local variables */

/* External Functions */
    extern void dg_longcopy();

dg_longcopy(&DV_Cmd->ancillary_data,*ls_ptr_ptr,sizeof(linestore));
    *ls_ptr_ptr += sizeof(linestore);
}

/****************************************************************/
/*                      CD_Blanking.c                            */
/****************************************************************/

/****************************************************************
Puts the cd_blanking command in the current control stack position
and then increments the control stack pointer.
****************************************************************/ include    "/usr/kings/davet/diag/Dv_lib/dv_cmd.h"
include    <boolean.h>
/****************************************************************/
void CD_Blanking(DV_Cmd,ls_ptr_ptr)
/****************************************************************/
    dv_cmd          *DV_Cmd;        /* Pointer to dv_cmd structure
                                       initialized by init_dv_cmds() */
    unsigned long   *ls_ptr_ptr;    /* Pointer to the Cont Stk pointer */
/****************************************************************/
{

/* local variables */

/* External Functions */
    extern void dg_longcopy();

dg_longcopy(&DV_Cmd->cd_blanking,*ls_ptr_ptr,sizeof(blanking));
    *ls_ptr_ptr += sizeof(blanking);

}

/****************************************************************/
/*                      Enc_Frame_Capture.c                      */
/****************************************************************/

/****************************************************************
Puts the enc_frame_capture command in the current control stack
position and then increments the control stack pointer.
****************************************************************/ include    "/usr/kings/davet/diag/Dv_lib/dv_cmd.h"
include    <boolean.h>
/****************************************************************/
void Enc_Frame_Capture(DV_Cmd,ls_ptr_ptr)
/****************************************************************/
    dv_cmd          *DV_Cmd;        /* Pointer to dv_cmd structure
                                       initialized by init_dv_cmds() */
    unsigned long   *ls_ptr_ptr;    /* Pointer to the Cont Stk pointer */
/****************************************************************/
{

/* local variables */

/* External Functions */
    extern void dg_longcopy();

dg_longcopy(&DV_Cmd->enc_frame_capture,*ls_ptr_ptr,sizeof(linestore));
    *ls_ptr_ptr += sizeof(linestore);
}
```

```
/****************************************************************/
/*                      Frame_Capture.c                         */
/****************************************************************/

/****************************************************************
Puts the frame_capture command in the current control stack
position and then increments the control stack pointer.
****************************************************************/ include    "/usr/kings/davet/diag/Cv_lib/dv_cmd.h"
include <boolean.h>
/****************************************************************/
void Frame_Capture(DV_Cmd,ls_ptr_ptr)
/****************************************************************/
    dv_cmd          *DV_Cmd;        /* Pointer to dv_cmd structure
                                       initialized by init_dv_cmds() */
    unsigned long   *ls_ptr_ptr;    /* Pointer to the Cont Stk pointer */
/****************************************************************/
{

/* local variables */

/* External Functions */
    extern void dg_longcopy();

dg_longcopy(&DV_Cmd->frame_capture,*ls_ptr_ptr,sizeof(linestore));
    *ls_ptr_ptr += sizeof(linestore);
}
/****************************************************************/
/*                      Read_Linestore.c                        */
/****************************************************************/

/****************************************************************
Puts the read_linestore command in the current control stack position
and then increments the control stack pointer.
****************************************************************/ include    "/usr/kings/davet/diag/Cv_lib/dv_cmd.h"
include <boolean.h>
/****************************************************************/
void Read_Linestore(DV_Cmd,ls_ptr_ptr)
/****************************************************************/
    dv_cmd          *DV_Cmd;        /* Pointer to dv_cmd structure
                                       initialized by init_dv_cmds() */
    unsigned long   *ls_ptr_ptr;    /* Pointer to the Cont Stk pointer */
/****************************************************************/
{

/* local variables */

/* External Functions */
    extern void dg_longcopy();

dg_longcopy(&DV_Cmd->read_linestore,*ls_ptr_ptr,sizeof(linestore));
    *ls_ptr_ptr += sizeof(linestore);
}
/****************************************************************/
/*                   Read_Linestore_H_Blank.c                   */
/****************************************************************/

/****************************************************************
Puts the read_linestore_h_blank command in the current control stack
position and then increments the control stack pointer.
****************************************************************/ include    "/usr/kings/davet/diag/Cv_lib/dv_cmd.h"
include <boolean.h>
/****************************************************************/
void Read_Linestore_H_Blank(DV_Cmd,ls_ptr_ptr)
/****************************************************************/
    dv_cmd          *DV_Cmd;        /* Pointer to dv_cmd structure
                                       initialized by init_dv_cmds() */
    unsigned long   *ls_ptr_ptr;    /* Pointer to the Cont Stk pointer */
/****************************************************************/
{
```

```
    /* local variables */

/* External Functions */
    extern void dg_longcopy();

dg_longcopy(&CV_Cmd->read_linestore_h_blank,*ls_ptr_ptr,sizeof(linestore))
    *ls_ptr_ptr += sizeof(linestore);
}
/****************************************************************************/
/*                        Timing_Changeover.c                              */
/****************************************************************************/

/****************************************************************************
Puts the timing_changeover command in the current control stack position
and then increments the control stack pointer.
*****************************************************************************/ include     "/usr/kings/cavet/diag/Cv_lib/ring_cmd.h"
include     <tcclean.h>
/****************************************************************************/
void Timing_Changeover(AC_Cmd,ls_ptr_ptr,write_protect,house)
/****************************************************************************/
    ring_cmd       *AC_Cmd;         /* Pionter to ring_cmd structure
                                       initialized by init_ring_cmds() */
    unsigned long  *ls_ptr_ptr;     /* Pointer to the Cont Stk pointer */
    int            house;           /* Timing selector                 */
/****************************************************************************/
{

/* local variables */

/* External Functions */
    extern void dg_longcopy();

AC_Cmd->timing_changeover.house = house;

dg_longcopy(&AC_Cmd->timing_changeover,*ls_ptr_ptr,sizeof(video_input));
    *ls_ptr_ptr += sizeof(video_input);
}

/****************************************************************************/
/*                         Video_Input.c                                    */
/****************************************************************************/

/****************************************************************************
Puts the video_input command in the current control stack position
and then increments the control stack pointer.
*****************************************************************************/ include     "/usr/kings/cavet/diag/Cv_lib/ring_cmd.h"
include     <tcclean.h>
/****************************************************************************/
void Video_Input(AC_Cmd,ls_ptr_ptr,picture,scanline)
/****************************************************************************/
    ring_cmd       *AC_Cmd;         /* Pointer to ring_cmd structure
                                       initialized by init_ring_cmds() */
    unsigned long  *ls_ptr_ptr;     /* Pointer to the Cont Stk pointer */
    int            picture,         /* Ring picture number             */
                   scanline;        /* scanline number to be written   */
/****************************************************************************/
{

/* local variables */

/* External Functions */
    extern void dg_longcopy();

AC_Cmd->video_input.picture = picture;
    AC_Cmd->video_input.scanline = scanline;

dg_longcopy(&AC_Cmd->video_input,*ls_ptr_ptr,sizeof(video_input));
    *ls_ptr_ptr += sizeof(video_input);
}
```

```
/***************************************************************/
/*                    Video_Input_Setup.c                      */
/***************************************************************/

/***************************************************************
Puts the video_input_setup command in the current control stack position
and then increments the control stack pointer.
***************************************************************/ include    "/usr/kings/davet/diag/Cv_lib/ring_cmd.h"
include    <boolean.h>
/***************************************************************/
void Video_Input_Setup(AO_Cmd,ls_ptr_ptr,write_protect)
/***************************************************************/
    ring_cmd        *AO_Cmd;        /* Pointer to ring_cmd structure
                                       initialized by init_ring_cmds() */
    unsigned long   *ls_ptr_ptr;    /* Pointer to the Cont Stk pointer */
    int             write_protect;  /* Ring Write Protect field         */
/***************************************************************/
{

/* local variables */

/* External Functions */
    extern void dg_longcopy();

AO_Cmd->video_input_setup.wpbits = write_protect;

dg_longcopy(&AO_Cmd->video_input_setup,
                *ls_ptr_ptr,sizeof(video_input_setup));
    *ls_ptr_ptr += sizeof(video_input_setup);
}
/***************************************************************/
/*                    Video_Output.c                           */
/***************************************************************/

/***************************************************************
Puts the video_output command in the current control stack position
and then increments the control stack pointer.
***************************************************************/ include    "/usr/kings/davet/diag/Cv_lib/ring_cmd.h"
include    <boolean.h>
/***************************************************************/
void Video_Output(AO_Cmd,ls_ptr_ptr,picture,scanline)
/***************************************************************/
    ring_cmd        *AO_Cmd;        /* Pointer to ring_cmd structure
                                       initialized by init_ring_cmds() */
    unsigned long   *ls_ptr_ptr;    /* Pointer to the Cont Stk pointer */
    int             picture,        /* Ring picture number              */
                    scanline;       /* scanline number to be written    */
/***************************************************************/
{

/* local variables */

/* External Functions */
    extern void dg_longcopy();

AO_Cmd->video_output.picture = picture;
    AO_Cmd->video_output.scanline = scanline;

dg_longcopy(&AO_Cmd->video_output,*ls_ptr_ptr,sizeof(video_output));
    *ls_ptr_ptr += sizeof(video_output);
}

/***************************************************************/
/*                    Video_Output_Setup.c                     */
/***************************************************************/

/***************************************************************
Puts the video_output_setup command in the current control stack position
and then increments the control stack pointer.
***************************************************************/
```

```c
#include    "/usr/kings/davet/diag/Dv_lib/ring_cmc.h"
#include <boolean.h>
/**********************************************************************/
void Video_Output_Setup(AC_Cmd,ls_ptr_ptr,pin,hshow,
                        hmag,pxstart,start,stop,format)
/**********************************************************************/
        ring_cmc        *AC_Cmc;        /* Pointer to ring_cmc structure
                                           initialized by init_ring_cmds() */
        unsigned long   *ls_ptr_ptr;    /* Pointer to the Cont Stk pointer */
        int             pin,            /* Pinning Poce field              */
                        hshow,          /* horizontal Show field           */
                        hmag,           /* Horizontal Magnification field  */
                        pxstart,        /* Pixel start                     */
                        start,          /* H Count to start loading        */
                        stop,           /* H Count to stop loading         */
                        format;         /* ring byte format                */
/**********************************************************************/
{

/* local variables */

/* External Functions */
    extern void dg_longcopy();

AC_Cmc->video_output_setup.pin      = pin;
    AC_Cmc->video_output_setup.hshow    = hshow;
    AC_Cmc->video_output_setup.hmag     = hmag;
    AC_Cmc->video_output_setup.pxstart  = pxstart;
    AC_Cmc->video_output_setup.start    = start;
    AC_Cmc->video_output_setup.stop     = stop;
    AC_Cmc->video_output_setup.format   = format;

dg_longcopy(&AC_Cmd->video_output_setup,
                *ls_ptr_ptr,sizeof(video_output_setup));
    *ls_ptr_ptr += sizeof(video_output_setup);
}
/**********************************************************************/
/*                  Write_Linestore.c                                  */
/**********************************************************************/

/**********************************************************************
Puts the write_linestore command in the current control stack position
and then increments the control stack pointer.
**********************************************************************/ include    "/usr/kings/davet/diag/Dv_lib/dv_cmd.h"
include <boolean.h>
/**********************************************************************/
void Write_Linestore(CV_Cmd,ls_ptr_ptr)
/**********************************************************************/
        dv_cmd          *CV_Cmd;        /* Pointer to dv_cmd structure
                                           initialized by init_dv_cmds() */
        unsigned long   *ls_ptr_ptr;    /* Pointer to the Cont Stk pointer */
/**********************************************************************/
{

/* local variables */

/* External Functions */
    extern void dg_longcopy();

dg_longcopy(&CV_Cmd->write_linestore,*ls_ptr_ptr,sizeof(linestore));
    *ls_ptr_ptr += sizeof(linestore);
}

/**********************************************************************/
/*                  Write_Linestore_H_Blank.c                          */
/**********************************************************************/

/**********************************************************************
Puts the write_linestore_h_blank command in the current control stack
position and then increments the control stack pointer.
**********************************************************************/
```

```
#include    "/usr/kings/davet/diag/Dv_lib/dv_cro.h"
#include    <boolean.h>
/****************************************************************/
void write_Linestore_H_Blank(DV_Cmd,ls_ptr_ptr)
/****************************************************************/
    dv_cmd          *DV_Cmd;        /* Pointer to dv_cmd structure
                                        initialized by init_dv_cmds()   */
    unsigned long   *ls_ptr_ptr;    /* Pointer to the Cont Stk pointer  */
/****************************************************************/
{

/* local variables */

/* External Functions */
    extern void dg_longcopy();

dg_longcopy(&DV_Cmd->write_lirestore_h_blank,*ls_ptr_ptr,sizeof(linestore)
    *ls_ptr_ptr += sizeof(linestore);
}
```

We claim:

1. A digital computing system for carrying out a plurality of processes which are necessary to rapidly compute graphic images, the system comprising:
   a plurality of computational subsystems, each computational subsystem having a parallel ring input and a parallel ring output, the parallel ring output of each computational subsystem being connected to the parallel ring input of one other computational subsystem such that a first communication ring is formed allowing high-speed communication between the computational subsystems;
   a plurality of digital video processors, each digital video processor having a parallel input and a parallel output, the parallel output of each digital video processor being connected to the parallel input of the other digital video processor such that a second communication ring is formed between the digital video processors;
   means for inputting and outputting information between an external computer and the first communication ring such that data may be exchanged between the external computer and the computational subsystems;
   means for exchanging information between a video device and the second communication ring such that video images may be exchanged between the digital video processors and the video device; and
   at least one local parallel communication pathway connecting at least one computational subsystem to at least on digital video processor such that data may be rapidly transferred between the computational subsystems forming the first communication ring and the digital video processors forming the second communication ring and such that any number of computational subsystems and digital video processors may be grouped together to accomplish a graphic image processing task and output the completed image to a video device.

2. A digital computing system as defined in claim 1 wherein the first communication ring is used for distributing data packets and wherein the first communication ring comprises a plurality of processors each comprising an interface, said processors being connected one to another to form a ring wherein packets of data may be transferred around the ring from one processor to another, each said interface comprising:
   input storage means for temporary storage of said data packets as they are input to one processor from another processor of said ring;
   output buffer means for temporary storage of said data packets as they are transferred from one processor of said ring to the next, said output buffer means having a storage capacity sized so as to limit the size of a data packet output therefrom such that no data packet can be output onto said ring where the output data packet is larger than the amount of storage capacity of any available input storage means of the processors on said ring;
   input control means, connected to said input storage means, for identifying whether a data packet is addressed to the processor receiving the data packet at its input storage means, and if so, thereafter transferring the data packet to the addressed processor and permitting asynchronous processing of the data packet relative to other processors in the ring, and if not, preparing the data packet for transfer to the next processor in the ring; and
   output control means, connected to said output buffer means, for synchronously transferring data packets from the output buffer means of one processor to the input storage means of the next.

3. A digital computing system as defined in claim 2 wherein each said interface further comprises means for monitoring each data packet output onto said ring, so that if a data packet returns to the processor from which it was sent more than a predetermined number of times without having been received by another processor on the ring to which said data packet was sent, then said data packet may be removed from the ring.

4. A digital computing system as defined in claim 3 further comprising means for communicating from said input storage means a status signal to the output buffer means from which a data packet is being sent to said input storage means, said status signal indicating when the input storage means is filled with data to a predetermined amount of its storage capacity, and wherein each said output control means comprises means for receiving a status signal from an input storage means so that as one processor transfers a data packet to the next processor in the ring, if available storage capacity of the input storage means of said next processor is less than said predetermined amount any further data input to said next processor will be temporarily halted by said output control means.

5. A digital computing system as defined in claim 2 wherein said output buffer means comprises a digital memory storage device.

6. A digital computing system as defined in claim 2 wherein said input storage means comprises a first-in first-out (FIFO) memory device.

7. A digital computing system as defined in claim 6 wherein said input storage means and said output buffer means have identically sized storage capacities.

8. A digital computing system as defined in claim 2 wherein said output control means comprises an output arbitration state machine.

9. A digital computing system as defined in claim 8 further comprising a first latch connected to the output of said output word counter, a second latch connected to said output buffer means on an input side thereof, and a third latch connected to said output buffer means on a output side thereof.

10. A digital computing system as defined in claim 2 wherein said output control means further comprises an output word counter connected to said output arbitration state machine.

11. A digital computing system as defined in claim 2 wherein said input control means comprises an input arbitration state machine.

12. A digital computing system as defined in claim 11 wherein said input control means further comprises an input word counter connected on an output side of said input storage means and connected on an input side of said input arbitration state machine, and an input buffer connected on said output side of said input storage means and connected on said input state machine.

13. A digital computing system as defined in claim 1 wherein the means for inputting and outputting information between said external computer and the first communication ring comprises a first communication ring controller.

14. A digital computing system as defined in claim 1 wherein the means for inputting and outputting information between said external computer and the first communication ring comprises means for receiving a digital time code and means for generating and receiving machine control signals to control peripheral devices.

15. A digital computing system as defined in claim 14 wherein the means for inputting and outputting information between said external computer and the first communication ring further comprises means for receiving information from an external computer by both a serial bus and a communication network.

16. A digital computing system as defined in claim 1 wherein each computational subsystem comprises a microprocessor and a programmable hardware booster.

17. A digital computing system as defined in claim 1 wherein the plurality of digital video processors each have a parallel input and a parallel output, each parallel input and parallel output exchanging a component digital video signal with another digital video processor.

18. A digital computing system as defined in claim 17 further comprising means for synchronously passing the component digital video signal between the plurality of digital video processors.

19. A digital computing system as defined in claim 1 wherein the plurality of digital video processors comprise a plurality of frame buffers.

20. A digital computing system as defined in claim 19 wherein each of the plurality of frame buffers comprises:

means for receiving commands placed on the second communication ring;

means for storing at least one frame of a component digital video signal; and means for outputting a video signal to a peripheral device.

21. A digital computing system as defined in claim 20 wherein the means for outputting a video signal comprises means for outputting an RGB analog video signal to an external color monitor.

22. A digital computing system as defined in claim 1 wherein the means for exchanging information between a video device and the second communication ring comprises means for receiving at least one video signal input and organizing a video signal train for transmission on the second communication ring.

23. A digital computing system as defined in claim 1 wherein the means for exchanging information between a video device and the second communication ring comprises means for generating commands and addressing those commands to other digital video processors located on the second communication ring.

24. A digital computing system as defined in claim 23 wherein the means for exchanging information comprises means for placing information from a first peripheral video device onto the second communication ring and for passing information from the second communication ring to a second, peripheral video device.

25. A digital computing system as defined in claim 1 further comprising a local parallel bus interconnecting the means for inputting and outputting with the means for exchanging information such that data may be passed between the first communication ring and the second communication ring.

26. A digital computing system as defined in claim 1 further comprising a plurality of local parallel communication pathways, each local parallel communication pathway interconnecting each digital video processor with one computational subsystem.

27. A digital computing system as defined in claim 1 further comprising a plurality of workstations, each workstation having a communication link with one computational subsystem whereby a user may input data to the computational subsystem.

28. A computing system for efficiently carrying out a plurality of processes necessary to generate computer graphic images, the system comprising:

a plurality of computational subsystems, each computational subsystem carrying out a computer graphics computation task, each computational subsystem comprising a parallel input and a parallel output;

a first digital parallel communication ring, the first communication ring connecting the parallel input and parallel output of all the computational subsystems and providing communication among the computational subsystems;

a plurality of video processors, each video processor storing at least a portion of a video image frame;

a second digital parallel communication ring connected to all of the video processors and providing communication among the video processors;

means for interfacing an external computer with the first communication ring;

means for interfacing a video image peripheral device with the second communication ring; and means for establishing a parallel communication path between at least one computational subsystem and a video processor such that any of the plurality of computational subsystems and any of the plurality of video processors may exchange information.

29. A computing system as defined in claim 28 wherein each computational subsystem comprises means for storing a packet of data, the means for storing a packet of date being connected between the parallel input and the parallel output of the computational subsystems.

30. A computing system as defined in claim 29 wherein the means for storing a packet comprises a first-in-first-out memory structure.

31. A computing system as defined in claim 29 wherein each computational subsystem comprises means for comparing a destination address portion of the packet to a preselected bit pattern and asserting a signal if a match occurs.

32. A computing system as defined in claim 29 wherein each computational subsystem comprises means for synchronously transferring a packet form a first computational subsystem to a second computational subsystem.

33. A computing system as defined in claim 29 wherein said output of the computational subsystem comprises a transparent latch circuit.

34. A computing system as defined in claim 29 wherein data is transmitted on the first digital communication ring in packets of less than a maximum length and wherein the packet comprises a trip count word portion, the computational subsystem comprising means for decrementing the trip count word portion as the packet passes through the interface.

35. A computing system as defined in claim 34 wherein the means for decrementing further comprises means for indicating when the trip count word has decremented to zero.

36. A computing system as defined in claim 28, wherein the computational subsystems each further comprise means for inputting a packet of data onto the first digital communication ring.

37. A computing system as defined in claim 36 wherein the packet is 1024 words long.

38. A computing system as defined in claim 28 wherein the means for interfacing an external computer comprises a first communication ring controller.

39. A computing system as defined in claim 28 wherein said means for interfacing said external computer comprises means for receiving a digital time code and means for receiving machine control signals to control peripheral devices.

40. A computing system as defined in claim 39 wherein the means for interfacing an external computer further comprises means for receiving information from the host computer by both serial bus and a communication network.

41. A computing system as defined in claim 28 wherein each computational subsystem comprises a microprocessor and a programmable hardware booster.

42. A computing system as defined in claim 28 wherein the plurality of video processors each have parallel input and a parallel output, each parallel input and parallel output exchanging a component digital video signal with another video processor.

43. A computing system as defined in claim 42 further comprising means for synchronously passing the component digital video signal between the plurality of video processors.

44. A computing system as defined in claim 28 wherein the plurality of video processors comprise a plurality of frame buffers.

45. A computing system as defined in claim 44 wherein each of the plurality of frame buffers comprises:
means for receiving commands placed on the second communication ring;
means for storing at least one frame of a component digital video signal; and
means for outputting a video signal to a peripheral device.

46. A computing system as defined in claim 45 wherein the means for outputting a video signal comprises means for outputting an RGB analog video signal to an external color monitor.

47. A computing system as defined in claim 28 wherein the means for interfacing a video image peripheral device with the second communication ring comprises means for receiving at least one video signal input and organizing a video signal train for transmission on the second communication ring.

48. A computing system as defined in claim 47 wherein the means for interfacing a video image peripheral device and the second communication ring further comprises means for generating commands and addressing those commands to other digital video processors located on the second communication ring.

49. A computing system as defined in claim 48 wherein the means for interfacing a video image peripheral device further comprises means for placing information from a first peripheral video device onto the second communication ring and for passing information from the second communication ring to a second, peripheral video device.

50. A computing system as defined in claim 28 wherein the means for establishing said parallel communication path comprises a local bus interconnecting the means for interfacing an external computer with the means for interfacing a video image peripheral device such that data may be passed between the first communication ring and the second communication ring.

51. A computing system as defined in claim 28 further comprising a plurality of local parallel communication pathways, each local parallel communication pathway interconnecting each video processor with one computational subsystem.

52. A computing system as defined in claim 28 further comprising a plurality of workstations, each workstation having a communication link with one computational subsystem whereby a user may input data to the computational subsystem.

53. A system for distributing video signals among at least a first, second, and third video processors, the system comprising:
a parallel ring input provided on each video processor;
a parallel ring output provided on each video processor, each parallel ring output being connected to the parallel ring input of the adjacent downstream video processor such that a video communication ring is formed, each of said video processors processing a video signal from its parallel ring input to its parallel ring output in real time;
means for synchronizing the operation of each of the video processors with one another;
means for inserting a video signal obtained from at least one peripheral video device onto the video communication ring; and means for storing a video signal which has been passed downstream from the third video processor to the first video processor and for reinserting the video signal onto the video communication ring such that the video signal may be passed to the second video processor located upstream from the third video processor.

54. A system for distributing video signals as defined in claim 53 wherein the means for inserting a video signal comprises means for generating a video signal train corresponding to a video signal obtained from a peripheral video device.

55. A system for distributing video signals as defined in claim 54 wherein the means for generating a video signal train comprises means for generating a command portion and a pixel portion of the video signal train.

56. A system for distributing video signals as defined in claim 55 wherein the means for generating a video signal train comprises means for generating commands in the command portion of the video signal train and wherein each video processor comprises means for receiving the commands.

57. A system for distributing video signals as defined in claim 54 wherein the means for generating a video signal comprises means for generating a component digital video signal.

58. A system for distributing video signals as defined in claim 57 wherein the parallel ring input and the parallel ring output each comprise four bytes carrying red, blue, green, and key components, respectively, of a component digital video signal.

59. A system for distributing video signals as defined in claim 53 wherein each video processor comprises a video memory holding at least one frame of the video signal.

60. A system for distributing video signals as defined in claim 59 wherein each video processor comprises means for outputting a video image to an analog video device.

61. A system for distributing video signals as defined in claim 59 wherein the video memory comprises a plurality of random access memory devices.

62. A system for distributing video signals as defined in claim 53 wherein the means for synchronizing comprises means for selectively synchronizing the operation of each of the video processors between a house synchronization signal and a ring synchronization signal.

63. A system for distributing video signals as defined in claim 53 wherein the means for inserting a video signal comprises means for obtaining a video signals from one of at least two peripheral video devices and means for outputting a video signal from the video communication ring to one of said at least two peripheral video devices.

64. A system for distributing video signals as defined in claim 53 wherein the video signal placed on the video communication ring is partitioned into video signal trains, each video signal train including the pixel data for one line of a video image, the means for storing comprising means for storing the pixel data for one line of a video image and for synchronously reinserting the pixel data onto the video communication ring.

65. A method of processing a digital video signal in a video processing system which includes a plurality of digital video processors, the method comprising the steps of:

inputting the digital video signal to a first video processor;

passing the digital video signal from the first video processor to a second digital video processor in real time;

passing the digital video signal from the second video processor to a last video processor in real time;

controlling the passing of the digital video signal from one video processor to the next so that the digital video signal arrives at a desired video processor;

outputting a video signal to an external video device at any one of the video processors;

selectively passing the output from the last video processor to a storage buffer; and inserting the contents of the storage buffer into the input of the first video processor thereby allowing any video processor to pass a digital video signal to another video processor located upstream.

66. A method of processing a digital video signal as defined in claim 65 wherein the step of inputting the digital video signal comprises the steps of:

generating a component digital video signal corresponding to the video signal; and generating a video signal train, containing the component digital video signal, the video signal train including a command portion and a pixel data portion.

67. A method of processing a digital video signal as defined in claim 66 further comprising the steps of:

receiving the command portion of the video signal train at one of said video processors;

determining if the command contained in the command portion is addressed to said one video processor; and carrying out the command by the addressed video processor.

68. A method of processing a digital video signal as defined in claim 65 wherein the step of passing the digital video signal to a second digital video processor in real time comprises the step of passing the equivalent of one frame of pixel data to the second digital video processor within one frame of an appropriate video standard.

69. A method of processing a digital video signal as defined in claim 65 wherein the step of selectively passing the output of the last video processor comprises the step of selectively passing at least one line of pixel data from the last digital video processor to the storage buffer.

70. A method of processing a digital video signal as defined in claim 69 wherein the step of inserting the contents of the storage buffer comprises the step of generating a video signal train containing the pixel data contained in the storage buffer and passing the video signal train to the adjacent downstream digital video processor.

71. A method of processing a digital video signal as defined in claim 65 wherein the step of controlling the passing of the digital video signal comprises the step of selectively synchronizing the passing of the digital video signal with a selected standard.

72. A method of processing a digital video signal as defined in claim 65 wherein the step of outputting a video signal at any one of the video processors comprises the step of outputting an analog video signal to a video monitor.

* * * * *